(12) United States Patent
Yu

(10) Patent No.: US 10,414,251 B2
(45) Date of Patent: Sep. 17, 2019

(54) ADJUSTABLE SUN VISOR APPARATUS

(71) Applicant: Jingchu Yu, Little Ferry, NJ (US)

(72) Inventor: Jingchu Yu, Little Ferry, NJ (US)

( * ) Notice: Subject to any disclaimer, the term of this patent is extended or adjusted under 35 U.S.C. 154(b) by 0 days.

(21) Appl. No.: 16/291,676

(22) Filed: Mar. 4, 2019

(65) Prior Publication Data

US 2019/0241049 A1 Aug. 8, 2019

Related U.S. Application Data

(63) Continuation-in-part of application No. 15/849,085, filed on Dec. 20, 2017, now Pat. No. 10,220,685.

(60) Provisional application No. 62/436,895, filed on Dec. 20, 2016.

(30) Foreign Application Priority Data

Jun. 27, 2017 (CN) .......................... 2017 1 0500585
Jun. 27, 2017 (CN) ..................... 2017 2 0756220 U

(51) Int. Cl.
 *B60J 3/02* (2006.01)

(52) U.S. Cl.
 CPC ............. *B60J 3/0208* (2013.01); *B60J 3/023* (2013.01); *B60J 3/026* (2013.01); *B60J 3/0265* (2013.01)

(58) Field of Classification Search
 CPC ......... B60J 3/026; B60J 3/0208; B60J 3/0265
 USPC .................... 296/97.6, 97.11–97.13
 See application file for complete search history.

(56) References Cited

U.S. PATENT DOCUMENTS

| | | |
|---|---|---|
| 2,261,881 A | 11/1941 | Horstmann |
| 2,492,074 A | 12/1949 | Thompson |
| 2,517,872 A | 8/1950 | Hamel |
| 2,634,161 A | 4/1953 | Beets |
| 2,894,576 A | 7/1959 | Williams |
| 2,912,275 A | 11/1959 | O'Neal |
| 2,917,186 A | 12/1959 | Beets |
| 2,965,415 A | 12/1960 | Dryden |
| 3,074,756 A | 1/1963 | Howe |
| 3,159,421 A | 12/1964 | Samuelson |
| 3,188,685 A | 6/1965 | Fletcher |
| 3,383,132 A | 5/1968 | Stamp |
| 3,454,301 A | 7/1969 | Lehmann |
| 3,499,679 A | 3/1970 | Olander |
| 3,853,370 A | 12/1974 | Barnhart |
| 4,275,917 A | 6/1981 | Marcus |
| 4,323,275 A | 4/1982 | Lutz |
| 4,330,148 A | 5/1982 | LaMont |
| 4,521,046 A | 6/1985 | Foggini |
| 4,635,995 A | 1/1987 | Mineck |
| 4,666,205 A | 5/1987 | Nakagawa |

(Continued)

*Primary Examiner* — Dennis H Pedder

(74) *Attorney, Agent, or Firm* — Cionca IP Law P.C.; Marin Cionca

(57) ABSTRACT

An adjustable sun visor apparatus having: a bar received into an open-pipe arm; an auxiliary visor panel; a ball; a plug; a tension spring; a ball compartment configured to house the ball and the plug and pivot around the ball; a vertical clip configured to receive a portion of the ball and to grip a sun visor; a bend-resistant spring configured to receive the plug and the open-pipe arm; a twin capsule configured to receive the ball and the tension spring; wherein the tension spring biases the bend-resistant spring downwards; such that a movement of the sun visor causes the bar to move within the open-pipe arm and thus prevents a movement of the auxiliary visor panel; such that the sun visor blocks light from the front and the auxiliary visor panel blocks light from the side in a vehicle.

20 Claims, 49 Drawing Sheets

(56) References Cited

U.S. PATENT DOCUMENTS

| | | |
|---|---|---|
| 4,681,363 A | 7/1987 | Hemmeke et al. |
| 4,913,483 A | 4/1990 | Jasso |
| 4,988,139 A | 1/1991 | Yamada |
| 4,989,910 A | 2/1991 | Mersman |
| 5,044,687 A | 9/1991 | Abu-Shumays et al. |
| 5,213,389 A | 5/1993 | Loftis et al. |
| 5,282,571 A | 2/1994 | Smith et al. |
| 5,445,427 A | 8/1995 | Vandagriff |
| 5,489,078 A | 2/1996 | Risley |
| 5,678,880 A | 10/1997 | Keller |
| 6,412,850 B1 | 7/2002 | Francis et al. |

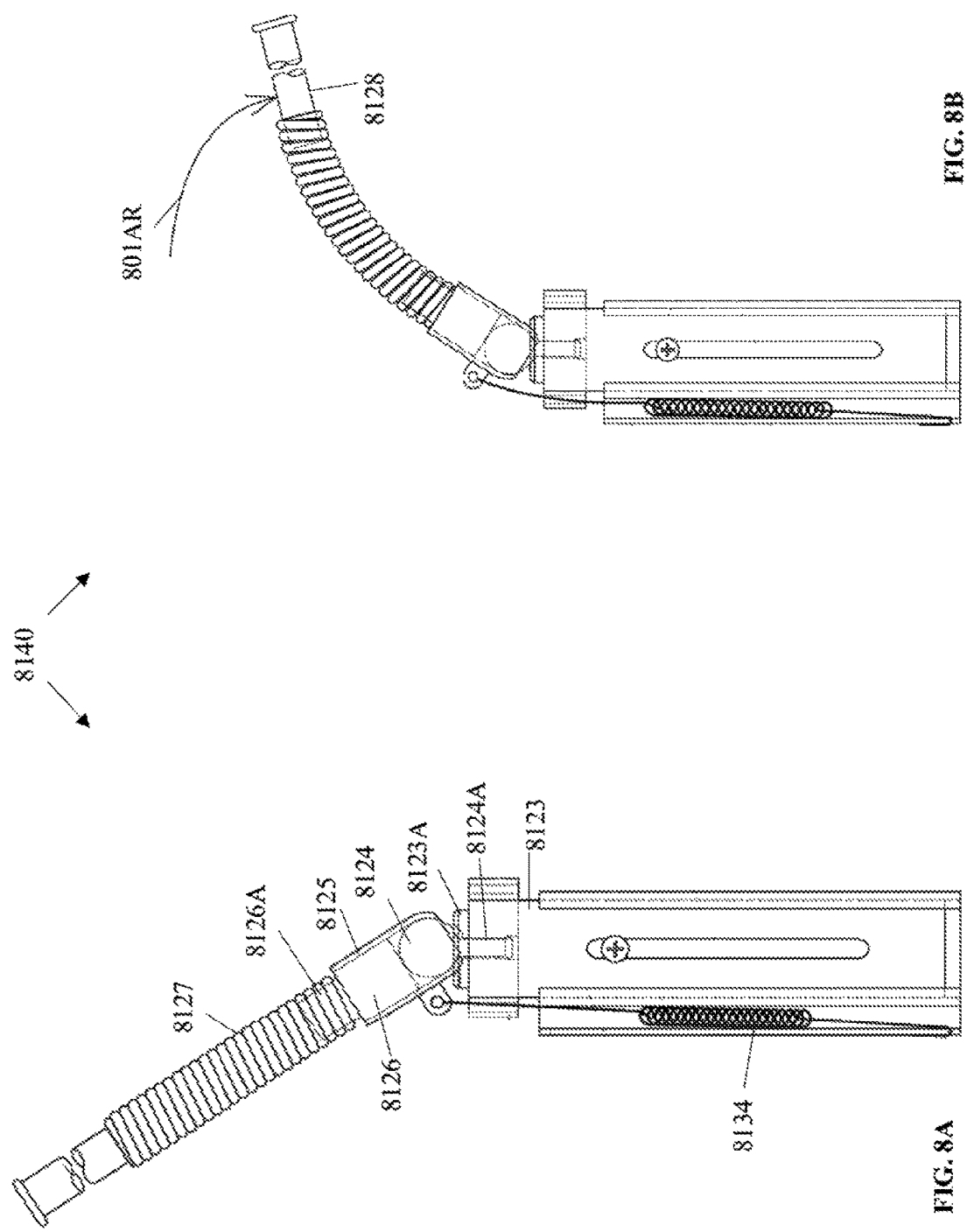

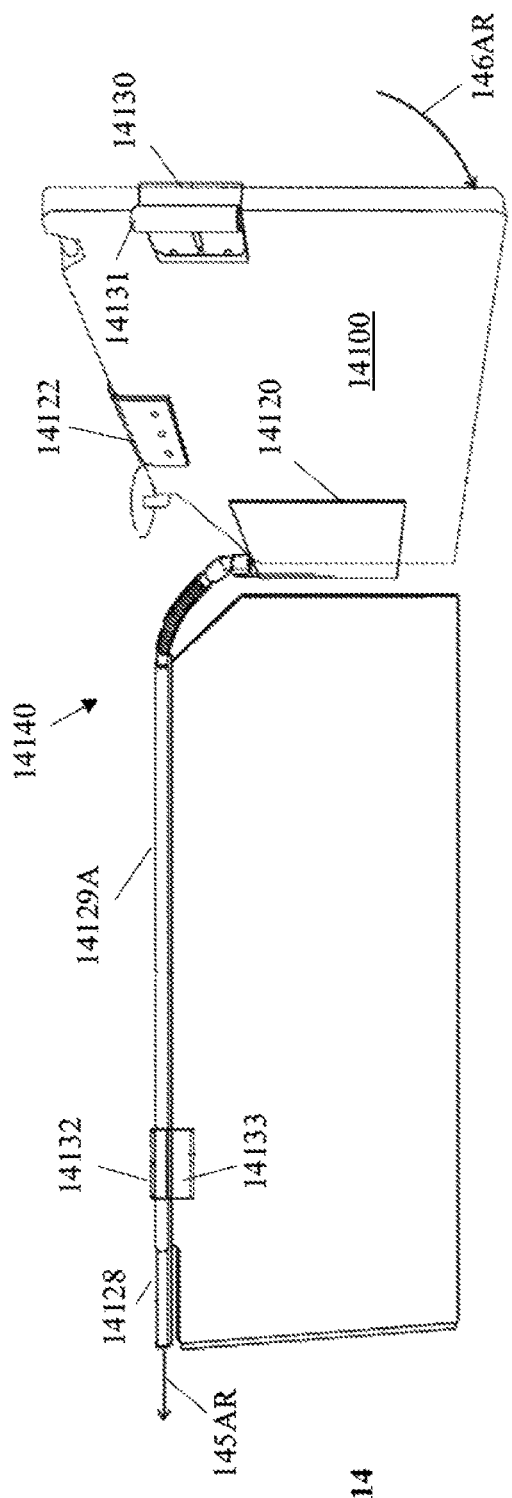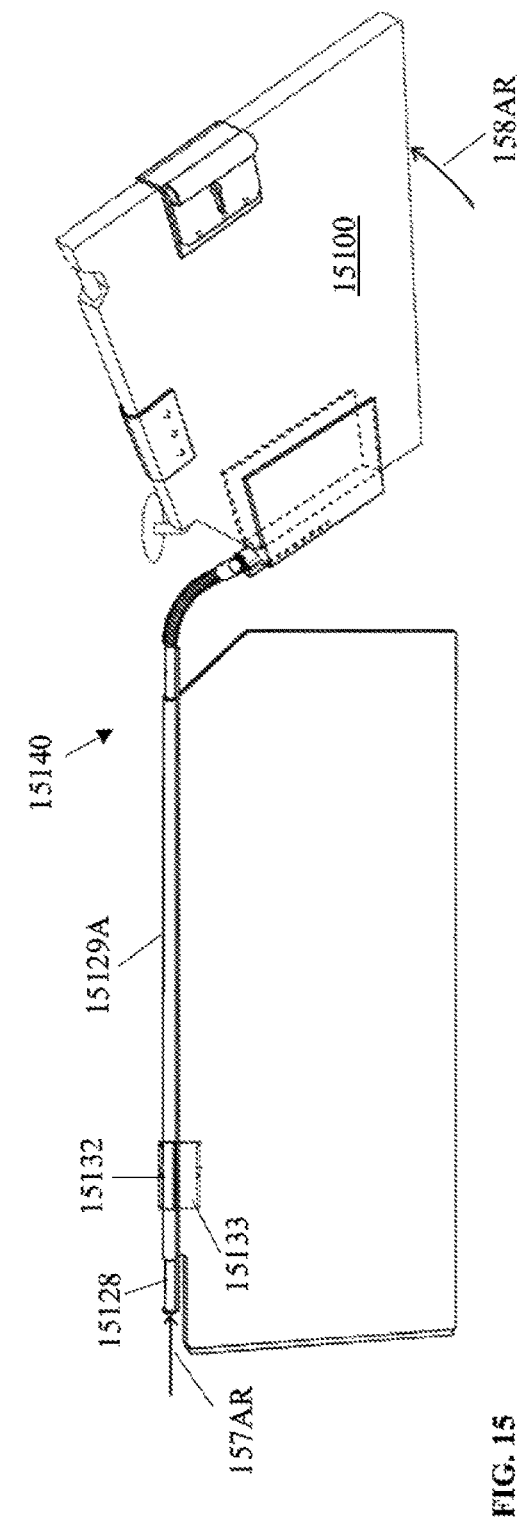
FIG. 14
FIG. 15

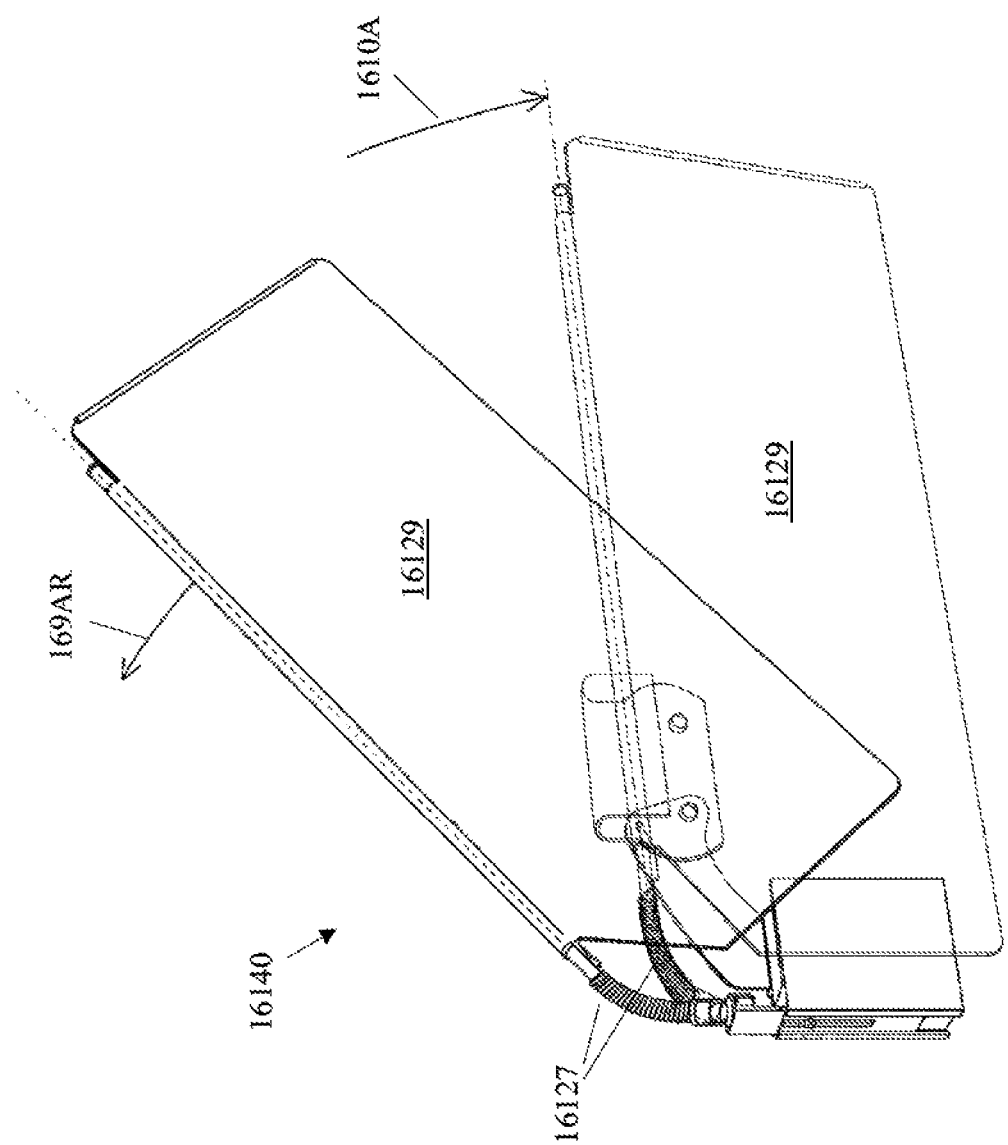

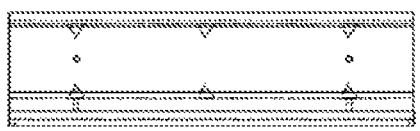
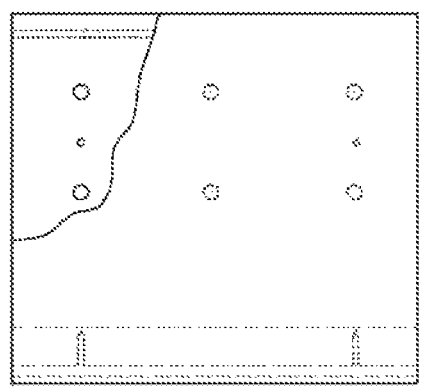
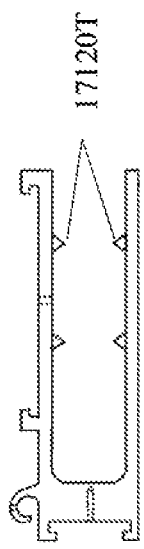
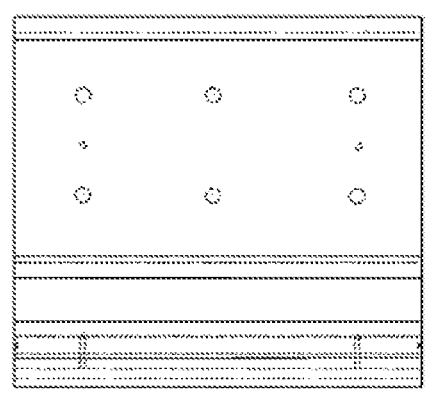

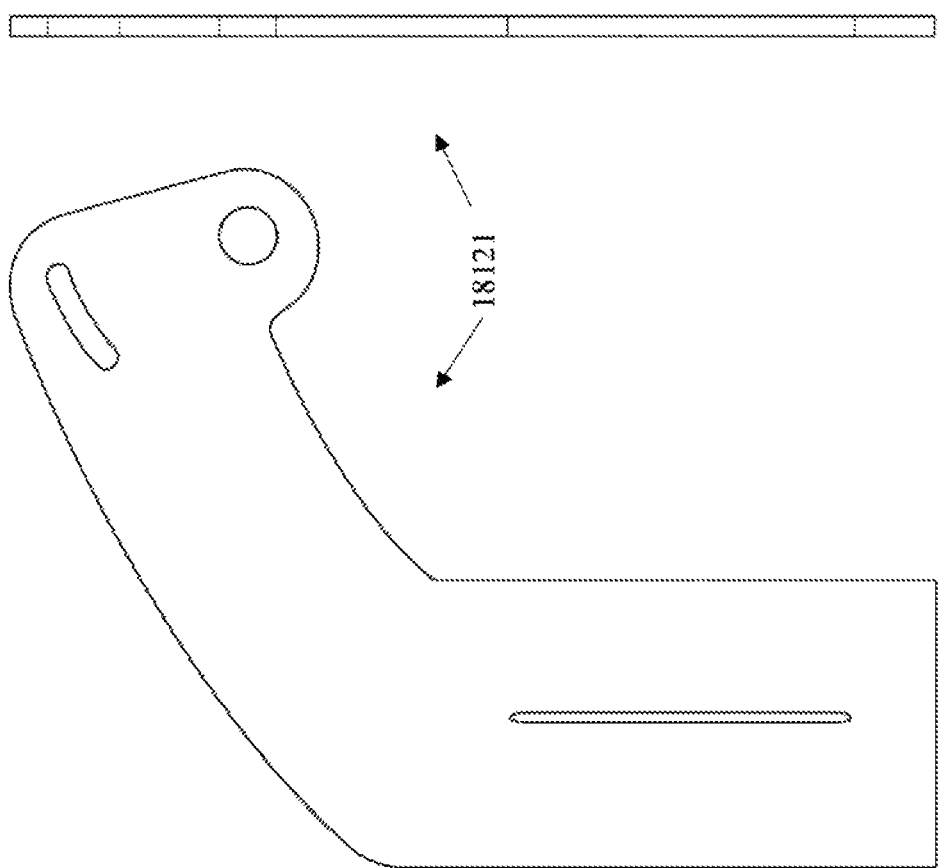

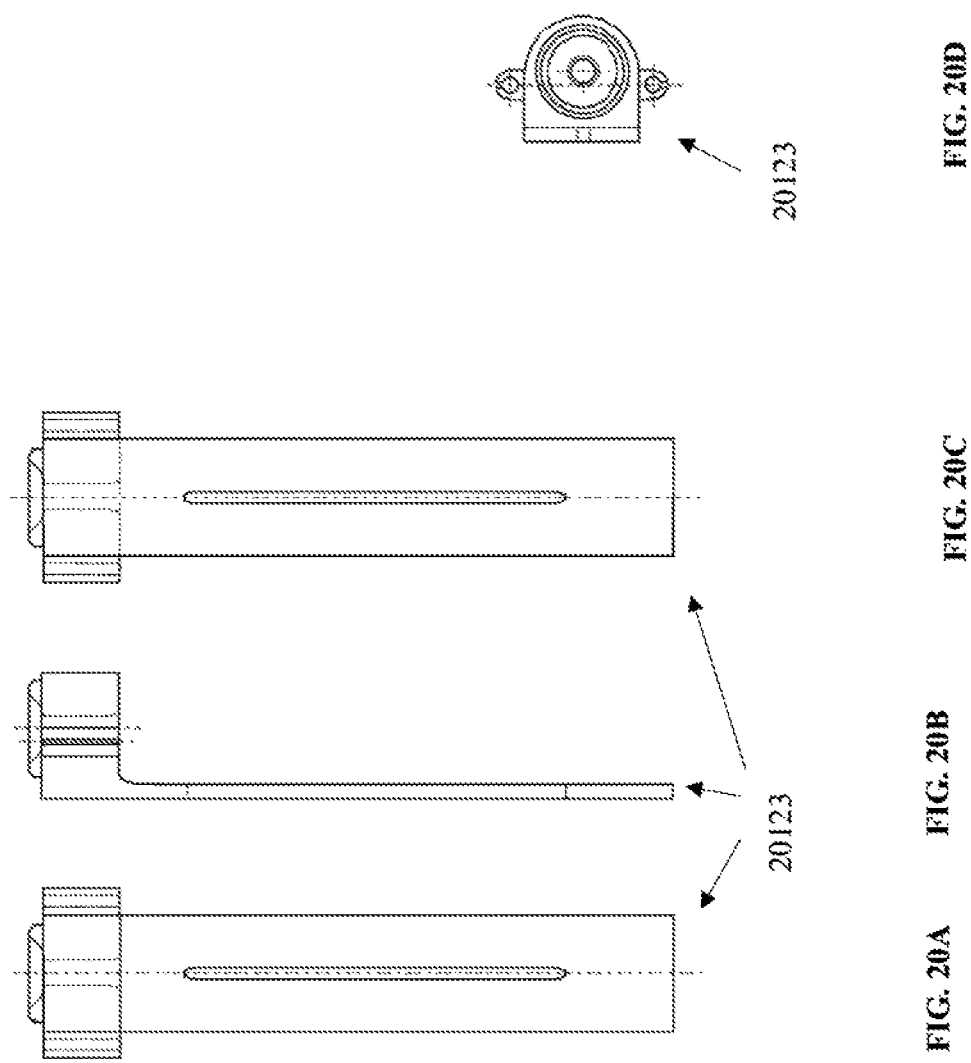

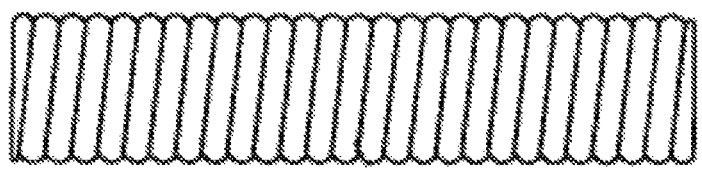
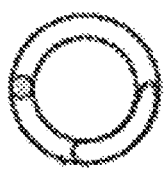
FIG. 24A  24127  FIG. 24B
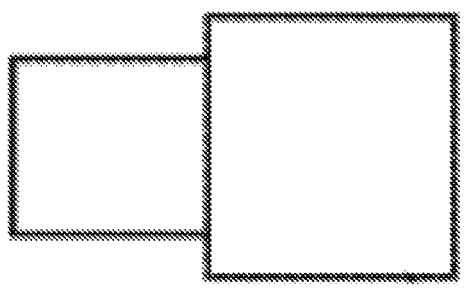
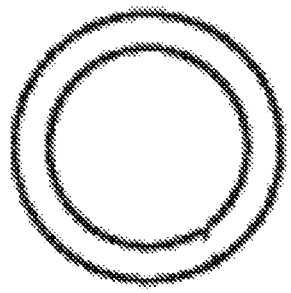
FIG. 23A  23126  FIG. 23B

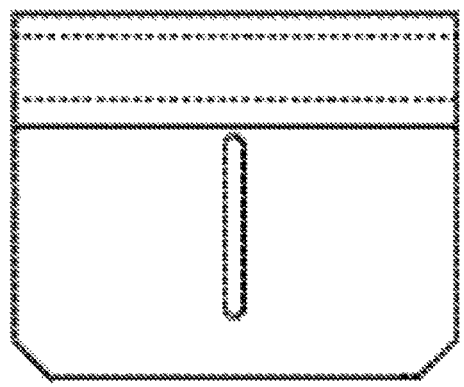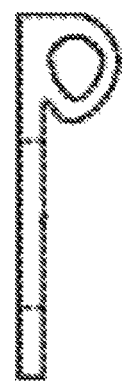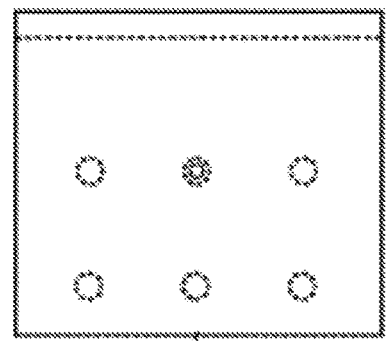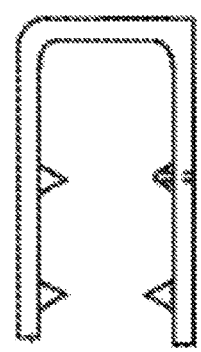

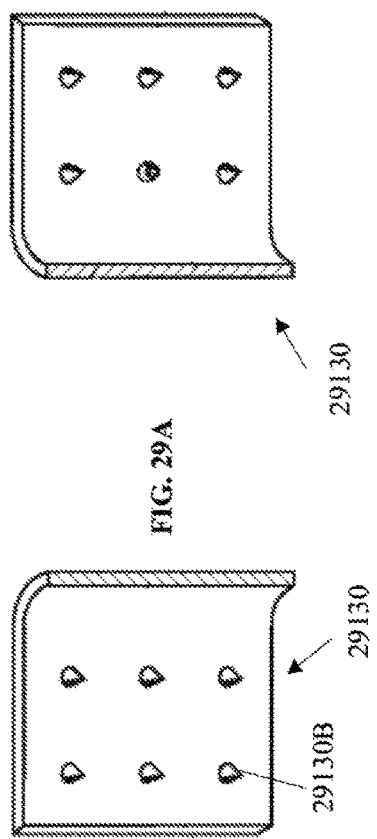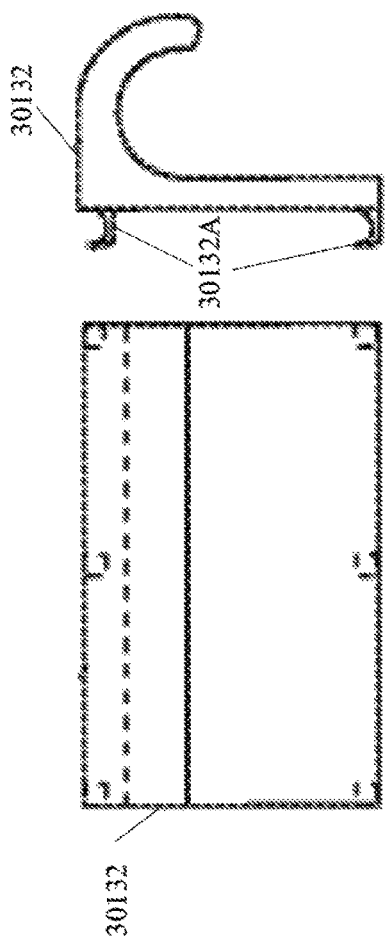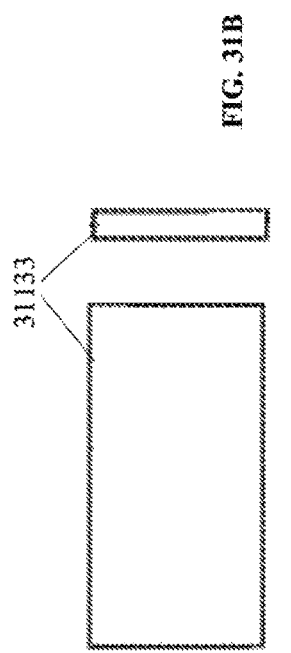

33128

33128

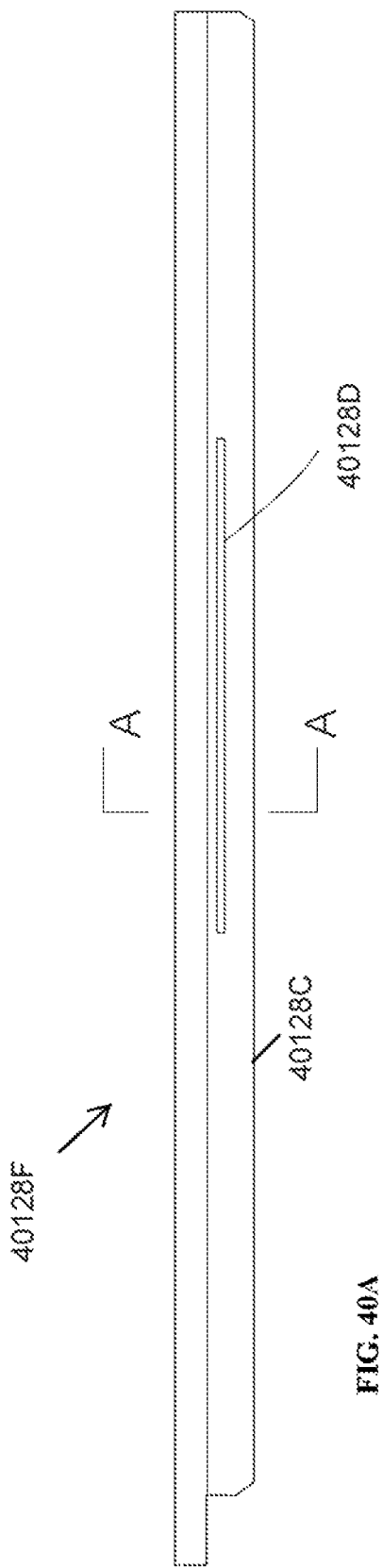
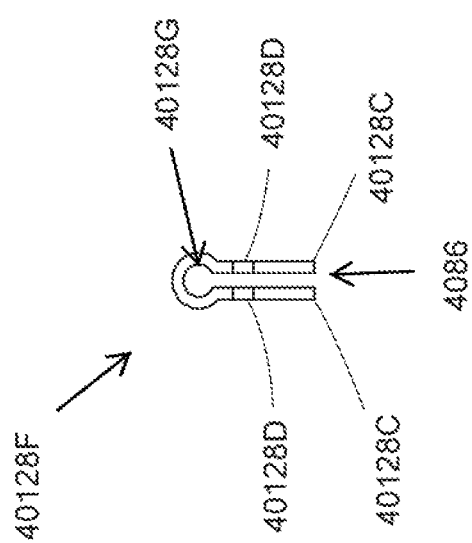
FIG. 40A
FIG. 40B

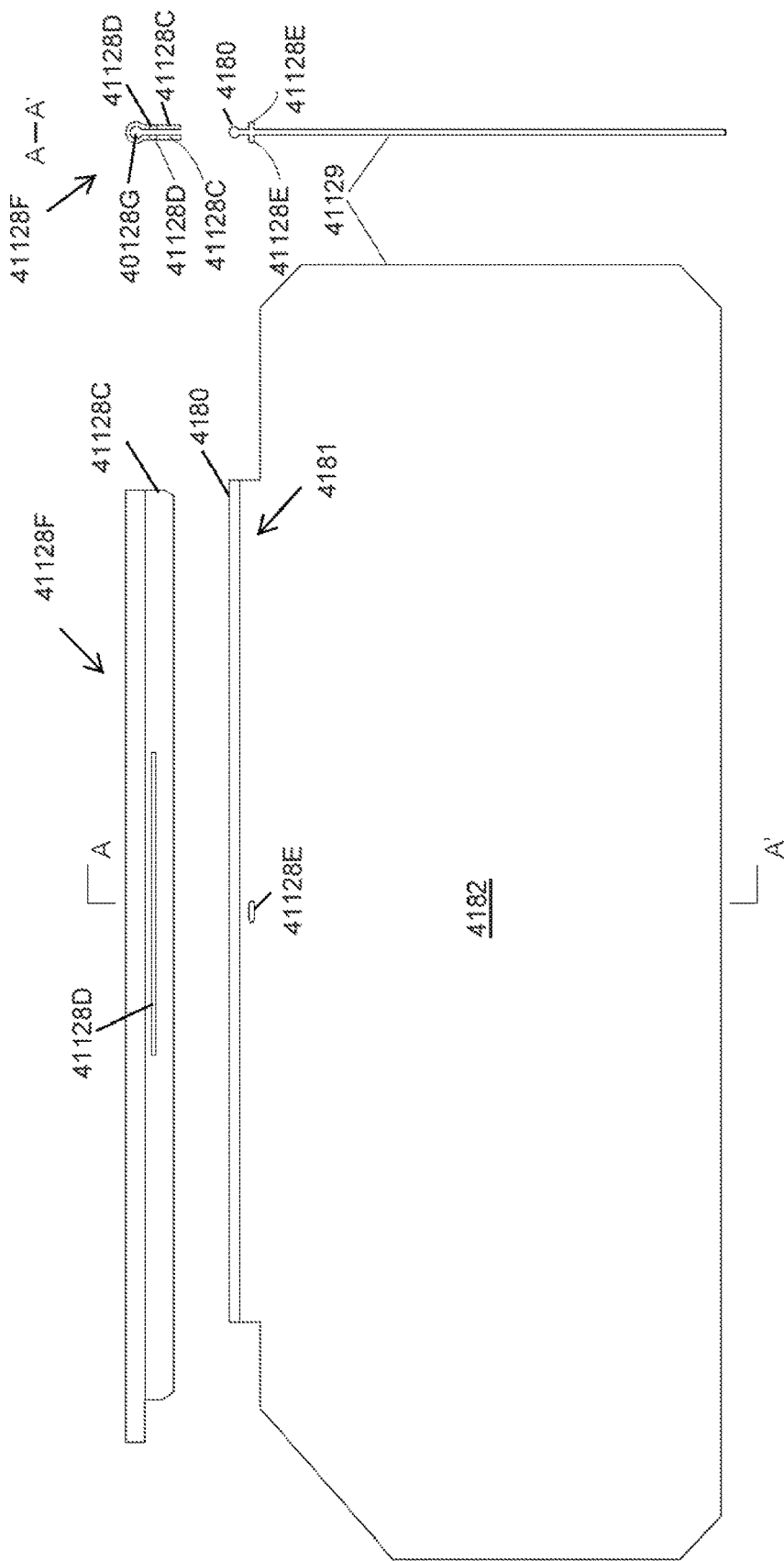

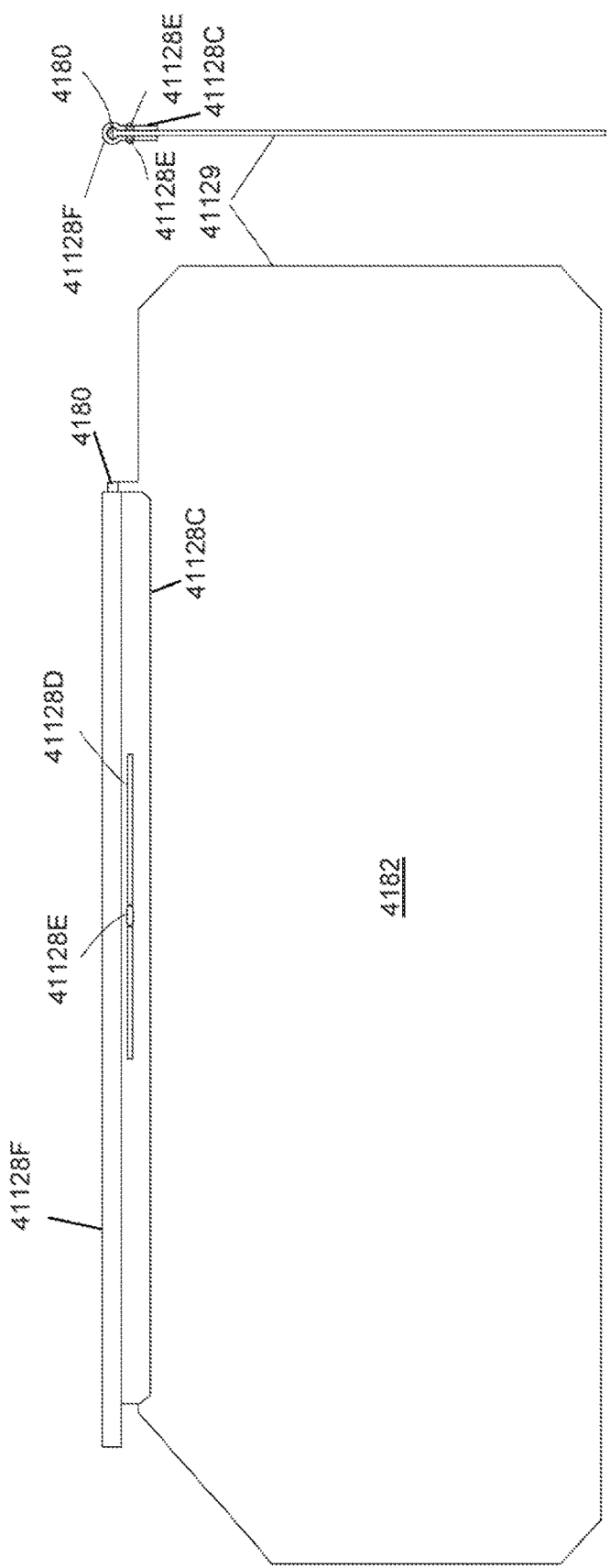

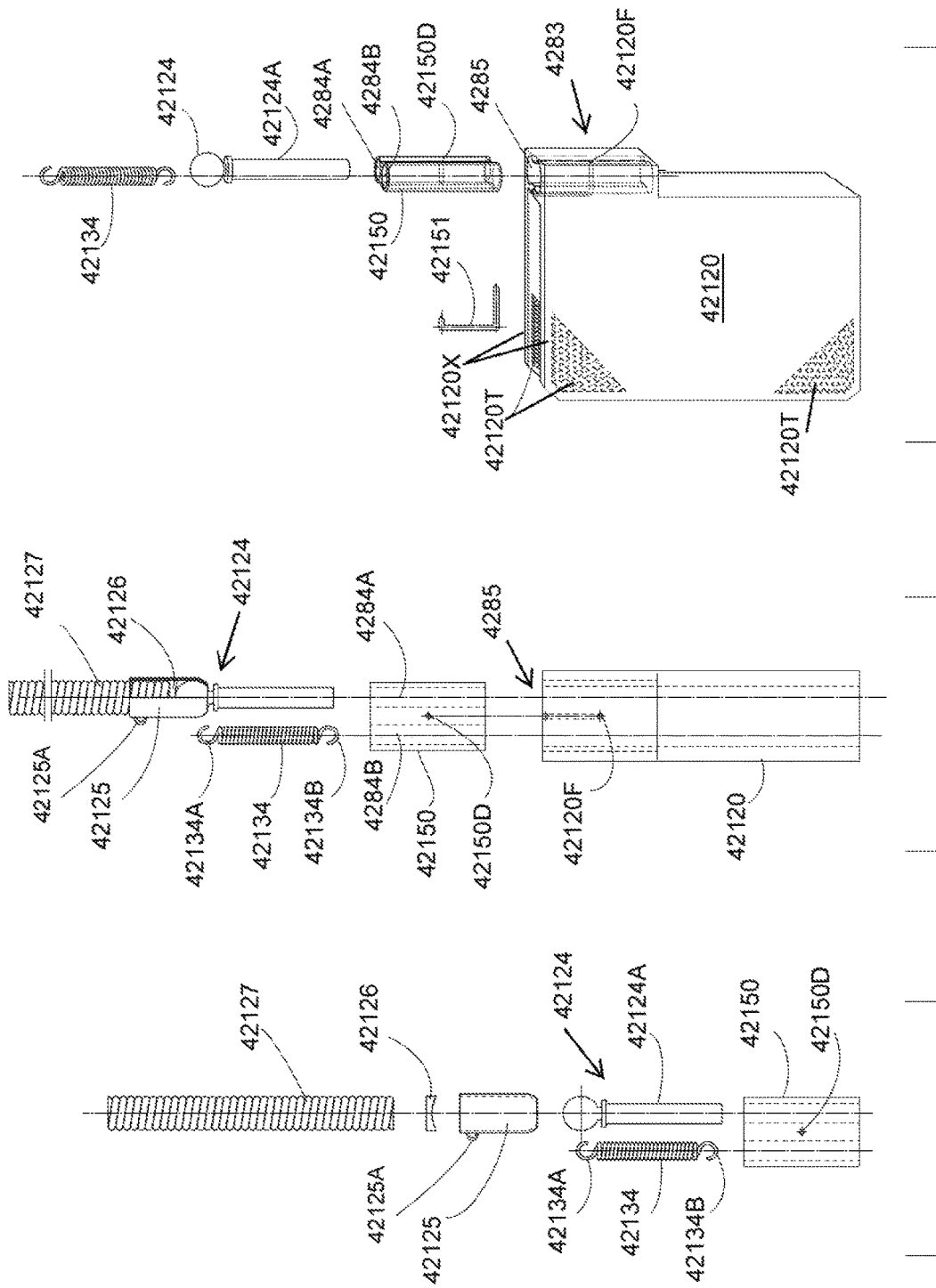

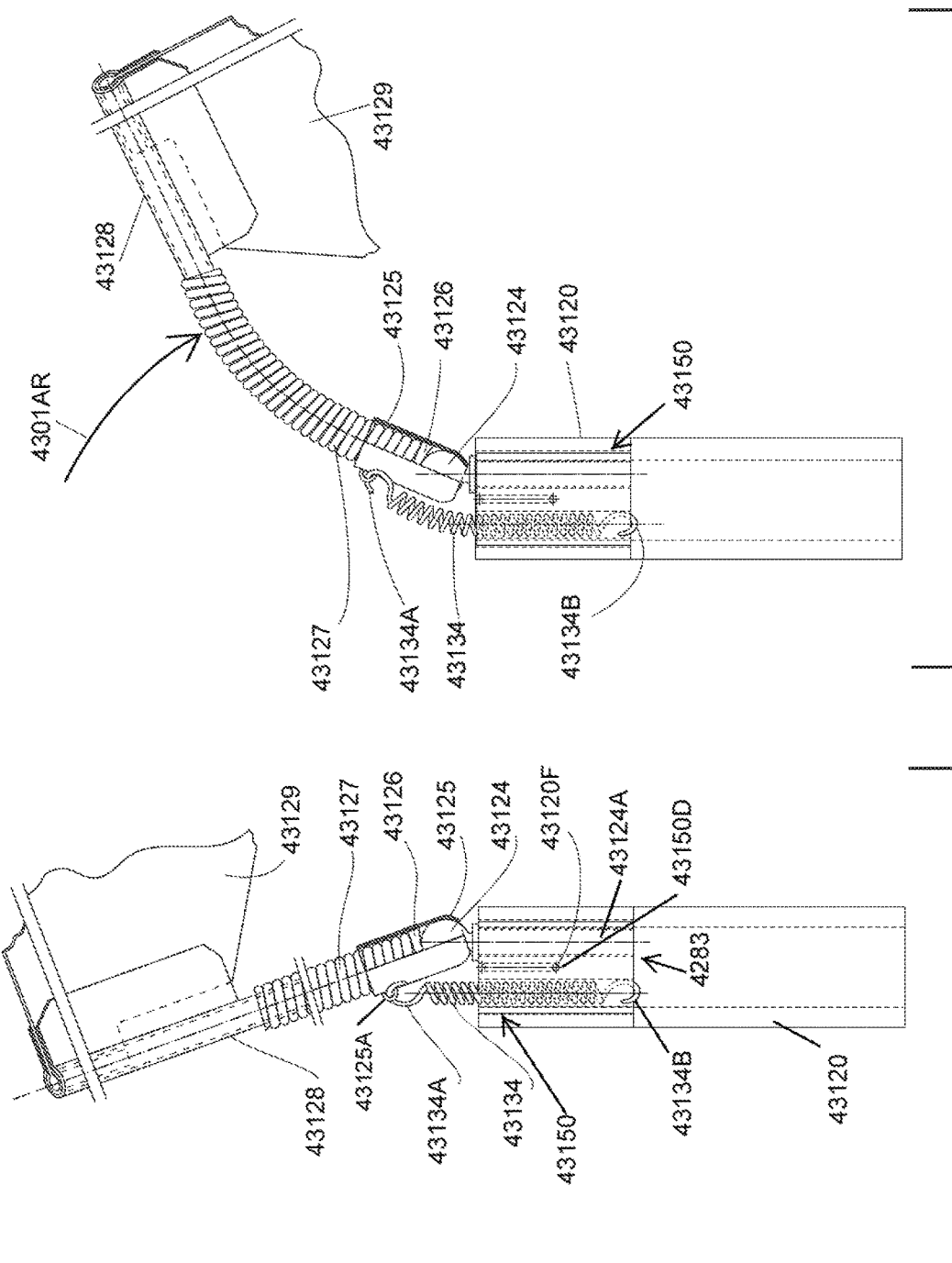

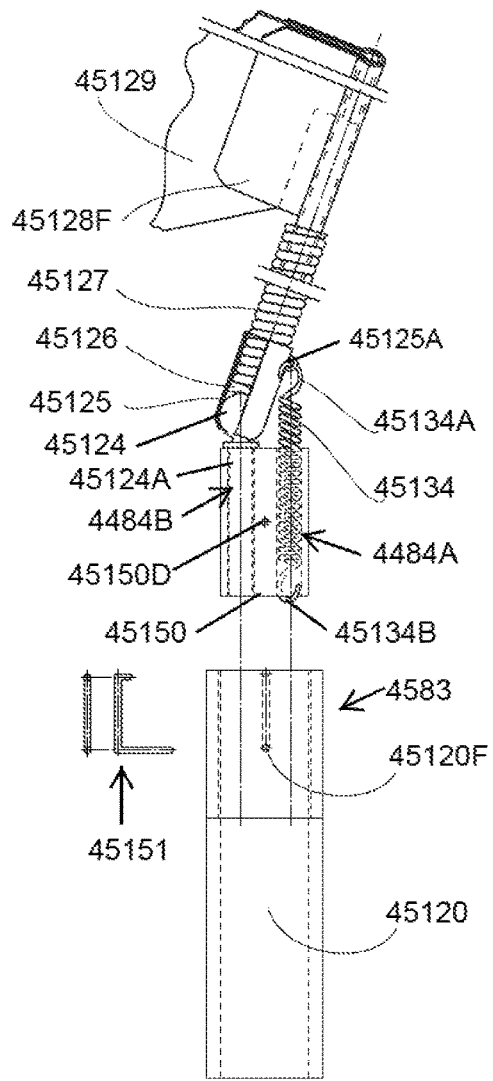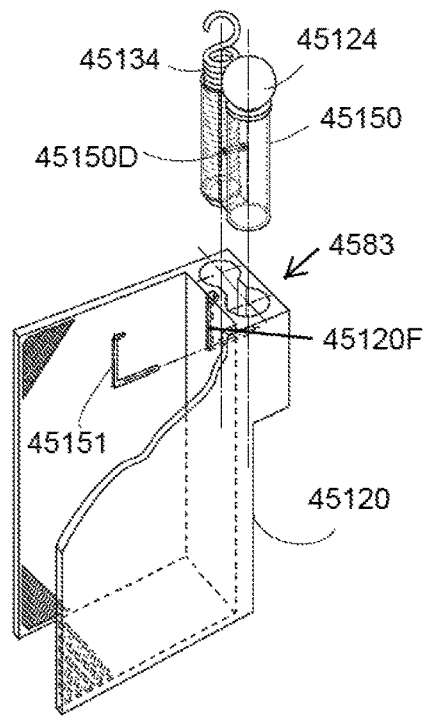
FIG. 45A
FIG. 45B

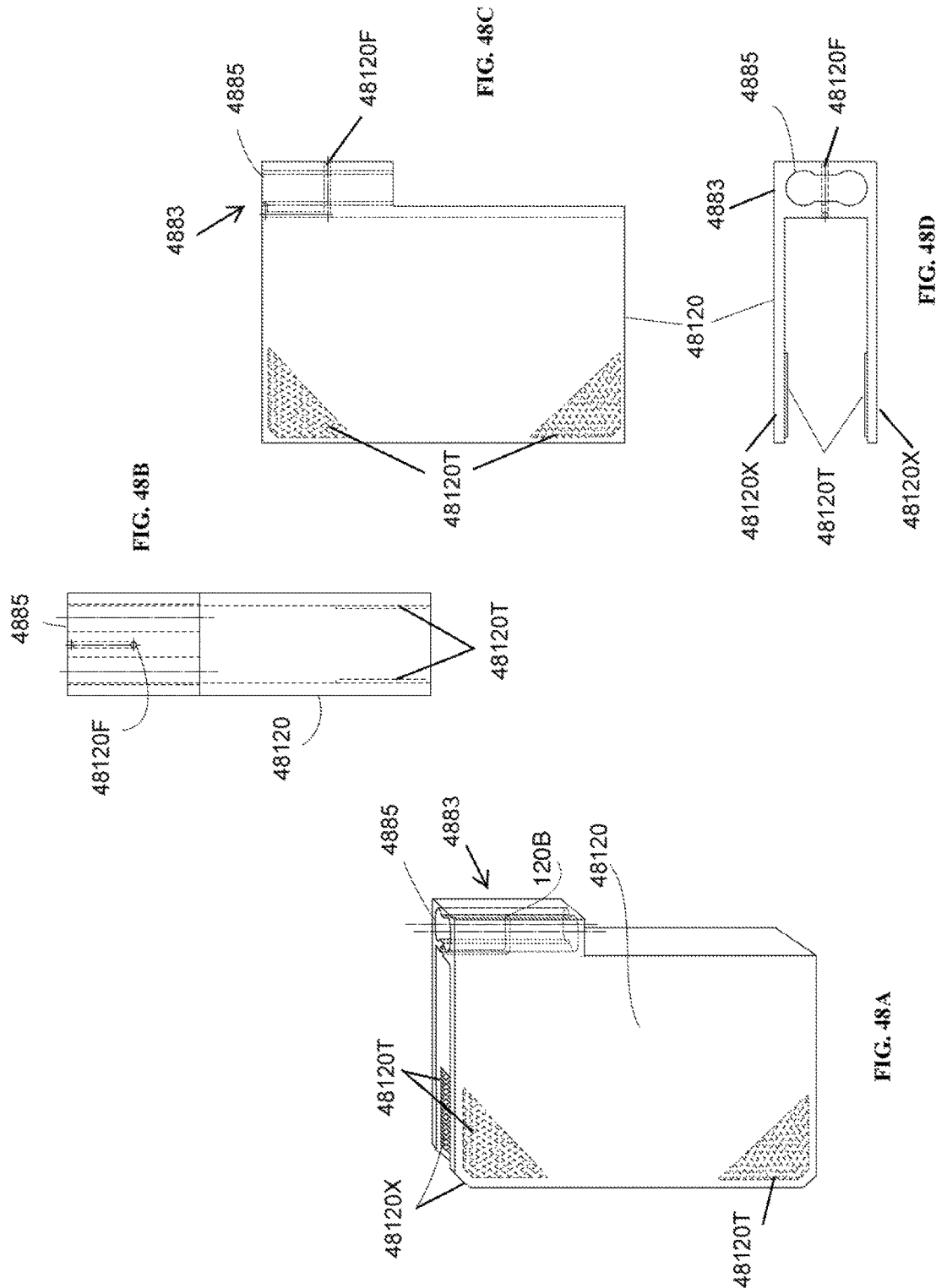

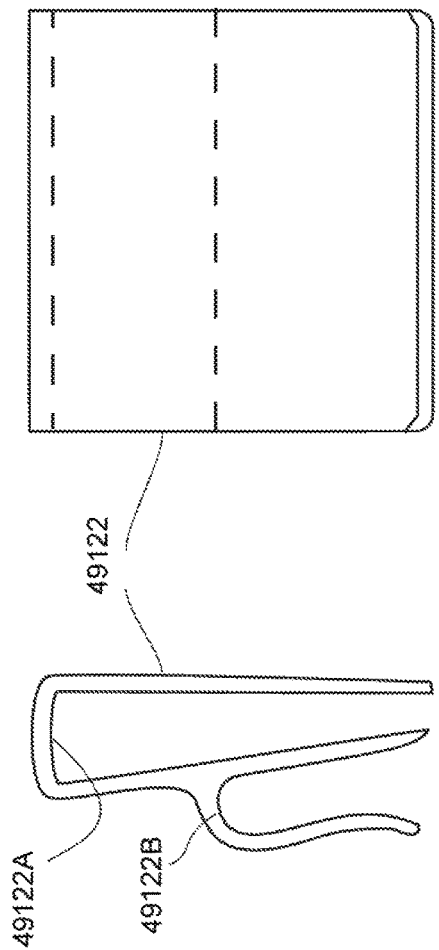
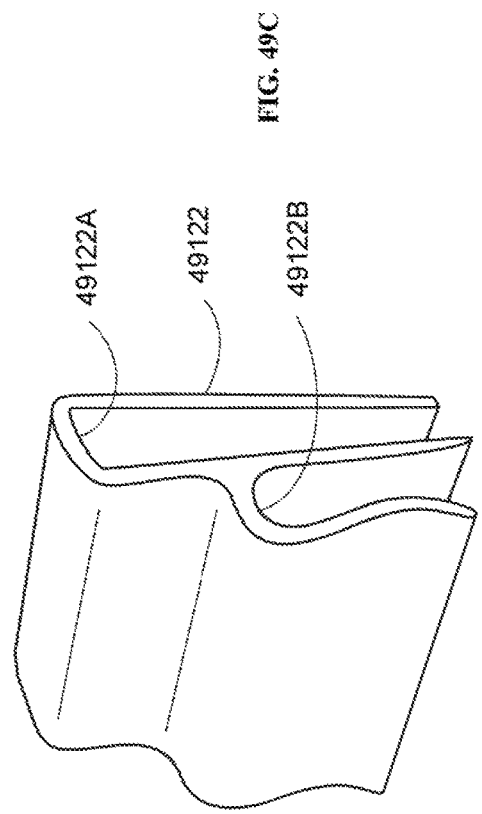

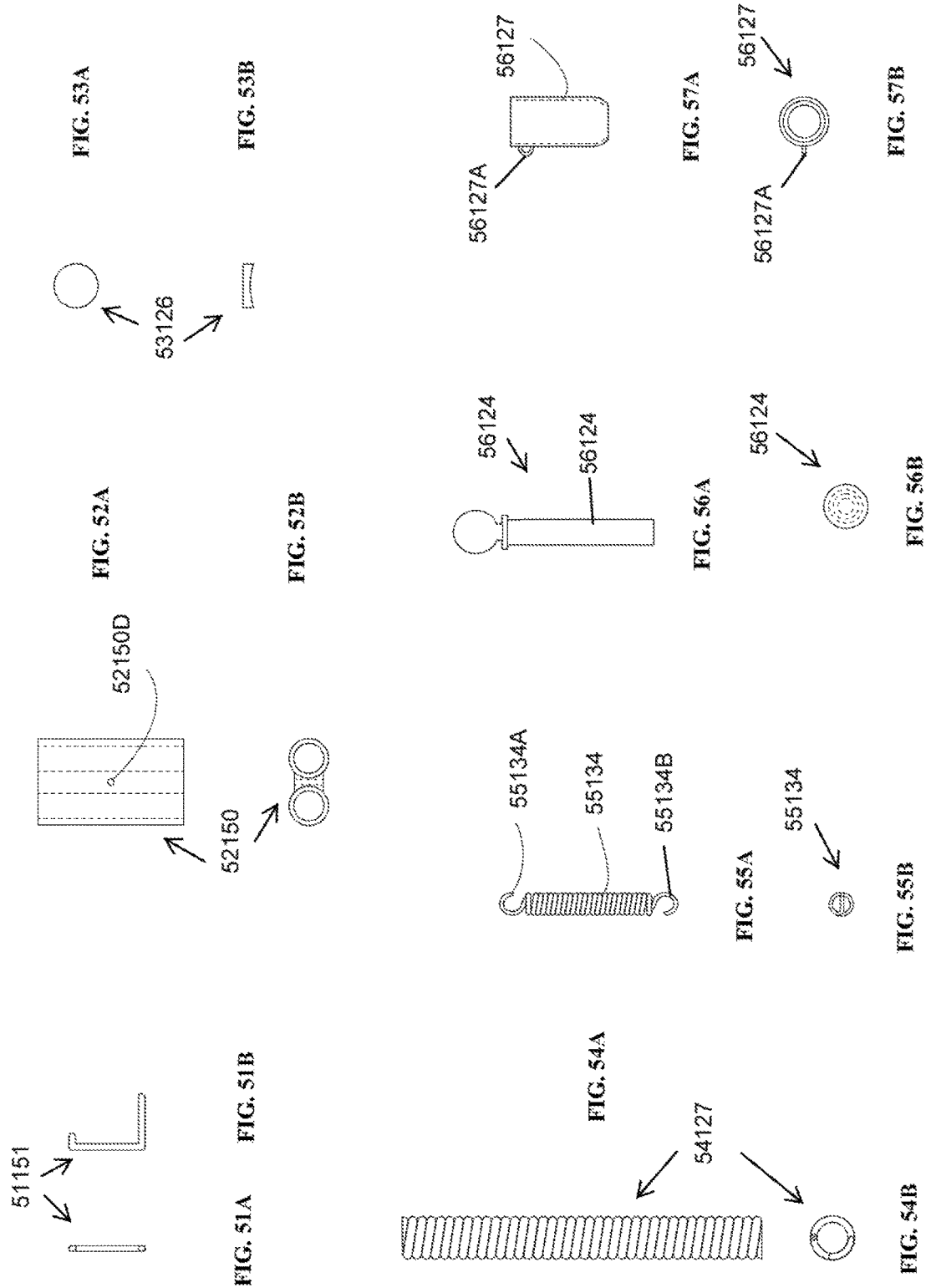

ADJUSTABLE SUN VISOR APPARATUS

CROSS-REFERENCE TO RELATED APPLICATIONS

This application claims the benefit of and is a continuation-in-part of U.S. Non-Provisional application Ser. No. 15/849,085, filed Dec. 20, 2017, which claims the benefit of U.S. Provisional Application No. 62/436,895, filed Dec. 20, 2016, and claims the benefit of Chinese Application No. 201710500585.7, filed on Jun. 27, 2017, and Chinese Application No. 201720756220.6, filed on Jun. 27, 2017, which are hereby incorporated by reference, to the extent that they are not conflicting with the present application.

BACKGROUND OF INVENTION

1. Field of the Invention

The invention relates generally vehicle accessories and more specifically to vehicle sun visors.

2. Description of the Related Art

In vehicles, a sun visor is typically provided at the front left and front right side seats of the vehicle to block light. This can be important since a driver's vision could be impaired by sunlight in their eyes, and the driver may need to block the light to see clearly while driving. The sun visors provided in most vehicles are not able to provide blockage of light on both a front and a side of the vehicle at once, and is only able to block light on either the front or the side at any given time. Blocking the light from only a side or only the front of the driver could still impair or restrict their vision. Existing sun visor add-ons that may help to block light on both the front and the side at the same time may not be usable in all different models and shapes of vehicle interiors, and also, may only be usable on a left side or only on a right side of a vehicle interior. Existing sun visor add-on devices or apparatuses may also damage the interior of the vehicle when being mounted to or assembled to the vehicle. Thus, there is a need for a solution to these problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an adjustable sun visor apparatus for blocking light from a front and a side in a vehicle, together with a sun visor of the vehicle, is provided, the adjustable sun visor apparatus comprising: an auxiliary visor unit having: a top visor end, a bottom visor end, a front visor side, and a rear visor side; an open-pipe arm having a first open-pipe arm end, a second open-pipe arm end opposite to the first open-pipe arm end, an opening extending between the first open-pipe arm end and the second open-pipe arm end on the bottom visor end, and a first length; a first extension extending downwards from the open-pipe arm on the front visor side of the opening, the first extension having a first horizontal slot; a second extension extending downwards from the open-pipe arm on the rear visor side of the opening, the second extension having a second horizontal slot; an auxiliary visor panel having a main panel body, a top visor portion extending upwards from the main panel body at the top visor end, a bar extending along the top visor portion at the top visor end, a first guide handle protruding from the top visor portion underneath the bar on the front visor side, and a second guide handle protruding from the top visor portion underneath the bar on the rear visor side; wherein the bar is adapted to fit into the opening to be received into the open-pipe arm such that the first guide handle protrudes out of the first horizontal slot, and the second guide handle protrudes out of the second horizontal slot; wherein the first extension and the second extension each have a second length, the second length being shorter than the first length, and wherein the first horizontal slot and the second horizontal slot each have a first slot end and a second slot end; wherein the first horizontal slot and the second horizontal slot each have a third length, the third length being shorter than the second length; and wherein the auxiliary visor panel is configured to block light; an automatic adjustment unit having: a bend-resistant spring having a first spring end and a second spring end; a ball having a round ball portion and a ball leg portion; a plug adapted to fit onto the round ball portion; a tension spring having a top hook and a bottom hook; a ball compartment having a ring adapted to receive the top hook, the ball compartment being adapted to house and pivot around the round ball portion and the plug; a twin capsule having a first interior space, a second interior space, and a capsule pin hole; a vertical clip having a top vertical clip end and a bottom vertical clip end, jaws adapted to grip the sun visor, and a twin capsule compartment opposite to the jaws and at the top vertical clip end, the twin capsule compartment being configured to receive the twin capsule, and the twin capsule compartment having a top compartment end, a bottom compartment end, a compartment pin hole, wherein the capsule pin hole and the compartment pin hole are aligned when the twin capsule is received into the twin capsule compartment; and a pin adapted to fit into the capsule pin hole and the compartment pin hole and thus secure the twin capsule inside of the twin capsule compartment; wherein the first interior space is adapted to receive the tension spring or the ball leg portion, and the second interior space is adapted to receive the tension spring or the ball leg portion, such that the ball and the tension spring are anchored into the vertical clip; wherein the first spring end is associated with the plug within the ball compartment, and the second spring end is associated with the second open-pipe arm end; and wherein the ball compartment is configured to pivot around the ball and the plug such that the associated first spring end of the bend-resistant spring pivots around the ball; a plurality of gripping elements, comprising: a horizontal clip having a first clip having a first height, and a second clip having a second height, wherein the second height is shorter than the first height, wherein the first clip is adapted to grip onto the sun visor, and the second clip is adapted to grip onto the auxiliary visor panel against the sun visor into a closed state or release the auxiliary visor panel from the sun visor into an open state; and a tube gripper having a front gripper side, a rear gripper side, and a curved gripping portion adapted to hold the open-pipe arm;

wherein the top hook is received into the ring, and the bottom hook is hooked onto the bottom compartment end; wherein the tension spring is configured to bias the top hook and the bottom hook together and thus bias the ring, the bend-resistant spring, and the open-pipe arm downwards; such that a movement of the sun visor causes a movement of the vertical clip gripped to the sun visor, and also causes the bar to move in a first direction or a second direction within the open-pipe arm, and thus prevents a movement of the auxiliary visor panel when the open-pipe arm is received into the tube gripper; and wherein the bar is adapted to move in the first direction and the bar is prevented from continuing in the first direction when the first guide handle and the second guide handle reach the first slot end, such that the bar can move in a second direction away from the first slot end until being prevented from continuing in the second direction when the first guide handle and the second guide handle reach the second slot end; wherein the sun visor blocks light from the front and the auxiliary visor panel blocks light from the side in the vehicle when the auxiliary visor panel is in the open state. Thus, an advantage is that adjustable sun visor apparatus is reversible and can easily be switched by the user from the right side of a vehicle to the left side of a vehicle, or vice versa, such that a single model of the adjustable sun visor may be used for both front seats of a vehicle. Another advantage may be that the adjustment of the sun visor apparatus for use in a left or a right side may be easily performed by the user by removing the tension spring and ball, and switching their positions or by removing the twin capsule from the twin capsule compartment and turning the twin capsule around. Another advantage may be that screws or other additional tools may not be needed for the user to perform the adjustments. Another advantage is that the vehicle need not be modified or damaged in order for the adjustable sun visor to be mounted into the vehicle. Another advantage may be that the automatic adjustment unit may provide stability to the auxiliary visor panel such that the panel's position remains the same even while the vehicle sun visor is being moved. Another advantage may be that the adjustable sun visor apparatus can be used in a variety of interior shapes and models, such as, for example, within most small vehicles including cars, motorboats, or small aircrafts.

In another aspect, an adjustable sun visor apparatus for blocking light from a front and a side in a vehicle, together with a sun visor of the vehicle, is provided, the adjustable sun visor apparatus comprising: an auxiliary visor unit having: a top visor end, a bottom visor end, a front visor side, and a rear visor side; an open-pipe arm having a first open-pipe arm end, a second open-pipe arm end opposite to the first open-pipe arm end, an opening extending between the first open-pipe arm end and the second open-pipe arm end on the bottom visor end, and a first length; a first extension extending downwards from the open-pipe arm on the front visor side of the opening, the first extension having a first horizontal slot; a second extension extending downwards from the open-pipe arm on the rear visor side of the opening, the second extension having a second horizontal slot; an auxiliary visor panel having a main panel body, a top visor portion extending upwards from the main panel body at the top visor end, a bar extending along the top visor portion at the top visor end, a first guide handle protruding from the top visor portion underneath the bar on the front visor side, and a second guide handle protruding from the top visor portion underneath the bar on the rear visor side; wherein the bar is adapted to fit into the opening to be received into the open-pipe arm such that the first guide handle protrudes out of the first horizontal slot, and the second guide handle protrudes out of the second horizontal slot; wherein the first extension and the second extension each have a second length, the second length being shorter than the first length, and wherein the first horizontal slot and the second horizontal slot each have a first slot end and a second slot end; wherein the first horizontal slot and the second horizontal slot each have a third length, the third length being shorter than the second length; and wherein the auxiliary visor panel is configured to block light; an automatic adjustment unit having: a bend-resistant spring having a first spring end and a second spring end; a ball having a round ball portion and a ball leg portion; a plug adapted to fit onto the round ball portion; a tension spring having a top hook and a bottom hook; a ball compartment having a ring adapted to receive the top hook, the ball compartment being adapted to house and pivot around the round ball portion and the plug; a twin capsule having a first interior space, and a second interior space; a vertical clip having a top vertical clip end and a bottom vertical clip end, a first means for gripping onto the sun visor, and a twin capsule compartment at the top vertical clip end, the twin capsule compartment being configured to receive the twin capsule, and the twin capsule compartment having a top compartment end, and a bottom compartment end; wherein the first interior space is adapted to receive the tension spring or the ball leg portion, and the second interior space is adapted to receive the tension spring or the ball leg portion, such that the ball and the tension spring are anchored into the vertical clip; wherein the first spring end is associated with the plug within the ball compartment, and the second spring end is associated with the second open-pipe arm end; and wherein the ball compartment is configured to pivot around the ball and the plug such that the associated first spring end of the bend-resistant spring pivots around the ball; a plurality of gripping elements, comprising: a horizontal clip having a first clip and a second clip, wherein the first clip is adapted to grip onto the sun visor, and the second clip is adapted to grip onto the auxiliary visor panel against the sun visor into a closed state or release the auxiliary visor panel from the sun visor into an open state; and a tube gripper having a second means for gripping the open-pipe arm; wherein the top hook is received into the ring, and the bottom hook is hooked onto the bottom compartment end; wherein the tension spring is configured to bias the top hook and the bottom hook together and thus bias the ring, the bend-resistant spring, and the open-pipe arm downwards; such that a movement of the sun visor causes a movement of the vertical clip gripped to the sun visor, and also causes the bar to move in a first direction or a second direction within the open-pipe arm, and thus prevents a movement of the auxiliary visor panel when the open-pipe arm is received into the tube gripper; and wherein the bar is adapted to move in the first direction and the bar is prevented from continuing in the first direction when the first guide handle and the second guide handle reach the first slot end, such that the bar can move in a second direction away from the first slot end until being prevented from continuing in the second direction when the first guide handle and the second guide handle reach the second slot end; wherein the sun visor blocks light from the front and the auxiliary visor panel blocks light from the side in the vehicle when the auxiliary visor panel is in the open state. Again, an advantage is that adjustable sun visor apparatus is reversible and can easily be switched by the user from the right side of a vehicle to the left side of a vehicle, or vice versa, such that a single model of the adjustable sun visor may be used for both front seats of a vehicle. Another advantage may be that the adjustment of the sun visor apparatus for use in a left or a right side may be easily performed by the user by removing the tension spring and ball, and switching their positions, or by removing the twin capsule from the twin capsule compartment and turning the twin capsule around. Another advantage may be that screws or other additional tools may not be needed for the user to perform the adjustments. Another advantage is that the vehicle need not be modified or damaged in order for the adjustable sun visor to be mounted into the vehicle. Another advantage may be that the automatic adjustment unit may provide stability to the auxiliary visor panel such that the panel's position remains the same even while the vehicle sun visor is being moved. Another advantage may be that the adjustable sun visor apparatus can be used in a variety of interior shapes and models, such as, for example, within most small vehicles including cars, motorboats, or small aircrafts.

In another aspect, an adjustable sun visor apparatus for blocking light from a front and a side in a vehicle, together with a sun visor of the vehicle, is provided, the adjustable sun visor apparatus comprising: an auxiliary visor unit configured to maintain a stable position of an auxiliary visor panel by having: an open-pipe arm having a first open-pipe arm end, a second open-pipe arm end opposite to the first open-pipe arm end, and an opening extending between the first open-pipe arm end and the second open-pipe arm end on the bottom visor end; a bar configured to be received into the opening, wherein the auxiliary visor panel extends downwards from the bar; a bend-resistant spring having a first spring end and a second spring end; a ball having a round ball portion and a ball leg portion; a plug adapted to fit onto the round ball portion; a tension spring having a top hook and a bottom hook; a ball compartment having a ring adapted to receive the top hook, the ball compartment being adapted to house and pivot around the round ball portion and the plug; a twin capsule having a first interior space, and a second interior space; a vertical clip having a top vertical clip end and a bottom vertical clip end, a first means for gripping onto the sun visor, and a twin capsule compartment at the top vertical clip end, the twin capsule compartment being configured to receive the twin capsule, and the twin capsule compartment having a top compartment end, and a bottom compartment end; wherein the first interior space is adapted to receive the tension spring or the ball leg portion, and the second interior space is adapted to receive the tension spring or the ball leg portion, such that the ball and the tension spring are anchored into the vertical clip; wherein the first spring end is associated with the plug within the ball compartment, and the second spring end is associated with the second open-pipe arm end; and wherein the ball compartment is configured to pivot around the ball and the plug such that the associated first spring end of the bend-resistant spring pivots around the ball; wherein the auxiliary visor panel is configured to block light; and wherein the tension spring is configured to bias the top hook received into the ring and the bottom hook received onto the bottom compartment end together and thus bias the ring, the bend-resistant spring, and the arm downwards; such that a movement of the sun visor causes a movement of the vertical clip and also causes the bar to move within the open-pipe arm and thus prevents a movement of the auxiliary visor panel. Again, an advantage is that adjustable sun visor apparatus is reversible and can easily be switched by the user from the right side of a vehicle to the left side of a vehicle, or vice versa, such that a single model of the adjustable sun visor may be used for both front seats of a vehicle. Another advantage may be that the adjustment of the sun visor apparatus for use in a left or a right side may be easily performed by the user by removing the tension spring and ball, and switching their positions or by removing the twin capsule from the twin capsule compartment and turning the twin capsule around. Another advantage may be that screws or other additional tools may not be needed for the user to perform the adjustments. Another advantage is that the vehicle need not be modified or damaged in order for the adjustable sun visor to be mounted into the vehicle. Another advantage may be that the automatic adjustment unit may provide stability to the auxiliary visor panel such that the panel's position remains the same even while the vehicle sun visor is being moved. Another advantage may be that the adjustable sun visor apparatus can be used in a variety of interior shapes and models, such as, for example, within most small vehicles including cars, motorboats, or small aircrafts.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 8A-8B illustrate the left side elevation view and another example of the left side elevation view, respectively, of the automatic adjustment unit of the adjustable sun visor device, according to an aspect.

FIGS. 14-15 illustrate the perspective views of the adjustable sun visor device and clipped to a vehicle sun visor and at two different angles, according to an aspect.

FIG. 16 illustrates the front perspective view of the range of motion the adjustable sun visor device 1640 may make, according to an aspect.

FIGS. 17A-17D illustrate the front cutaway view, the side elevation view, the top plan view, and the rear elevation view, respectively, of the vertical clip, according to an aspect.

FIGS. 18A-18B illustrate the front view and the side elevation view, respectively, of the bridge, according to an aspect.

FIGS. 20A-20D illustrate the rear view, the side view, the front view, and the top view, respectively, of the ball seat base, according to an aspect.

FIGS. 23A-23B illustrate the side view and the top view, respectively, of the plug, according to an aspect.

FIGS. 24A-24B illustrate the side view and the top view, respectively, of the bend-resistant spring, according to an aspect.

FIG. 25 illustrates the side view of the tension spring, according to an aspect.

FIGS. 26A-26B illustrate the front view and the top view, respectively, of the holder, according to an aspect.

FIGS. 27A-27B illustrate the front view and the top view, respectively, of the lock, according to an aspect.

FIGS. 29A-29B illustrate the front cutaway view and the rear cutaway view, respectively, of the holder, according to an aspect.

FIGS. 30A-30B illustrate the front view and the side elevation view, respectively, of the tube gripper, according to an aspect.

FIGS. 31A-31B illustrate the front view and the top view, respectively, of the double-sided adhesive pad, according to an aspect.

FIGS. 40A-40B illustrate a front elevation view and a side elevation sectional view, respectively, of an open-pipe arm, according to an aspect.

FIGS. 41A-41D illustrate a front elevation exploded view, a side elevation sectional view, a front elevation assembled view, and a side elevation sectional assembled view, respectively, of an open-pipe arm with an auxiliary visor panel, according to an aspect.

FIG. 42C illustrate an exploded left side elevation view of the twin capsule and the various components that fit together with the twin capsule, according to an aspect.

FIG. 42D illustrates an exploded left side elevation view of the twin capsule, the vertical clip, and the ball compartment assembled together with the bend-resistant spring and the ball and plug, according to an aspect.

FIG. 42E illustrates an exploded rear perspective view of the twin capsule, the vertical clip, the pin, the tension spring and the ball, according to an aspect.

FIGS. 43A-43B illustrate the left side elevation view and another example of the left side elevation view, respectively, of a first configuration of an automatic adjustment unit of the twin capsule sun visor device, and the corresponding elements assembled together with the automatic adjustment unit, according to an aspect.

FIGS. 45A-45B illustrate the partially exploded, left side elevation view and the partially exploded, rear perspective view, respectively, of the automatic adjustment unit of the twin capsule sun visor device in a second configuration, according to an aspect.

FIGS. 48A-48D illustrate the rear perspective view, the left side elevation view, the rear elevation view, and the top plan view, respectively, of the vertical clip, according to an aspect.

FIGS. 49A-49C illustrate the right side elevation view, the rear elevation view, and the front perspective view, respective, of the double horizontal clip, according to an aspect.

FIGS. 51A-51B illustrate the front elevation view and the left side elevation view, respectively, of the pin, according to an aspect.

FIGS. 52A-52B illustrate the left side elevation view and the top plan view, respectively, of the twin capsule, according to an aspect.

FIGS. 53A-53B illustrate the top plan view and the side elevation view, respectively, of the plug, according to an aspect.

FIGS. 54A-54B illustrate the side elevation view and the top plan view, respectively, of the bend-resistant spring, according to an aspect.

FIGS. 55A-55B illustrate the side elevation view and the top plan view, respectively, of the tension spring, according to an aspect.

FIGS. 56A-56B illustrate the side elevation view and the top plan view, respectively, of the ball, according to an aspect.

FIGS. 57A-57B illustrate the side elevation view and the top plan view, respectively, of the ball compartment, according to an aspect.

DETAILED DESCRIPTION

Figure 1:
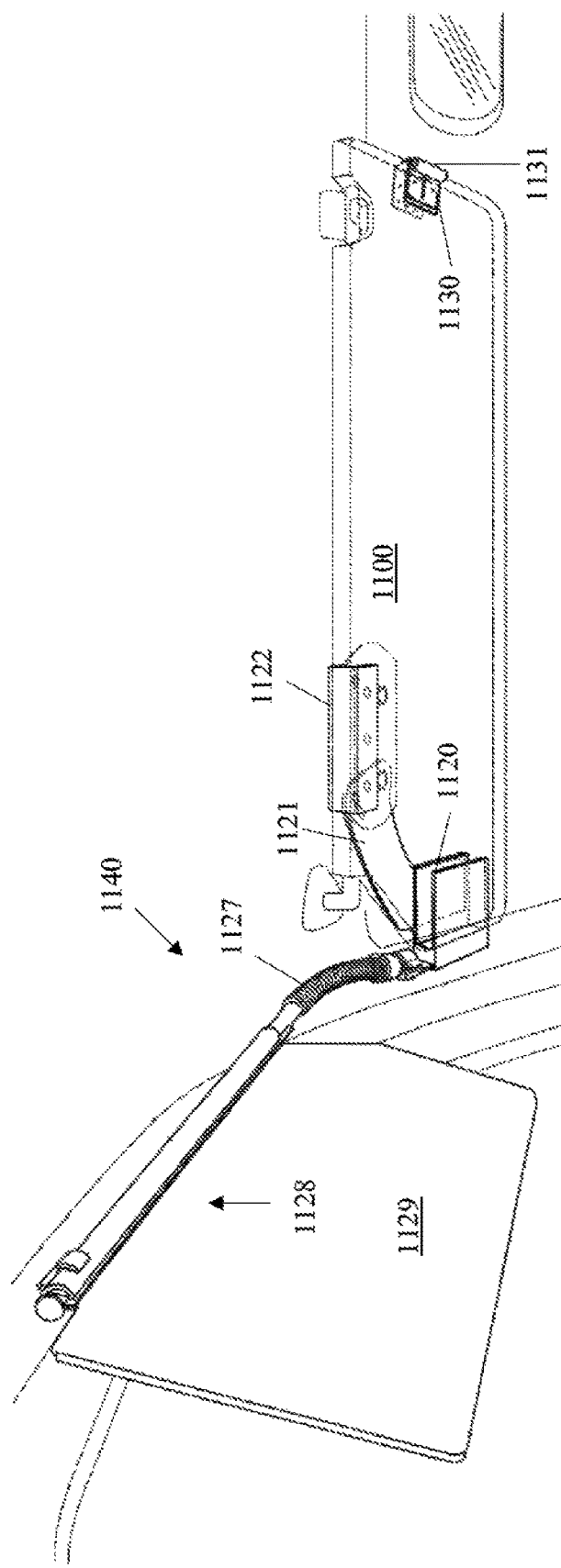
FIG. 1 illustrates a perspective view of an adjustable sun visor device mounted on a sun visor in use in an open state, within the left side interior of an exemplary vehicle, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 4120 and 6120, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a perspective view of an adjustable sun visor device 1140 ("adjustable sun visor device," "sun visor apparatus," "adjustable sun visor," "sun visor device," "apparatus," or "device") mounted on a sun visor 1100 in use in an open state, within the left side interior of an exemplary vehicle, according to an aspect. As shown as an example, the adjustable sun visor 1140 may be used on the left side, which may be a driver seat, and may be mounted onto an existing sun visor 1100 of a vehicle. The adjustable sun visor 1140 may be provided with a bridge 1121, a vertical clip 1120, a horizontal clip 1122, a holder 1130 and a lock 1131 associated with the holder 1130, a bend-resistant spring 1127, an auxiliary visor panel 1129, and an arm 1128. The auxiliary visor panel 1129 may be configured to block light and UV radiation, for example.

Figure 2:
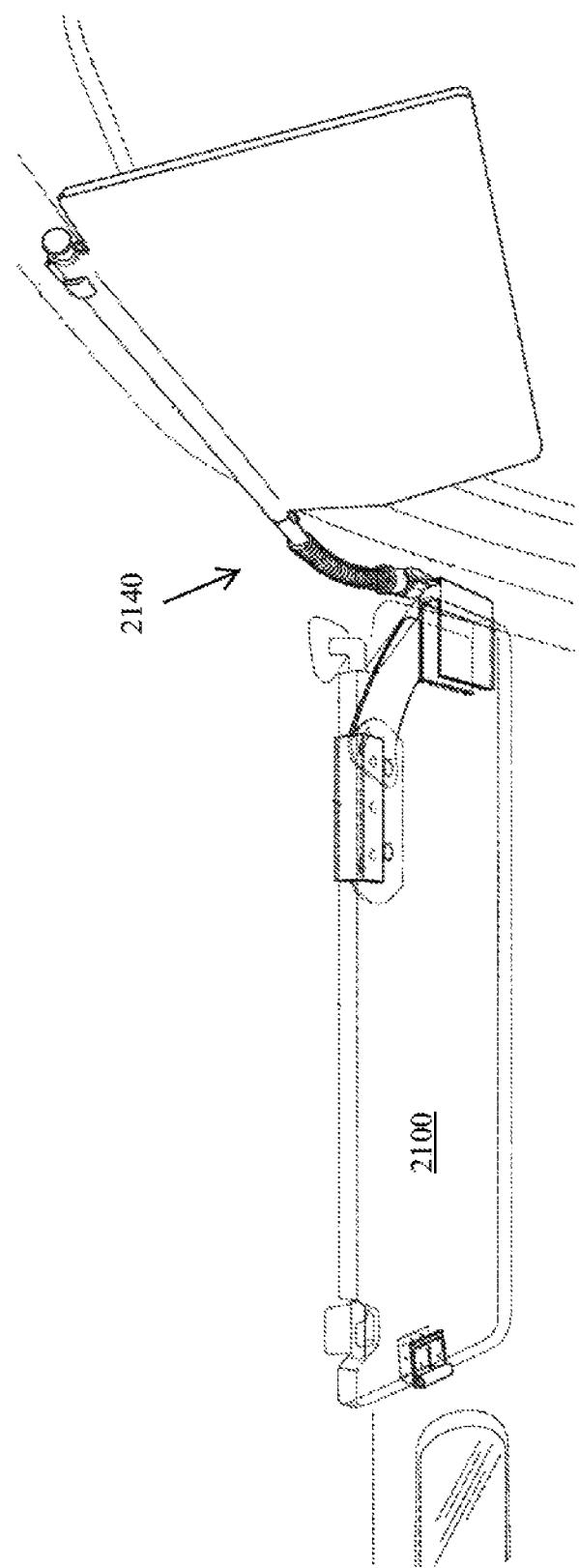
FIG. 2 illustrates a perspective view of an adjustable sun visor device mounted on a sun visor in use in an open state, within the right side interior of an exemplary vehicle, according to an aspect.

FIG. 2 illustrates a perspective view of an adjustable sun visor device 2140 mounted on a sun visor 2100 in use in an open state, within the right side interior of an exemplary vehicle, according to an aspect. As shown as an example, the adjustable sun visor 2140 may be used on the right side, which may be a passenger seat, and may be mounted onto an existing sun visor 2100 of a vehicle.

Figure 3:
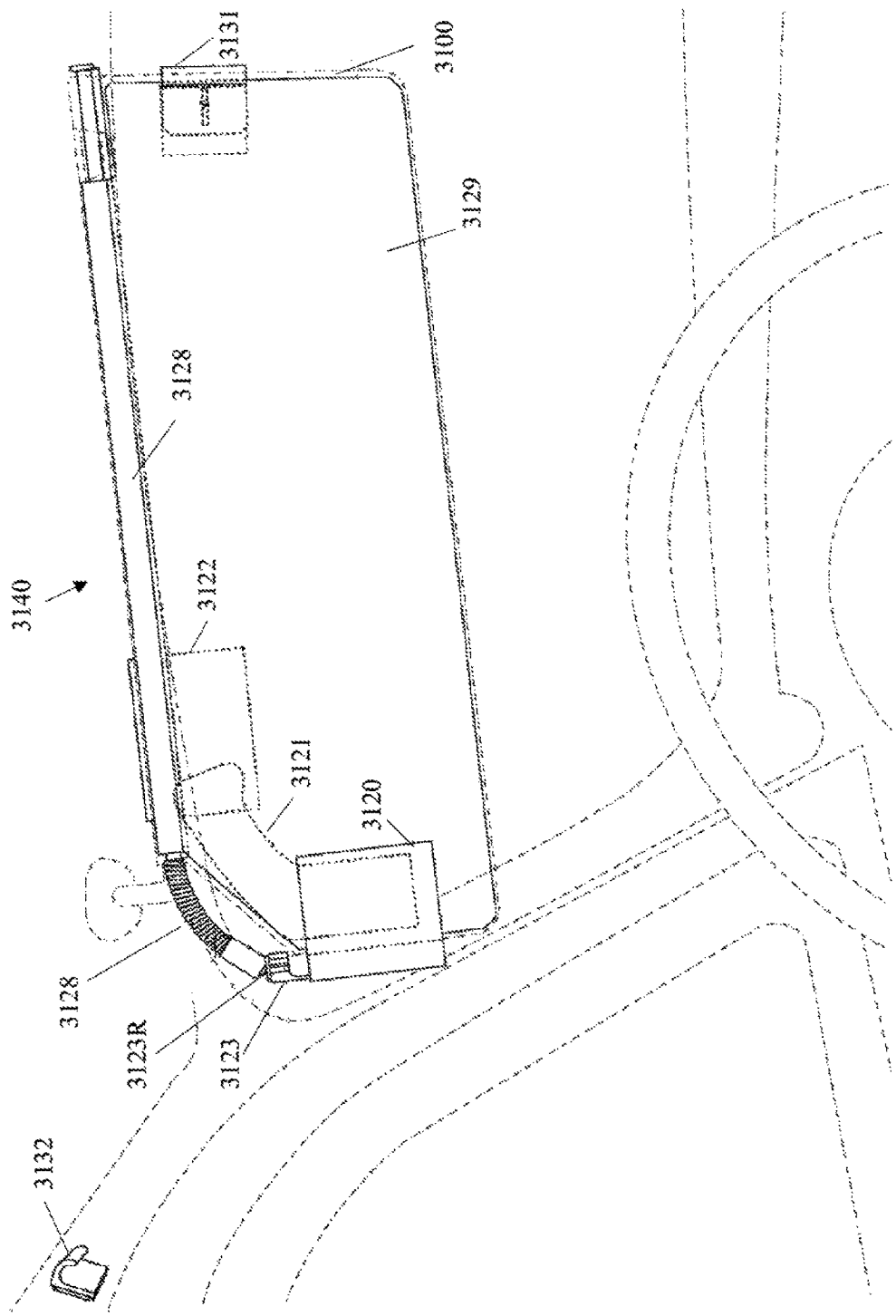
FIG. 3 illustrates a front view of the adjustable sun visor device mounted to an exemplary sun visor in a closed state, according to an aspect.

FIG. 3 illustrates a front view of the adjustable sun visor device 3140 mounted to an exemplary sun visor 3100 (represented by broken lines behind the visor device 3140) in a closed state, according to an aspect. As an example, the adjustable sun visor device may be closed or locked such that the visor panel 3129 is flat against the sun visor 3100 of a vehicle. The adjustable sun visor device 3140 may be provided with a horizontal clip 3122, a vertical clip 3120, a bridge 3121, a ball seat base 3123, a right spring guide 3123R.

Figure 4:
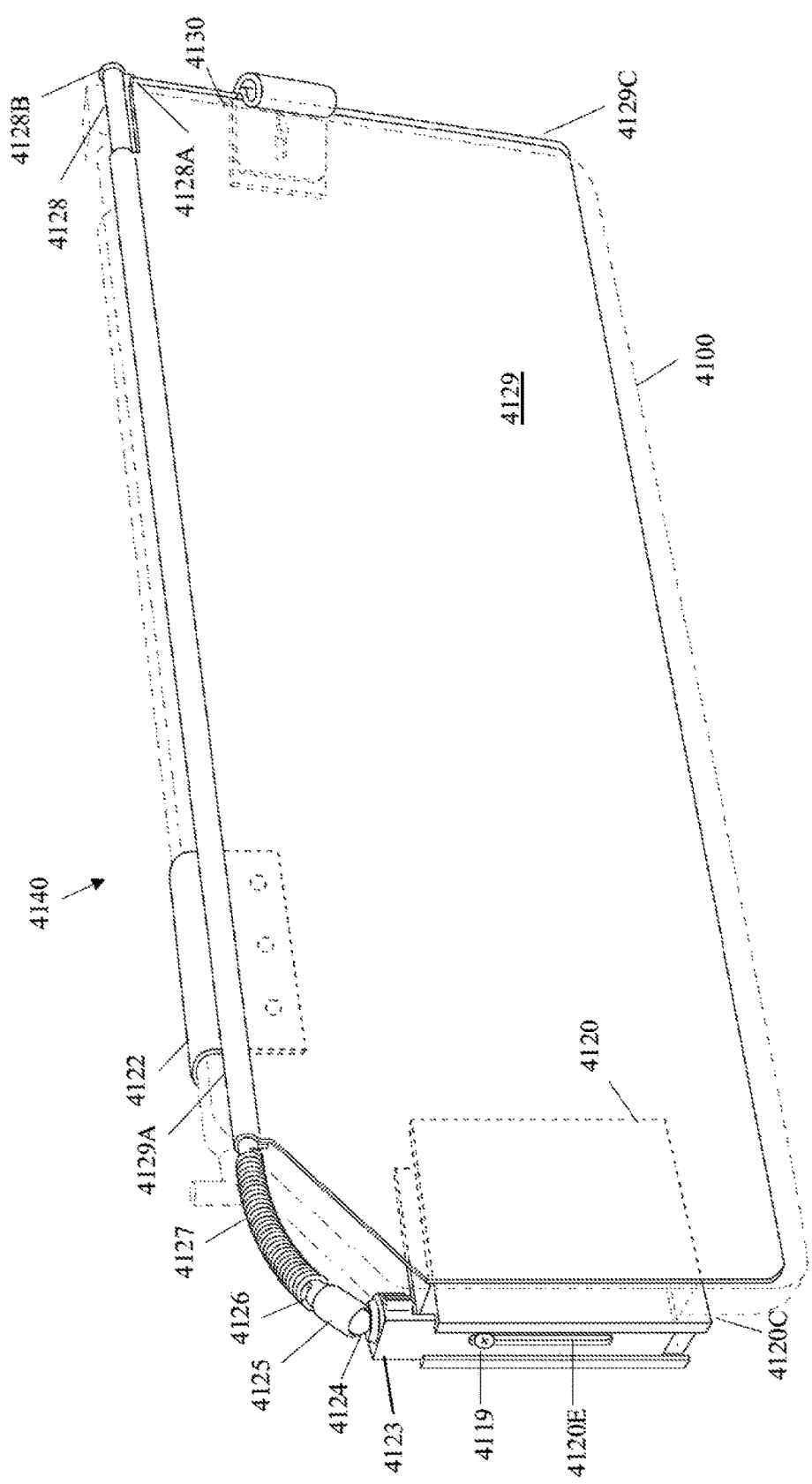
FIG. 4 illustrates the front perspective view of the assembled adjustable sun visor device, according to an aspect.

FIG. 4 illustrates the front perspective view of the assembled adjustable sun visor device 4140, according to an aspect. An exemplary sun visor 4100 is represented by broken lines behind the visor device 4140. The sun visor device 4140 may be provided with the following exemplary components: a horizontal clip 4122, a vertical clip 4120, a guide 4120C and a screw 4119 and associated screw hole 4120E within the guide 4120C, a ball 4124 and associated ball compartment 4125 and ball seat base 4123, a plug 4126, a bend-resistant spring 4127, an auxiliary visor panel 4129, an open seam tube 4129A, an arm 4128 and associated strip 4128A and arm end stopper 4128B, a holder 4130, and a key foot 4129C. The strip 4128A may extend from the first arm end to the second arm end, such that the strip prevents a circular movement of the arm.

Figure 5:
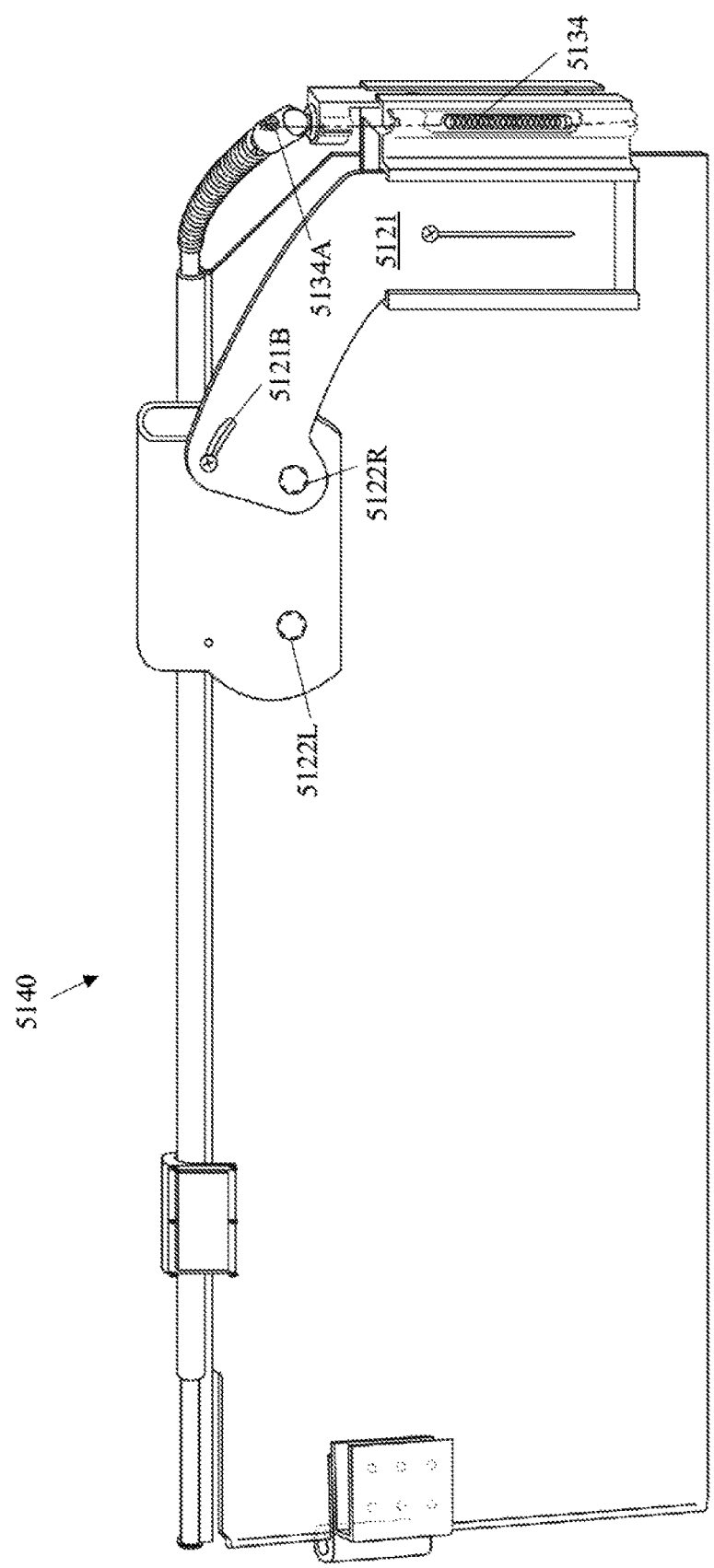
FIG. 5 illustrates the back perspective view of the assembled adjustable sun visor device, according to an aspect.

FIG. 5 illustrates the back perspective view of the assembled adjustable sun visor device 5140, according to an aspect. Exemplary components that may be visible from a back view are: a left knob 5122L and a right knob 5122R, a kidney-shaped slot 5121B, a bridge 5121, and a tension spring 5134 (shown in an enlarged detail and discussed further when referring to FIG. 7).

Figure 6A:
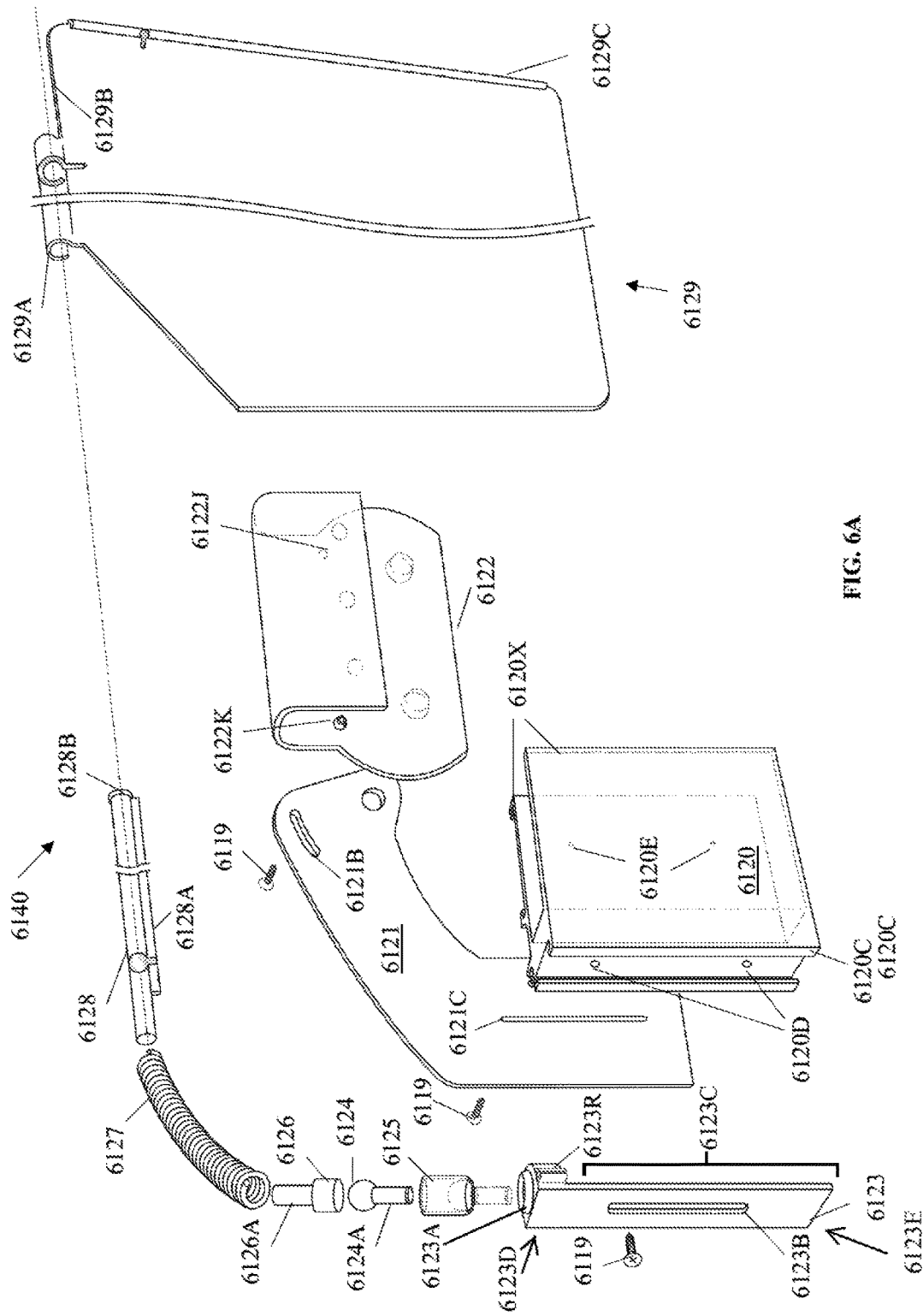
FIG. 6A illustrates the exploded front perspective view of the adjustable sun visor device, according to an aspect.

FIG. 6A illustrates the exploded front perspective view of the adjustable sun visor device 6140, according to an aspect. The adjustable sun visor device 6140 may include the following exemplary components. An arm 6128 may be provided with an associated strip 6128A and an arm end stopper 6128B. The arm 6128 may be associated with a bend-resistant spring 6127 which may receive a plug 6126, which may rest against a ball 6124 within an associated ball compartment 6125 on a ball seat base 6123. The ball 6124 may include a leg 6124A, and the plug 6126 may also include a leg 6126A. The ball seat base 6123 may have a bowl 6123A at a top end of the ball seat base ("top ball seat base end") 6123D, and the ball seat base 6123 may also be provided with an opposite bottom ball seat base end 6123E, a right spring guide 6123R, screws 6119, and a guide hole 6123B for a screw 6119. The ball seat base 6123 may also be provided with a straight ball seat base portion 6123C extending downwards from the bowl 6123A, as shown. A bridge 6121 may be provided with a bridge guide slot ("bridge guide slot" or "guide slot") 6121C and a kidney-shaped slot 6121B. The bridge 6121 may be associated with a vertical clip 6120 and a horizontal clip 6122. The vertical clip 6120 may be provided with jaws 6120X for holding the sun visor, for example. The vertical clip 6120 may also include guide rails 6120C and screw holes 6120D within the guide 6120C and screw holes 6120E within the body of the clip. The horizontal clip 6122 may be provided with a right knob 6122R and a left knob 6122L, and screw holes 6122K and 6122J. An auxiliary visor panel 6129 may be provided with a key foot 6129C, and an open seam tube 6129A, which may include an open space as indicated by 6129B. The auxiliary visor unit of the sun visor apparatus may be comprised of the arm 6128 and the auxiliary visor panel 6129. The arm 6128 and the auxiliary visor panel 6129 may be assembled together into the auxiliary visor unit by carrying out the following exemplary process. First, a user may position the arm 6128 such that the open portion of the open seam tube 6128A faces downwards. Next, the user may slide the arm 6128 from the open space 6129B of the auxiliary visor panel 6129 into the open seam tube 6128A. The arm end stopper 6128B may prevent the arm from slipping all the way into the open seam tube. Next, the user may push in the arm 6128 until the arm end 6128B is fully against the auxiliary visor panel 6129.

Figure 6B:
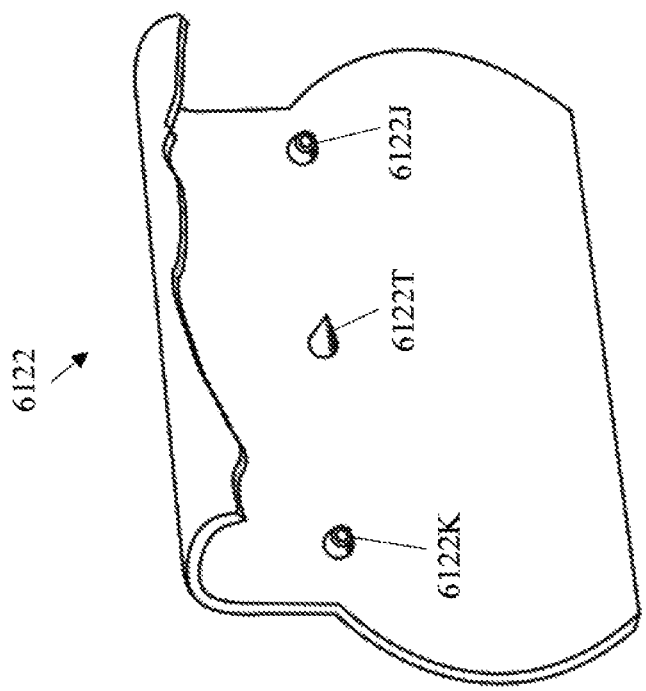
FIGS. 6B-6C illustrate the cutaway front view and the partial cutaway rear view, respectively, of the horizontal clip, according to an aspect.
Figure 6C:
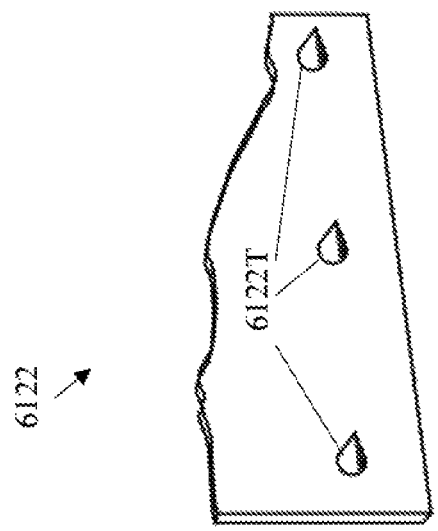

FIGS. 6B-6C illustrate the cutaway front view and the partial cutaway rear view, respectively, of the horizontal clip 6122, according to an aspect. As shown as an example, the horizontal clip 6122 may be provided with screw holes 6122K and 6122J. The interior surfaces of the horizontal clip 6122 may include teeth 6122T which may help provide the clip with a better grip to hold an object such as a sun visor.

Figure 7:
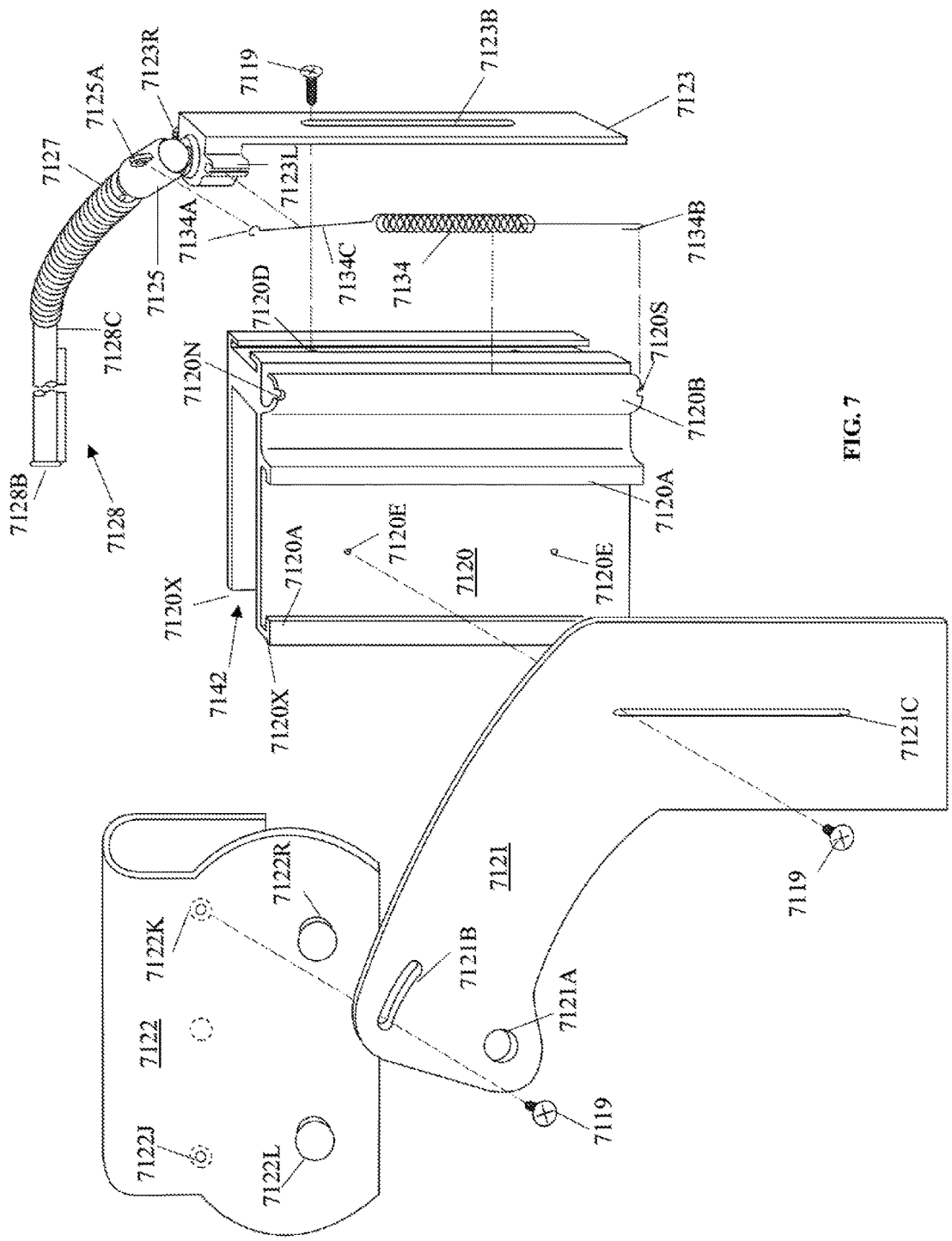
FIG. 7 illustrates the exploded rear perspective view of the bridge, the vertical clip, the horizontal clip, the ball seat base, and the arm of the adjustable sun visor device, according to an aspect.

FIG. 7 illustrates the exploded rear perspective view of the bridge 7121, the vertical clip 7120, the horizontal clip 7122, the ball seat base 7123, and the arm 7128 of the adjustable sun visor device, according to an aspect. As shown as an example, the tension spring 7134 may be provided with a top hook 7134A at a top end, and a bottom hook 7134B at a bottom end. The top hook 7134A may be a C-shaped hook, and the bottom hook 7134B may be a U-shaped hook. The ball seat base 7123 may be provided with a left notched spring guide 7123L, which may be configured to receive a neck 7134C of the top hook 7124A. The ball seat base 7123 may also include a similar right notched spring guide 7123R on the opposite side, which may receive a second tension spring, for example. As another example, one notched spring guide may remain empty while the second notched spring guide is in use, and the notched spring guide receiving the tension spring may switch according to the side of the vehicle that the adjustable sun visor device is being used on. The ball compartment 7125 may be provided with a ring 7125A which may be configured to receive the C-shaped hook 7134A. A screw 7119 received into a screw hole 7120D through a guide hole 7123B may be used to secure the ball seat base 7123 to the vertical clip 7120. The horizontal clip 7122 may include a left knob 7122L and a right knob 7122R.

The adjustable sun visor may be provided in parts such that a user may assemble the units of the apparatus. The apparatus may be comprised of a base unit, an automatic adjustment unit, an auxiliary visor unit, and a locking unit. The base unit of the adjustable sun visor device may be comprised of the vertical clip 7120, the bridge 7121, and the horizontal clip 7122.

The user may assemble the base unit by carrying out the following exemplary process. First, the section of the bridge 7121 having the guide [[hole]] slot 7121C may be inserted into the track or guide rails 7120A of the vertical clip 7120. The vertical clip 7120 may have jaws 7120X, between which an open portion 7142 may be provided. When the bridge 7121 is inserted into the track or guide rails 7120A, the curved top section of the bridge 7121 may be in a direction such that it extends outwards from the side of the vertical clip 7120 having the open portion 7142. Next, a screw 7119 received into a screw hole 7120E through the guide slot 7121C may be used to secure the bridge 7121 to the vertical clip 7120. Next, the horizontal clip 7122 may be connected to the bridge 7121, now connected to the vertical clip 7120, by pushing the right knob 7122R through and into the pivot hole 7121A of the bridge 7121. Next, a screw 7119 may be received into a screw hole 7122K through the kidney-shaped slot 7121B to secure the bridge 7121 to the horizontal clip 7122.

The sun visor apparatus may be fully assembled by a user after the base unit (discussed when referring to FIG. 7), the automatic adjustment unit (discussed when referring to FIGS. 8A-8B, and again when referring to FIGS. 43A-43B), the auxiliary visor unit (discussed when referring to FIG. 6A), and the locking unit (discussed when referring to FIGS. 28A-32B) or a double horizontal clip (discussed when referring to FIGS. 49A-49C have been fully assembled. The following exemplary process may be carried out. First, the base unit is connected with the automatic adjustment unit. The ball seat base 7123 may be aligned with the automatic adjustment unit, by sliding the section having the guide hole 7123A into the track between the guide rails 7120C of the vertical clip 6120. The bowl 7123A is kept in an upwards position on top of the ball seat base 7123 during this step, and also faces towards the direction of the two jaws 7120X of the vertical clip 6120. A screw 7119 is received into a screw hole 7120D through a guide slot 7121C to secure the automatic adjustment unit to the base unit. Next, the tension spring 7134 is pushed through an open seam of the spring compartment 7120B of the vertical clip 7120. The spring compartment 7120B may have an open top end and an open bottom end such that the tension spring 7134 may be inserted into the spring compartment and such that the tension spring top hook 7134A and bottom hook 7134B are passed through the open top and bottom. The bottom U-shaped hook 7134B is hooked onto the first notch 7120S. The top C-shaped hook 7134A is left free at this step. Next, the arm 7128, having a first end with an arm end 7128B and a second end 7128C, is pushed through the bend-resistant through such that the second end is received into the spring 7127. Next, the neck 7134C of the tension spring, which may be between the coiled portion of the spring and the top hook 7134A, is received into the left spring guide 7123L. Next, the top hook 7134C is hooked to the ring 7125A of the ball compartment 7125. Next, the adjustable sun visor device is mounted onto a sun visor of a vehicle. The sun visor may be flipped down from the ceiling of the vehicle and kept in a downwards position, as shown in FIG. 14. Next, the horizontal clip 7122 is disconnected from the apparatus by unscrewing and removing the screw 7119 from the screw hole 7122K of the bridge 121. The pivot hole 7121A of the bridge 7121 is removed from around the right knob 7122R of the horizontal clip 7122. Next, the horizontal clip 7122 is aligned such that the side having the knob 7122R faces the interior wall of the vehicle to which the apparatus is being mounted. The horizontal clip 7122 is aligned with the top edge of the sun visor and is slid towards the hinged end of the sun visor (as shown by 14122 in FIG. 14). The teeth in the interior of the horizontal clip (as shown in FIGS. 6B-6C) may help the horizontal clip to grip onto the sun visor. Next, with the sun visor still down, the vertical clip 7120 is slid from the bottom of the sun visor upwards along the hinged side until it reaches the top end of the sun visor (as shown by 14120 in FIG. 14). Again, similar to the horizontal clip, the teeth on the interior surface of the vertical clip (as shown by 17120T in FIG. 17C) may help the vertical clip to grip onto the sun visor. Next, the sun visor is flipped against the side window such that the user may access the vertical clip 7120, the bridge 7121, and the horizontal clip 7122 to make any necessary adjustments. The pivot hole 7121A is pushed onto and receives the right knob 7122R. The screw 7119 is used to secure the vertical clip 7120, the bridge 7121, and the horizontal clip 7122 all together by screwing it into screw hole 7122K through the kidney-shaped slot 7121B. The horizontal clip 7122 may also be provided with a screw hole 7122J and a left knob 7122L. Next, the holder (as shown by 14130 in FIG. 14) is mounted onto the sun visor while the apparatus faces the front windshield, by sliding the holder with the lock (as shown by 14131 in FIG. 14) onto the right side of the sun visor. The holder is positioned at the middle edge of the auxiliary visor panel (as shown by 6129 in FIG. 6A). The teeth in the interior of the holder (as shown by 29130B in FIG. 29A) may help the holder to grip onto the sun visor. The auxiliary visor panel (as shown by 6129 in FIG. 6A) is then pushed into the lock (as shown by 3131 in FIG. 3). The auxiliary visor panel (as shown by 6129 in FIG. 6A) may thus be held in this position by the lock 3131 such that the apparatus is in a closed state (as shown in FIG. 3). When the apparatus is needed in an open state, the auxiliary visor panel (as shown by 6129 in FIG. 6A) may be removed from the lock. When in an open state, the auxiliary visor panel (as shown by 6129 in FIG. 6A) may be held by a tube gripper ("tube gripper" or "gripper") mounted on the interior of the vehicle (as shown by 3132 in FIG. 3, and discussed further when referring to FIGS. 14-15).

As shown in FIG. 3, when the apparatus is mounted for use on a left-side driver's seat, both the sun visor 3100 and the auxiliary visor 3129 may be held together, and may also be folded up onto the ceiling of vehicle interior when not in use. To begin use of the apparatus, the sun visor may first be flipped down, and then the auxiliary visor may be taken out of the lock 3131 and flipped towards the side window of the vehicle (such as, for example, shown in FIG. 16). The tube within which the arm 3128 moves may then be inserted into the gripper 3132. The auxiliary panel 3129 may be able to be flipped to the side window without additional force. The upwards force of the bend-resistant spring 3128 may keep the arm 3128 in contact with the gripper 3132. At the same time, the open seam tube 3129A may maintain the angle of the auxiliary visor 3129 at a position parallel to the side window.

FIGS. 8A-8B illustrate the left side elevation view and another example of the left side elevation view, respectively, of the automatic adjustment unit of the adjustable sun visor device 8140, according to an aspect. The automatic adjustment unit may be used for maintaining stability and flexibility of the auxiliary visor unit, with relation to the existing sun visor of a vehicle and the side window of the vehicle. The automatic adjustment unit may be comprised of the ball seat 8123, the ball 8124, the plug 8126, the bend-resistant spring 8127, and the tension spring 8134.

The automatic adjustment unit may be assembled by carrying out the following exemplary process. First, the ball 8124 may be inserted into the ball compartment 8125, such that the leg 8124A of the ball extends downwards and out through the bottom end of the ball compartment 8125, such that the bottom end is sealed. Next, the plug 8126 may be inserted into the top end of the ball compartment, such that the leg 8126A extends upwards, thus securing the ball 8124 into the ball compartment 8125. Next, the ball compartment 8125 may be connected to the ball seat base 8123 by inserting the ball leg 8124A into the bowl 8123A, which may be provided with a hole for receiving the ball leg. The ball leg 8124A may be pushed inwards down into the bowl 8123A until the ball is securely held on the ball seat base 8123. Next, one end of the bend-resistant spring 8127 may be connected with the plug by inserting the plug leg 8126A into the spring 8127. The tension spring 8124 may force the ball compartment 8125 downwards around the center of the ball 8124. With no additional forces applied to the automatic adjustment unit, the bend-resistant spring 8127 may hold a first shape, as shown in FIG. 8A as an example. With an additional force applied to the automatic adjustment unit in the direction indicated by arrow 801AR, the bend-resistant spring 8127 may be pushed into a bent shape as shown in FIG. 8B as an example. With a force applied by the tension spring 8134 and an opposite force 801AR loaded onto the arm 8128, an automatic mechanical adjustment may be created.

Figure 10:
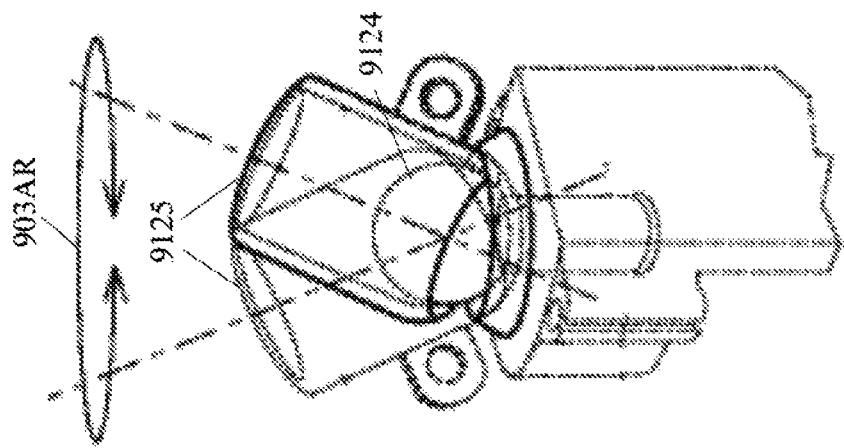
FIGS. 9-10 illustrate the sectional view and the perspective view, respectively, of the ball and ball compartment, according to an aspect.
Figure 9:
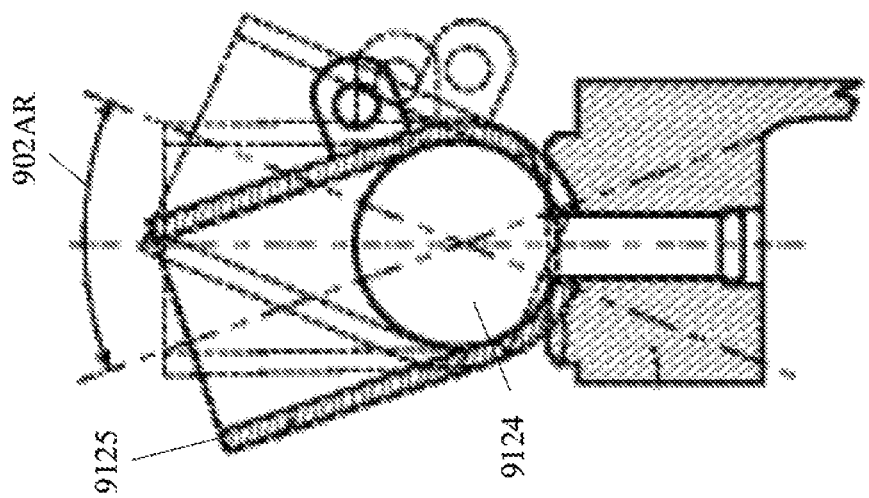

FIGS. 9-10 illustrate the sectional view and the perspective view, respectively, of the ball and ball compartment, according to an aspect. The ball compartment 9125 may pivot around the ball 9124. As an example, the ball compartment 9125 may pivot in the directions shown by arrows 902AR and 903AR.

Figure 11:
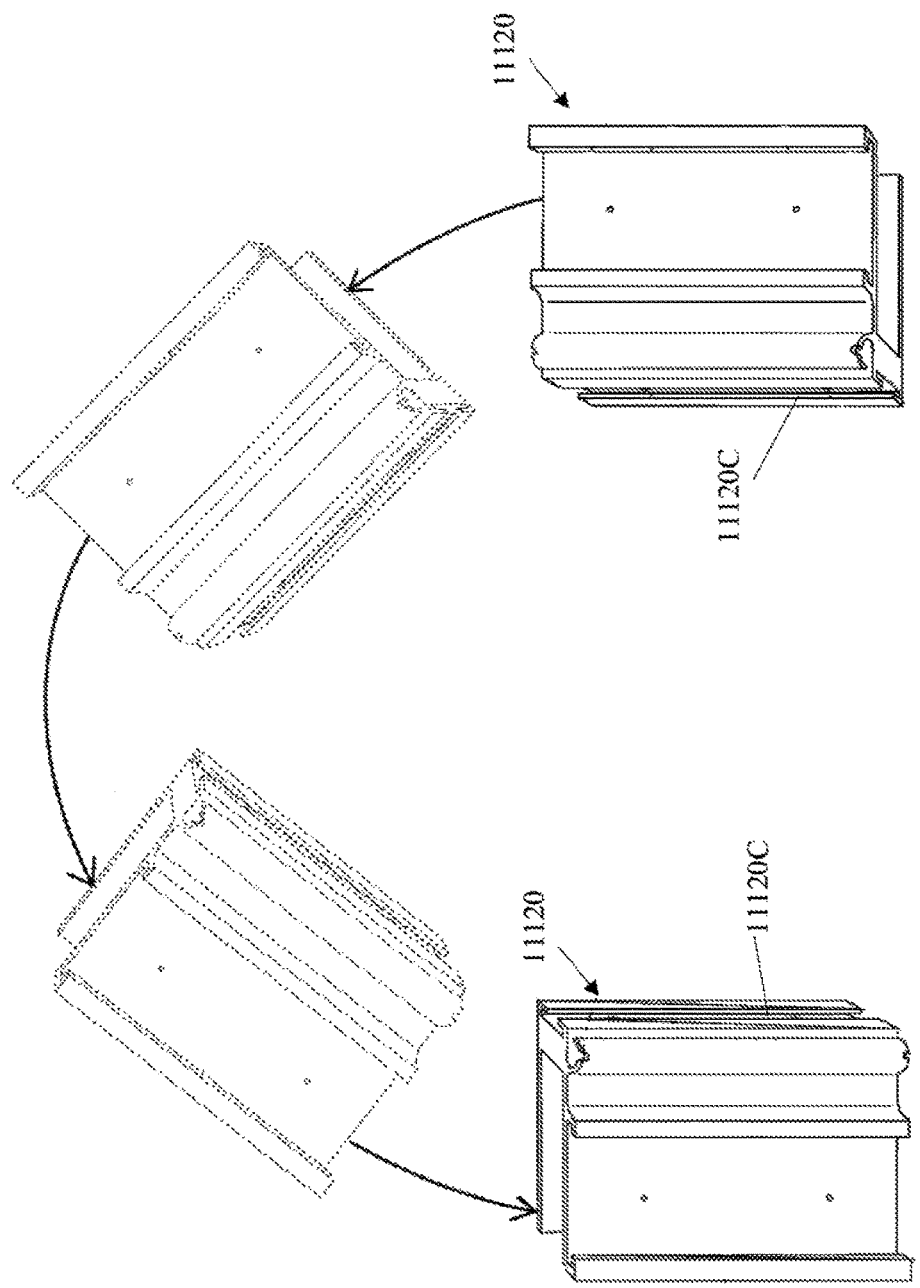
FIG. 11 illustrates an example of a process for adjusting the vertical clip in order to switch the automatic sun visor device from use on a right side of a vehicle to use on a left side of the vehicle, according to an aspect.

FIG. 11 illustrates an example of a process for adjusting the vertical clip 11120 in order to switch the automatic sun visor device from use on a right side of a vehicle to use on a left side of the vehicle, according to an aspect.

Figure 12:
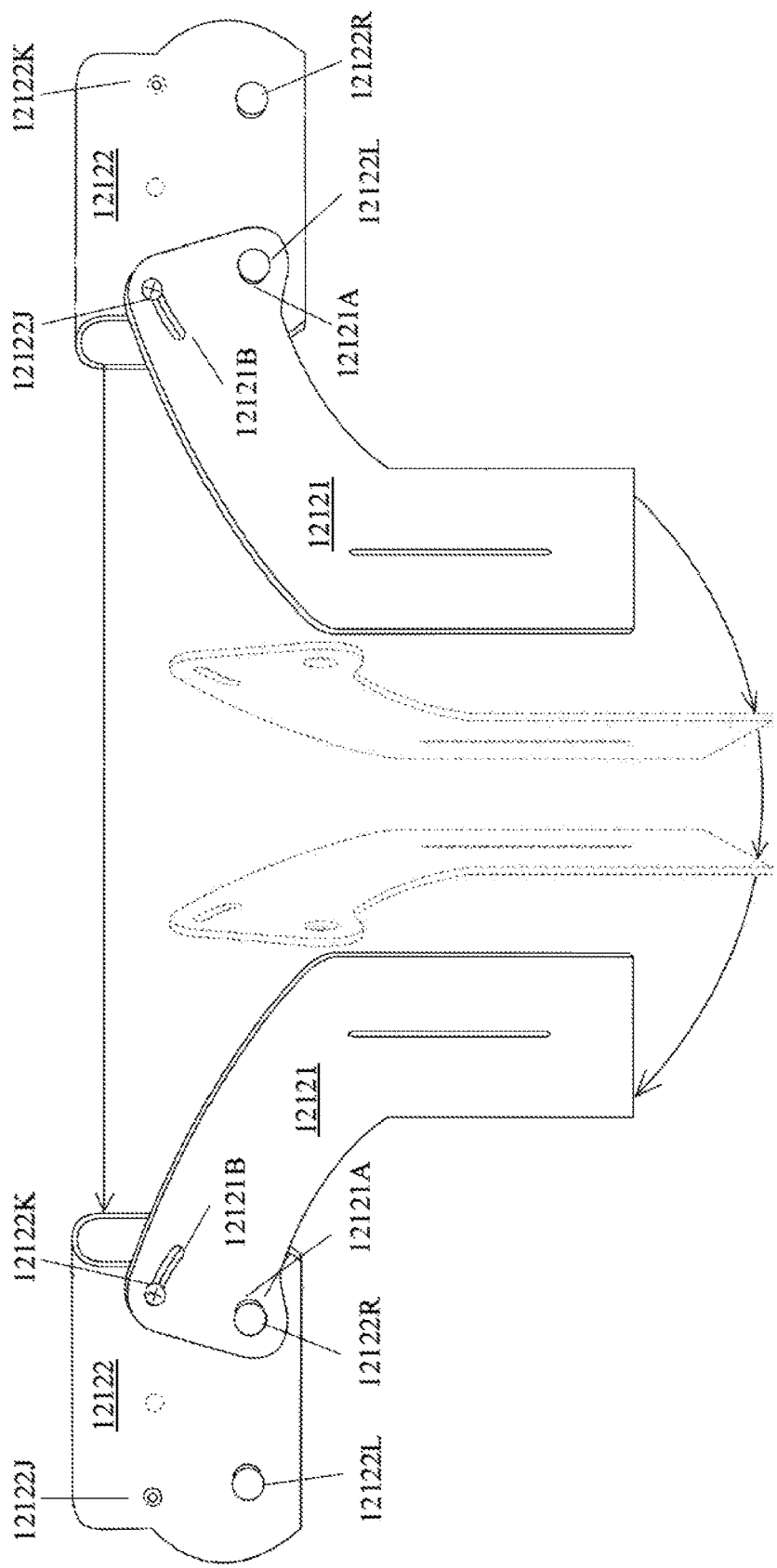
FIG. 12 illustrates an example of a process for adjusting the bridge and the horizontal clip in order to switch the automatic sun visor device from use on a right side of a vehicle to use on a left side of the vehicle, according to an aspect.

FIG. 12 illustrates an example of a process for adjusting the bridge and the horizontal clip in order to switch the automatic sun visor device from use on a right side of a vehicle to use on a left side of the vehicle, according to an aspect.

Figure 13:
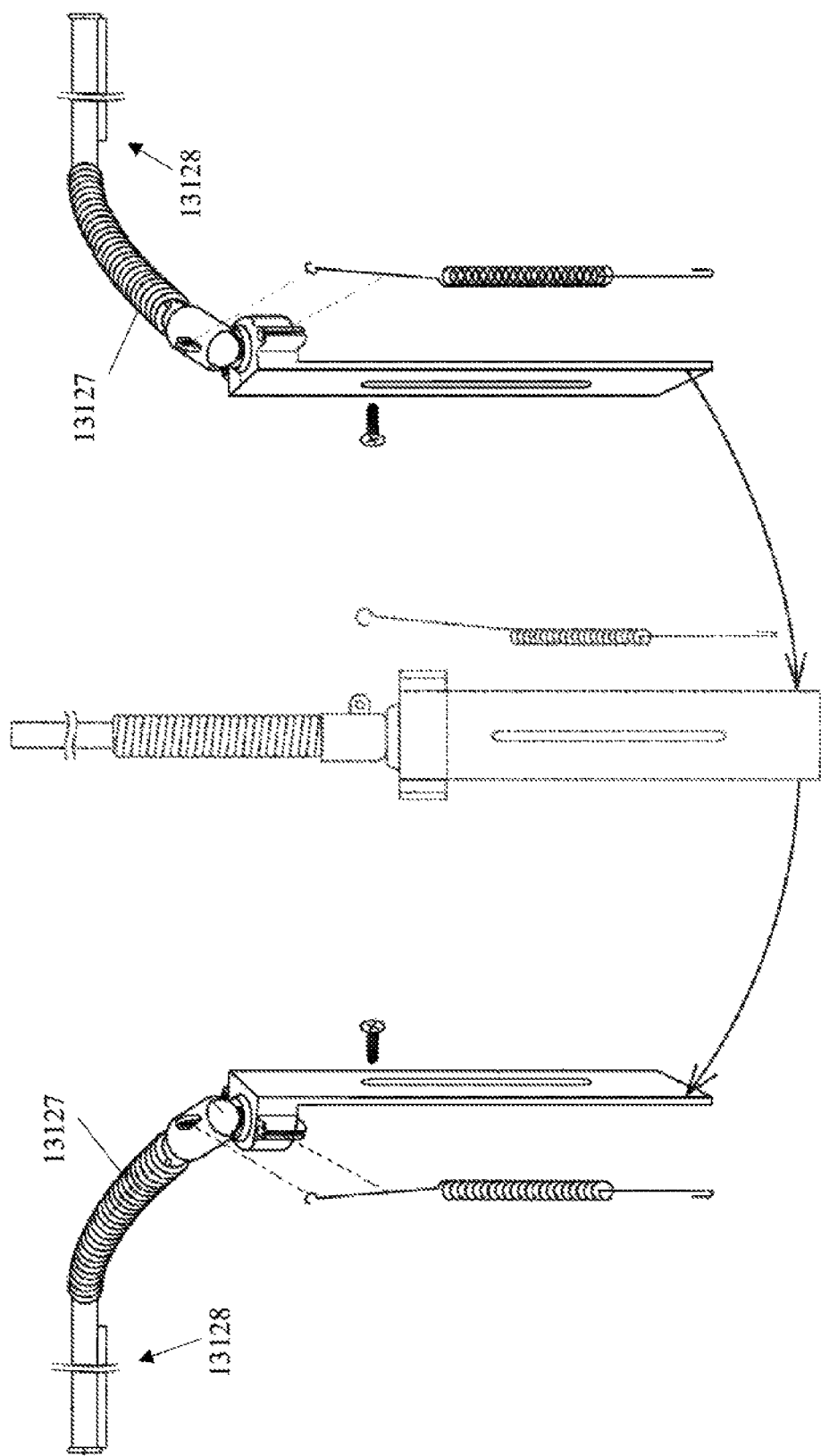
FIG. 13 illustrates an example of a process for adjusting the automatic adjustment unit in order to switch the automatic sun visor device from use on a right side of a vehicle to use on a left side of the vehicle, according to an aspect.

FIG. 13 illustrates an example of a process for adjusting the automatic adjustment unit in order to switch the automatic sun visor device from use on a right side of a vehicle to use on a left side of the vehicle, according to an aspect.

Referring to FIGS. 11-13, when the apparatus is assembled for use on a left side of a vehicle, it may also be converted for use on a right side of a vehicle by carrying out the following exemplary process. First, the base unit and the automatic adjustment units are disconnected from each other. Next, while the arm 13128 is connected to the bend-resistant spring 13127 within the automatic adjustment unit, the auxiliary visor (not shown in FIG. 13 for visual clarity) is disconnected from the arm 13128 by pushing the arm out through the open seam tube. Next, the vertical clip, bridge, and the horizontal clip of the base unit (as shown in FIGS. 6 and 7) are disconnected from each other. The vertical clip (as shown by 11120 in FIG. 11) is turned upside-down (180 degrees), with the track and guide rails 11120C facing in the opposite direction as they originally faced, as an example. Next, the bridge (as shown by 12121 in FIG. 12) is flipped 180 degrees horizontally. Next, the bridge is reconnected with the horizontal clip 12122. When assembled for use on a left side of a vehicle, the pivot hole 12121A of the bridge may be connected with the right knob 12122R and the kidney-shaped slot 12121B may be connected with the right screw hole 12122K. When assembled for use on a right side of a vehicle, the pivot hole 12121A of the bridge may be connected with the left knob 12122L and the kidney-shaped slot 12121B may be connected with the left knob 12122L. Next, the base unit and the automatic adjustment unit may be connected back together, by following the assembly instructions of paragraph 0037. When assembling the apparatus for a right side of a vehicle, the tension spring (as shown by 7134 in FIG. 7) may have its U-hook 7134B hooked onto the second notch 7120N instead of the first notch 7120S which may be used for assembling the apparatus for a left side of a vehicle.

FIGS. 14-15 illustrate the perspective views of the adjustable sun visor device 14140 and 15140 clipped to a vehicle sun visor 14100 and 15100 at two different angles, according to an aspect. As an example, the adjustable sun visor device may maintain its position and angle even while the sun visor of a vehicle is flipped or adjusted to various positions. A tube gripper 14132 or 15132 (shown in detail in FIGS. 32A-32B) may be mounted in the interior of a vehicle, such as, for example, to the frame of a left side window. The tube gripper may grip onto and hold the open seam tube 14129A and thus the arm 14128 or 15128 of the device. The tube gripper 14132 may be mounted onto the interior of the vehicle using, for example, double-sided adhesive 14133 or 14133. With the sun visor 14100 facing the front windshield of the vehicle as shown in FIG. 14, the sun visor may be flipped such as by a force in the directions indicated by arrows 146AR and 158AR. During these movements of the sun visor 14100 or 15100, the automatic adjustment unit (the ball, ball compartment, and bend-resistant spring) may make movements in order for the auxiliary visor 14129 or 15129 to remain in a stable position, and remain in the grip of the tube gripper 14132 or 15132. When a force is applied to the sun visor 14100 in the direction indicated by arrow 146AR, the force may be turned into a force as indicated by arrow 145AR. When a force is applied to the sun visor 15100 in the direction indicated by arrow 158AR, the force may be turned into a force as indicated by arrow 157AR. The forces 145AR or 157AR may push or pull the arm 14128 or 15128 in or out of through the open seam tube 14129A or 15129A as shown. A holder 14130 and an associated lock 14131 held together with a screw may also be provided as a locking unit, such that the locking unit may be mounted onto the sun visor 14100. The locking unit may be used to secure the adjustable sun visor device 14140 to the sun visor 14100.

FIG. 16 illustrates the front perspective view of the range of motion the adjustable sun visor device 16140 may make, according to an aspect. The force indicated by arrow 169AR may indicate the direction that the auxiliary visor panel 16129 is biased towards due to the natural state of the bend-resistant spring 16127, when no additional forces are present. An additional force may be present when, for example, a ceiling in the interior of a vehicle pushes down in the direction of arrow 1610AR onto the auxiliary visor panel 16129, which may cause the auxiliary visor panel 16129 to move into the direction indicated by arrow 1610AR. As another example, a user may press down on the auxiliary visor panel 16129. A force in the direction of 1610AR may cause the bend-resistant spring 16127 to bend and may cause the adjustable sun visor device 16140 to be in a closed state.

FIGS. 17A-17D illustrate the front cutaway view, the side elevation view, the top plan view, and the rear elevation view, respectively, of the vertical clip 17120, according to an aspect.

FIGS. 18A-18B illustrate the front view and the side elevation view, respectively, of the bridge 18121, according to an aspect.

Figure 19B:
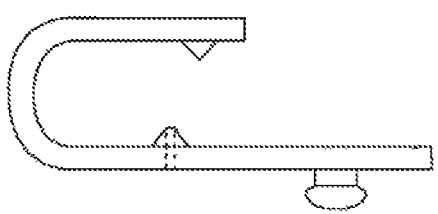
FIGS. 19A-19C illustrate the front view, the side elevation view, and the bottom view, respectively, of the horizontal clip, according to an aspect.
Figure 19A:
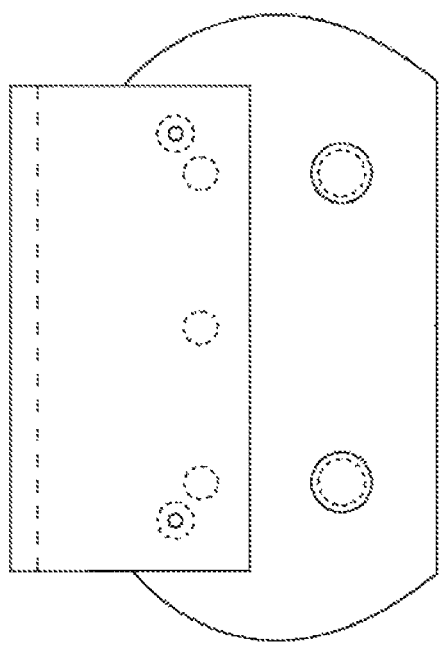
Figure 19C:

FIGS. 19A-19C illustrate the front view, the side elevation view, and the bottom view, respectively, of the horizontal clip, according to an aspect.

FIGS. 20A-20D illustrate the rear view, the side view, the front view, and the top view, respectively, of the ball seat base 20123, according to an aspect.

Figures 21A, 21B:
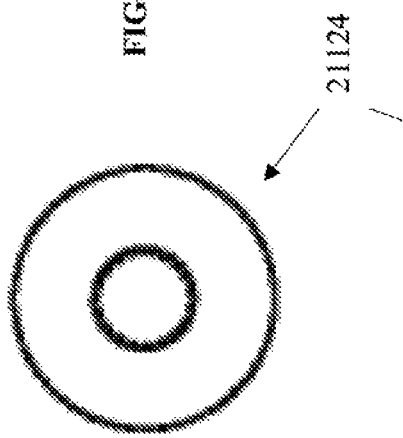
FIGS. 21A-21B illustrate the bottom view and the side view, respectively, of the ball, according to an aspect.

FIGS. 21A-21B illustrate the bottom view and the side view, respectively, of the ball 21124, according to an aspect.

Figures 22A, 22B:
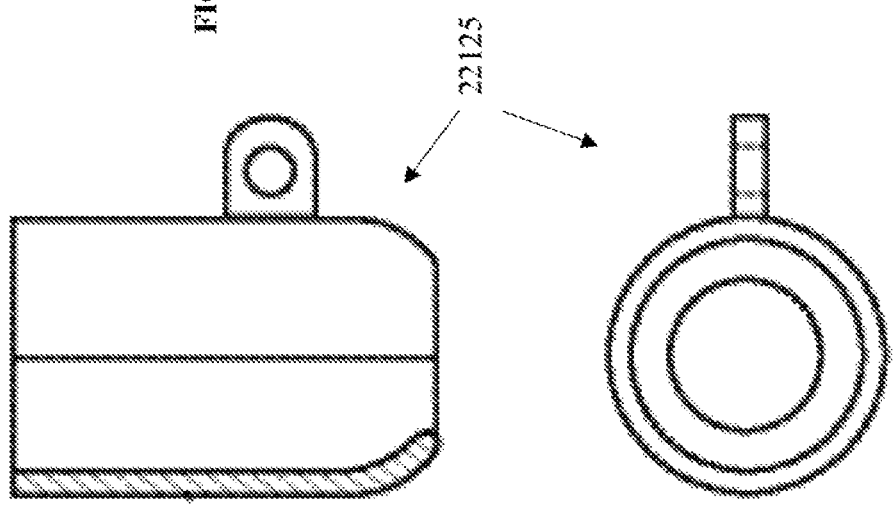
FIGS. 22A-22B illustrate the side view and the top view, respectively, of the ball compartment, according to an aspect.

FIGS. 22A-22B illustrate the side view and the top view, respectively, of the ball compartment 22125, according to an aspect.

FIGS. 23A-23B illustrate the side view and the top view, respectively, of the plug 23126, according to an aspect.

FIGS. 24A-24B illustrate the side view and the top view, respectively, of the bend-resistant spring 24127, according to an aspect.

FIG. 25 illustrates the side view of the tension spring 25134, according to an aspect.

FIGS. 26A-26B illustrate the front view and the top view, respectively, of the holder 26130, according to an aspect.

FIGS. 27A-27B illustrate the front view and the top view, respectively, of the lock 27131, according to an aspect.

Figure 28B:
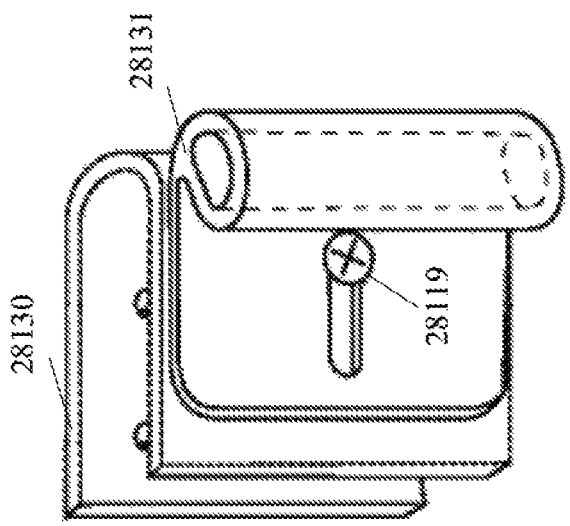
FIGS. 28A-28B illustrate the front perspective exploded view and the front perspective assembled view, respectively, of the holder and lock components of a first portion of a locking unit, according to an aspect.
Figure 28A:
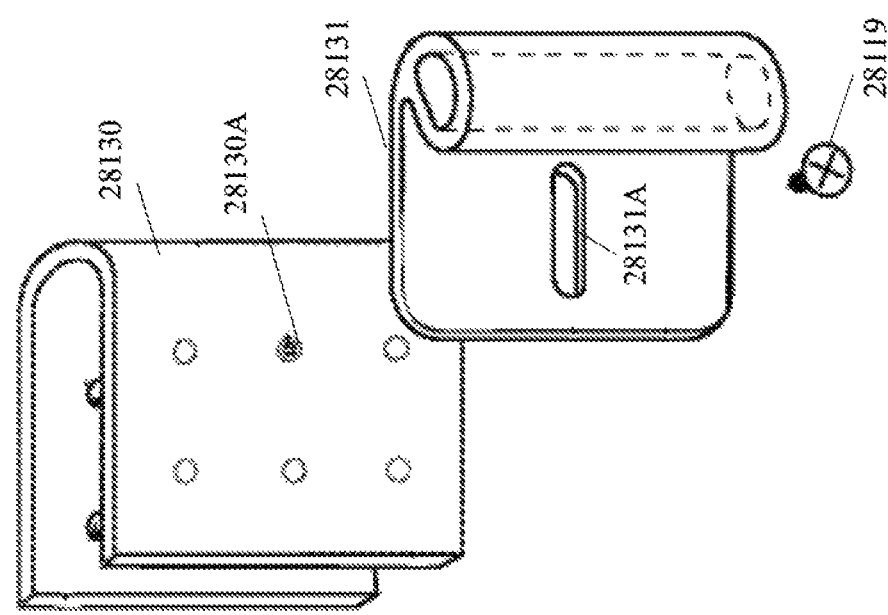

FIGS. 28A-28B illustrate the front perspective exploded view and the front perspective assembled view, respectively, of the holder 28130 and lock 28131 components of a first portion of a locking unit, according to an aspect. A screw 28119 may be used to assemble the holder 28130 and lock 28131 together, for example. A user may assemble the first portion of the locking unit by carrying out the following exemplary process. First, the lock 28131 may be positioned over the side of the holder 28130 having a screw hole 28130A. The lock guide hole 28131A is next positioned over the screw hole 28130A. Next, the screw 28119 is screwed into the screw hole to secure the holder 28130 and lock 28131 together.

FIGS. 29A-29B illustrate the front cutaway view and the rear cutaway view, respectively, of the holder 29130, according to an aspect. The holder may include teeth 29130B on the inner surface which may assist in gripping the sun visor, for example.

FIGS. 30A-30B illustrate the front view and the side elevation view, respectively, of the tube gripper 30132, according to an aspect.

FIGS. 31A-31B illustrate the front view and the top view, respectively, of the double-sided adhesive pad ("double-sided adhesive pad" or "double adhesive pad") 31133, according to an aspect.

Figure 32B:
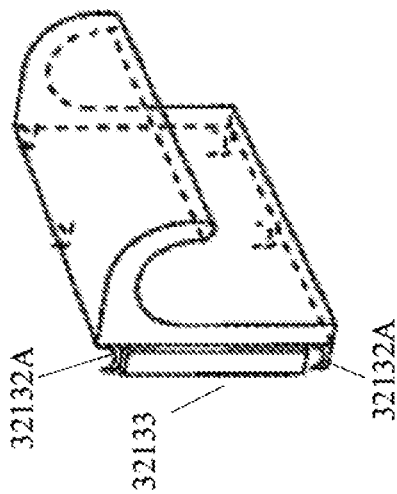
FIGS. 32A-32B illustrate the exploded front perspective view of the double adhesive pad and the stop, and the front perspective view of the double adhesive pad adhered to the stop, respectively, according to an aspect.
Figure 32A:
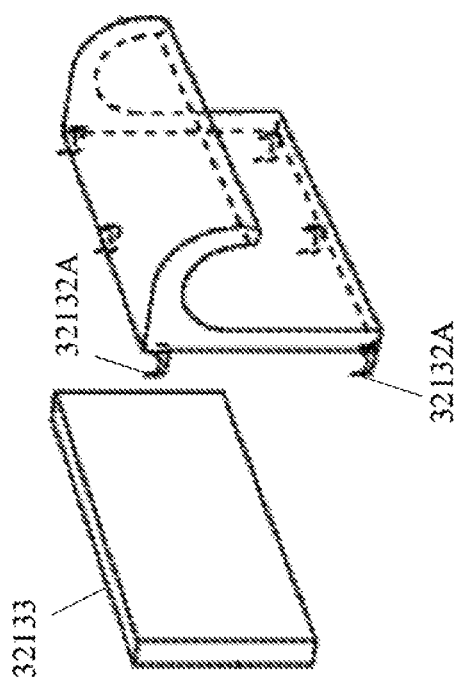

FIGS. 32A-32B illustrate the exploded front perspective view of the double adhesive pad and the stop, and the front perspective view of the double adhesive pad adhered to the stop, respectively, according to an aspect. The tube gripper 30132 of FIGS. 30A-30B together with the double adhesive pad 31133 of FIGS. 31A-32A may comprise a second portion of the locking unit. The second portion of the locking portion may be assembled by carrying out the following exemplary process. First, the double adhesive pad 32133, which may be provided with an adhesive on both sides, may be adhered to the tube gripper 32132 between the upward hooks 32132A. Next, the outward facing side of the double adhesive pad may be adhered to the interior of a vehicle such that the tube gripper may hold the arm of the adjustable sun visor device when the auxiliary panel is bent towards a side window of the car.

Figure 33A:
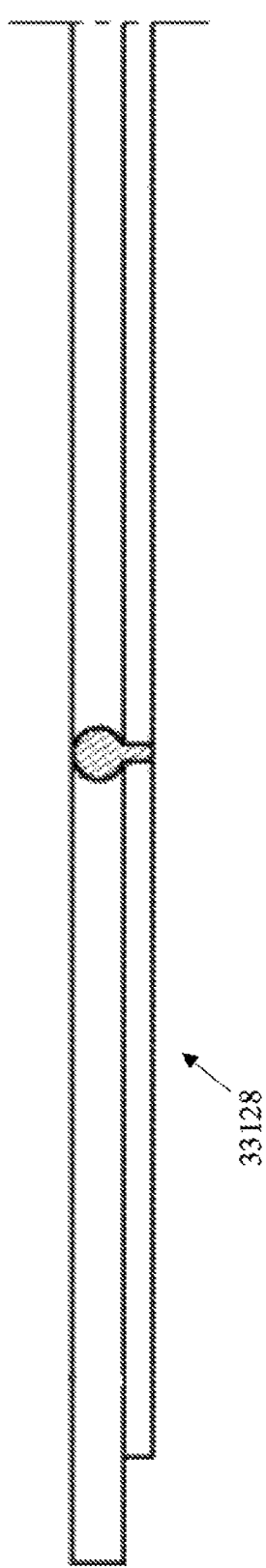
FIGS. 33A-33B illustrate the sectional side view and the side view, respectively, of the arm, according to an aspect.
Figure 33B:
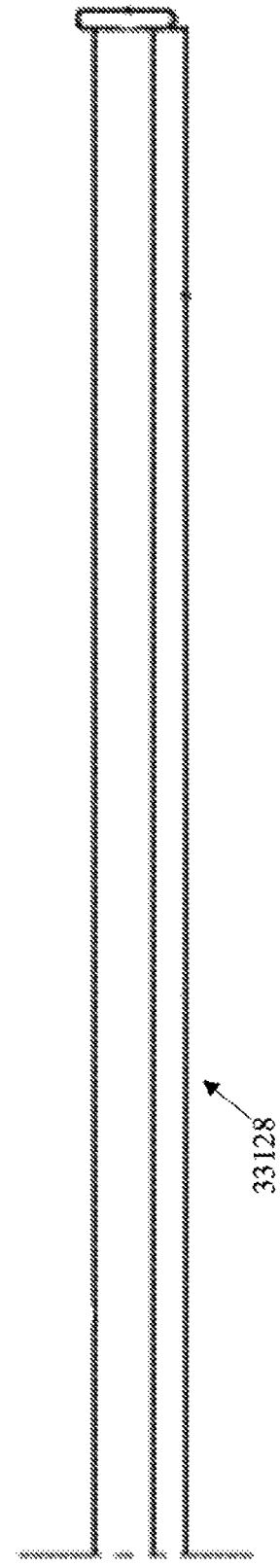

FIGS. 33A-33B illustrate the sectional side view and the side view, respectively, of the arm 33128, according to an aspect.

Figure 34A:
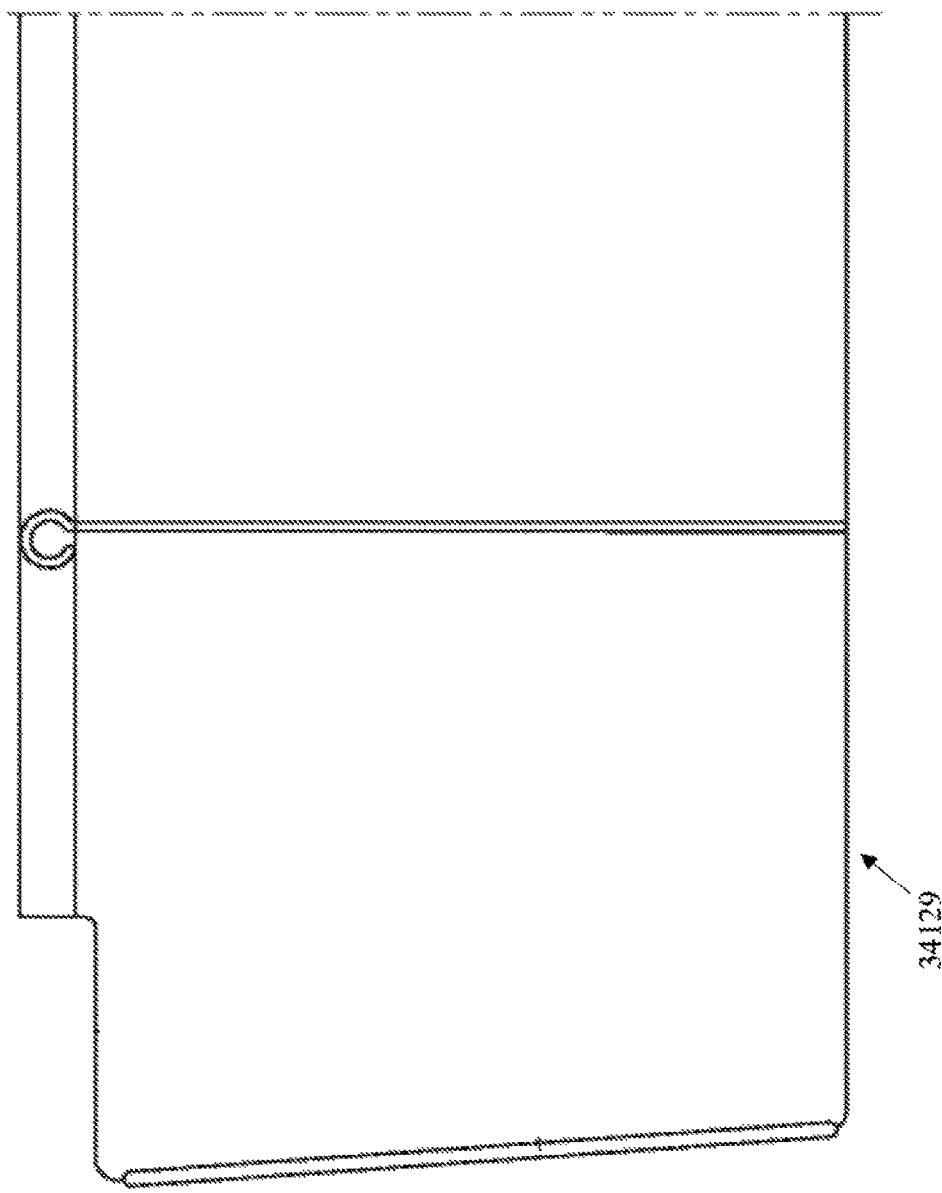
FIGS. 34A-34B illustrate the sectional side view and the side view, respectively, of the auxiliary visor, according to an aspect.
Figure 34B:
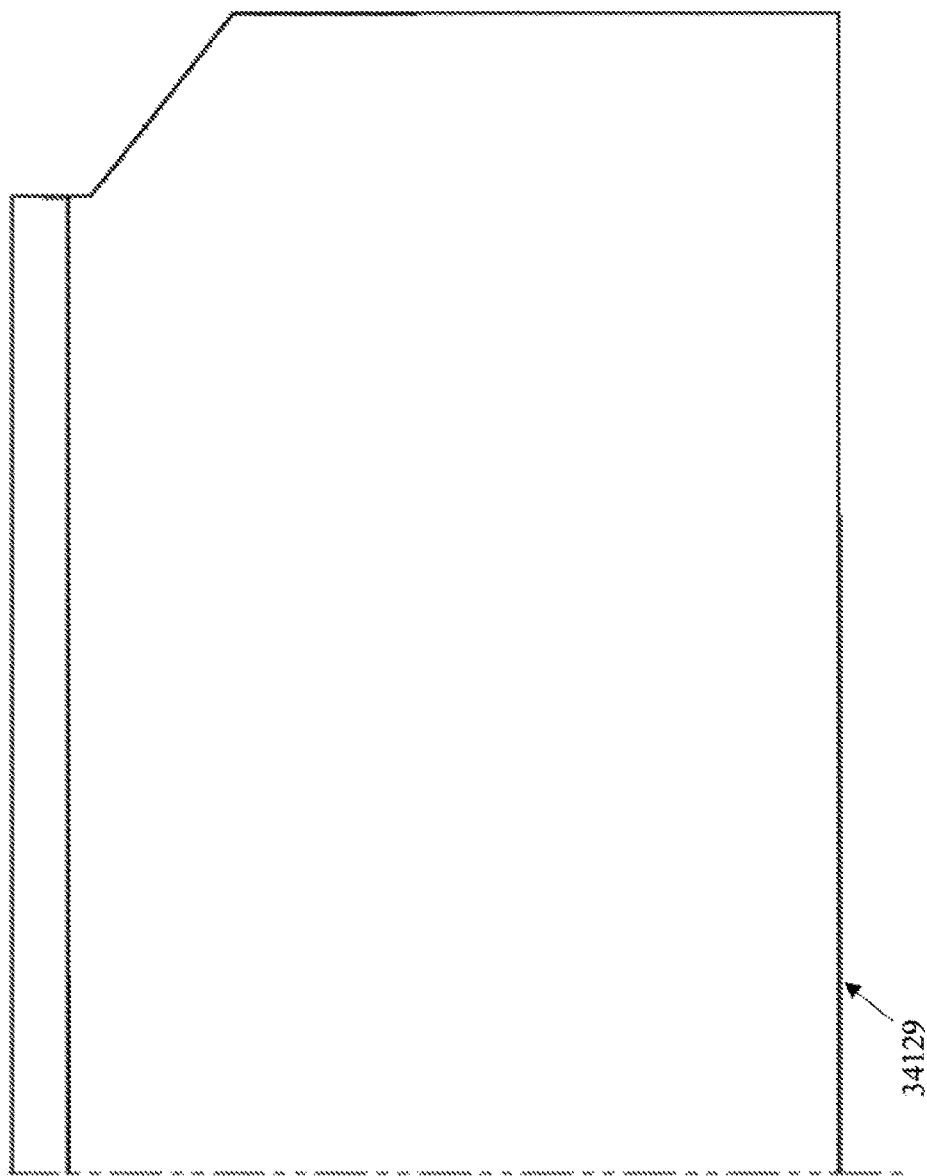

FIGS. 34A-34B illustrate the sectional side view and the side view, respectively, of the auxiliary visor 34129, according to an aspect. As an example, a top portion of the auxiliary visor panel may fit into the open seam tube (as shown by 4129A in FIG. 4) and the auxiliary visor panel 34129 may extend downwards from the tube and arm.

Figure 35:
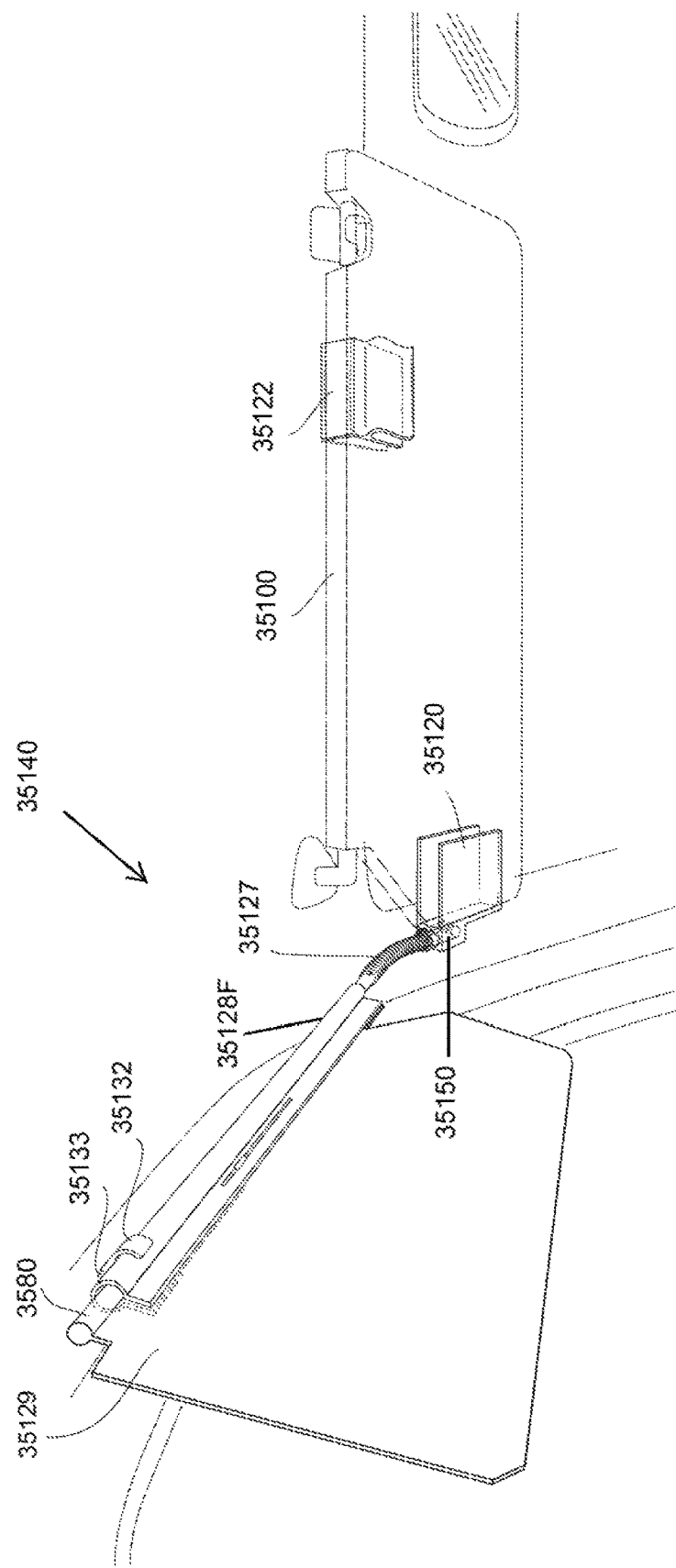
FIG. 35 illustrates a perspective view of another example of an adjustable sun visor device without a bridge and having a twin capsule mounted on a sun visor in use in an open state, within the left side interior of an exemplary vehicle, according to an aspect.

FIG. 35 illustrates a perspective view of another example of an adjustable sun visor device 35140 without a bridge and having a twin capsule 35150 ("twin capsule sun visor device," "twin capsule adjustable sun visor device," "twin capsule adjustable sun visor apparatus," "twin capsule apparatus," "bridgeless adjustable sun visor device," "bridgeless sun visor apparatus," "bridgeless adjustable sun visor," "bridgeless sun visor device," "bridgeless apparatus," or "bridgeless device") mounted on a sun visor 35100 in use in an open state, within the left side interior of an exemplary vehicle, according to an aspect. The twin capsule sun visor device 35140 may be similar to the adjustable sun visor 1140 shown in FIG. 1, with an alternative arrangement of components or a variation in components, as will be described further herein. As shown as an example, the twin capsule apparatus 35140 may be used on the left side, which may be a driver seat, and may be mounted onto an existing sun visor 35100 of a vehicle. The adjustable sun visor 35140 may be provided with a vertical clip 35120, a horizontal clip 35122, a gripper 35132, a bend-resistant spring 35127, an auxiliary visor panel 35129 and an associated visor-attached bar ("visor-attached bar" or "bar") 3580, and an open-pipe arm 35128F. The auxiliary visor panel 35129 may be configured to block light and UV radiation, for example. The gripper 35132 may be attached to the interior of the vehicle, for example, by any suitable means, such as by using double-sided adhesive (not visible, placement indicated by 35133). This may be similar to the components shown in FIGS. 32A-32B, for example.

As an example, some users may find the assembly of the adjustable sun visor device having a bridge, shown and described in FIGS. 1-34B, to be more convenient or user-friendly, while some other users may find the same regarding the twin capsule sun visor device, shown and described in FIGS. 35-57B. The various examples of the adjustable sun visor device shown and described herein may present different users with a variety of options for adjusting and installing a sun visor device in their vehicle, and may be provided with ease of use from an embodiment of the device. For example, some users may find that the bridge (as shown by 1121 in FIG. 1) may be easier to handle and manipulate than the twin capsule (as shown by 35150 in FIG. 35), while other users may find that the elements inserted into the twin capsule (as shown and described when referring to FIGS. 44A-45B) may be easier or faster to handle and assemble. Another advantage of the twin capsule sun visor device, as shown in FIG. 35, may be that the a fewer number of elements or components may need to be manipulated than the sun visor device having a bridge, when adjusting the sun visor device between left and right sides of a vehicle, for example.

Figure 36:
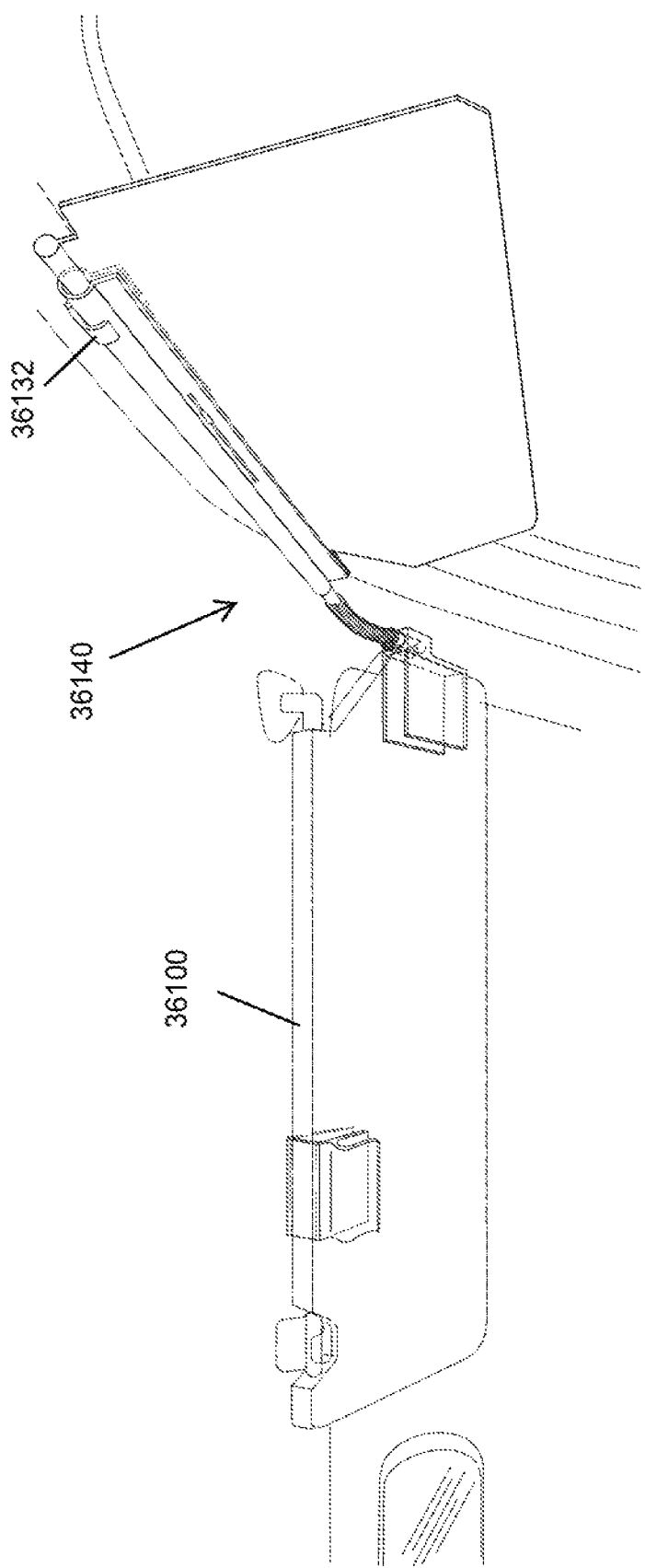
FIG. 36 illustrates a perspective view of a twin capsule adjustable sun visor device mounted on a sun visor in use in an open state, within the right side interior of an exemplary vehicle, according to an aspect.

FIG. 36 illustrates a perspective view of a twin capsule adjustable sun visor device 36140 mounted on a sun visor 36100 in use in an open state, within the right side interior of an exemplary vehicle, according to an aspect. The twin capsule sun visor device 36140 may be the same as or similar to the twin capsule sun visor device shown by 35140 in FIG. 35. Again as in FIG. 35, the twin capsule sun visor device 36140 may be similar to the adjustable sun visor 2140 shown in FIG. 2, with an alternative arrangement of components or a variation in components, as will be described in further detail hereinafter. As shown as an example, the adjustable sun visor 36140 may be used on the right side, which may be a passenger seat, and may be mounted onto an existing sun visor 36100 of a vehicle.

Figure 37:
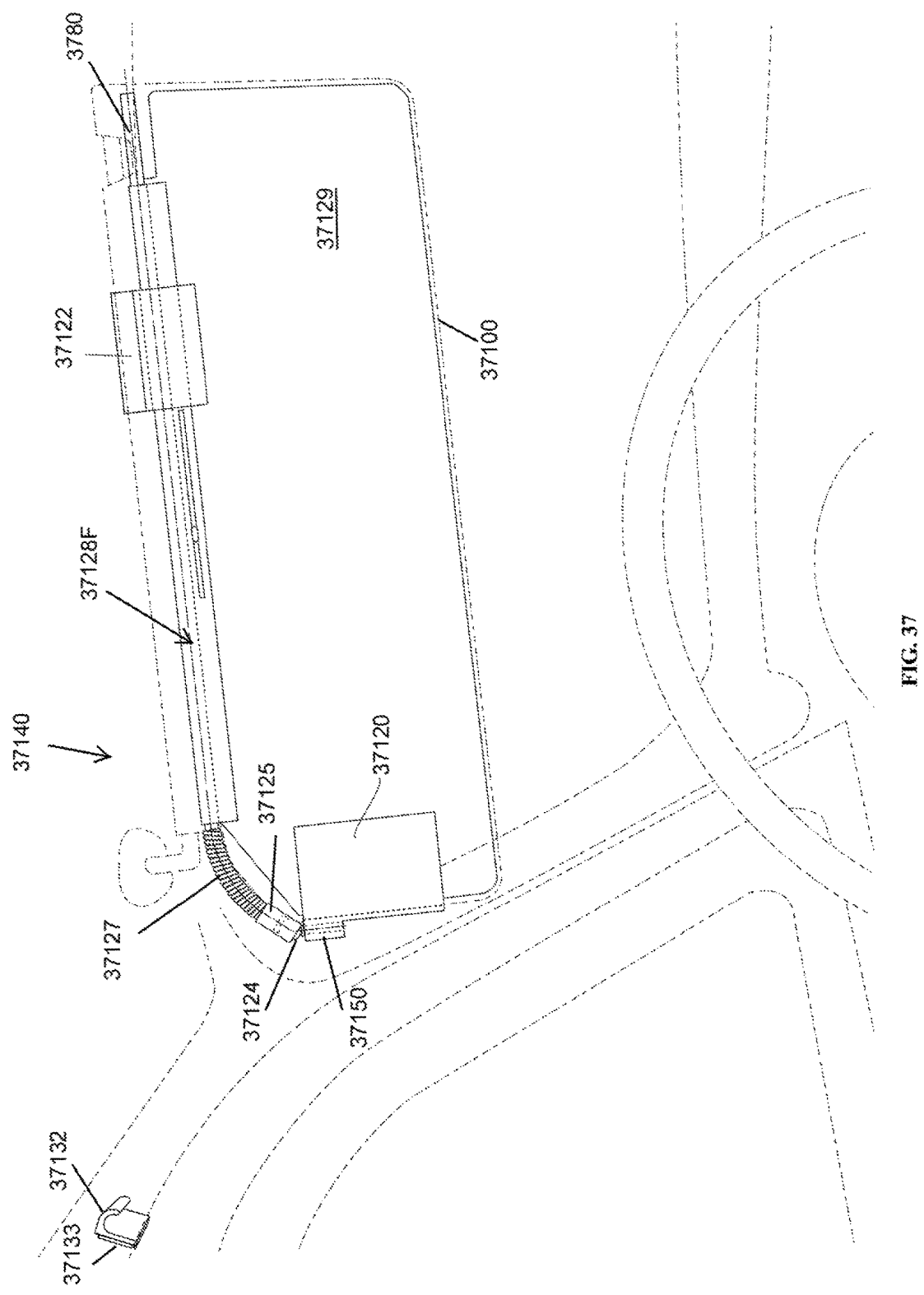
FIG. 37 illustrates a front view of the twin capsule adjustable sun visor device mounted to an exemplary sun visor in a closed state, according to an aspect.

FIG. 37 illustrates a front view of the twin capsule adjustable sun visor device 37140 mounted to an exemplary sun visor 37100 (represented by broken lines behind the visor device 37140) in a closed state, according to an aspect. As an example, the twin capsule sun visor device 37140 may be closed or locked such that the visor panel 37129 is flat against the sun visor 37100 of a vehicle. The twin capsule sun visor device 37140 may be provided with a horizontal clip 37122, a vertical clip 37120, a twin capsule 37150, a ball 37124 and associated ball compartment 37125, a bend-resistant spring 37127, an open-pipe arm 37128F, a visor-attached rod 3780. The gripper 37132, attached to the interior of the vehicle via a double-sided adhesive 37133, is shown in an empty state as an example in this view. Again, as previously described, the twin capsule sun visor device 37140 may be similar to the adjustable sun visor device as shown by 3140 in FIG. 3.

Figure 38:
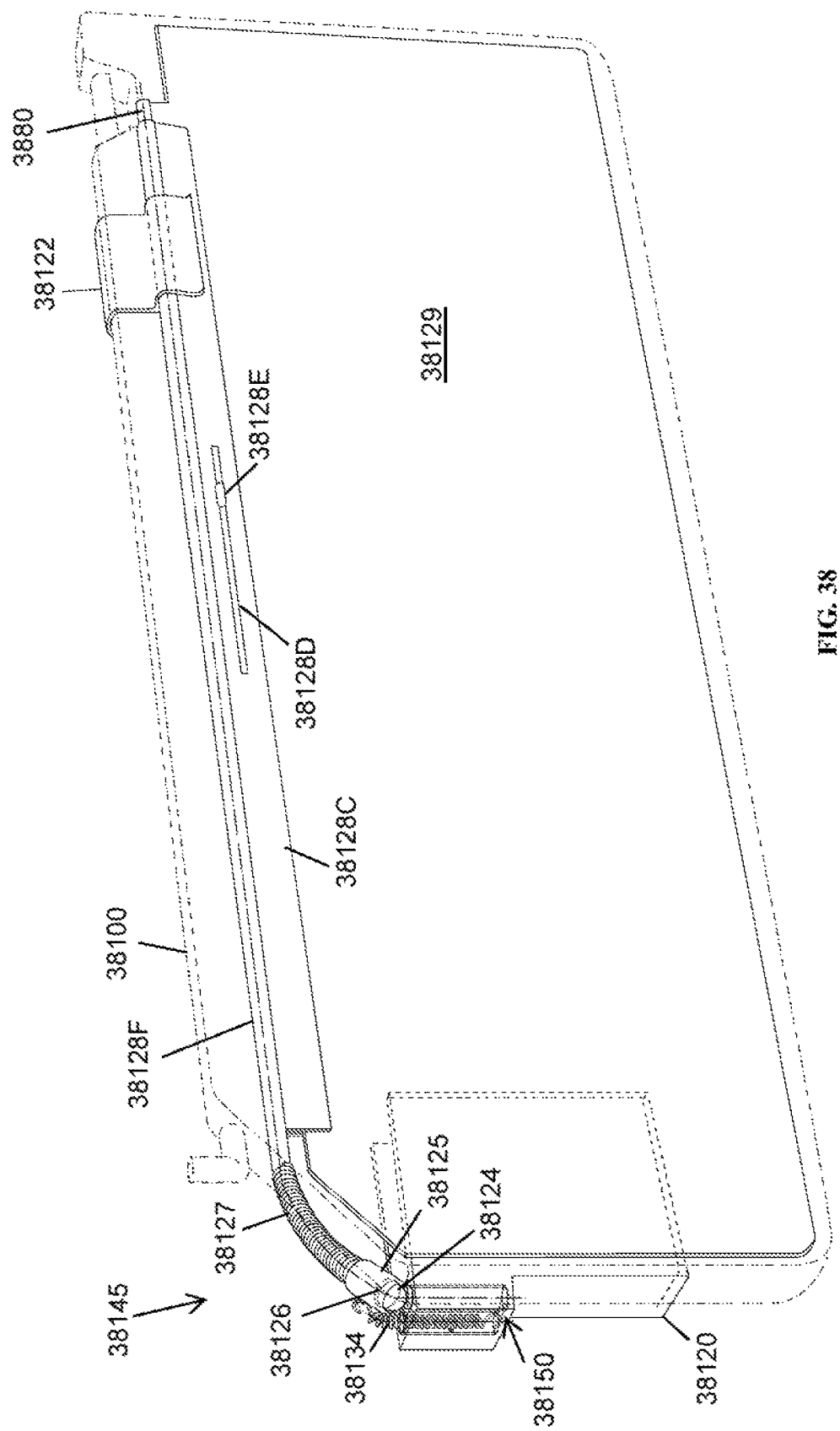
FIG. 38 illustrates the front perspective view of the assembled twin capsule sun visor device, according to an aspect.

FIG. 38 illustrates the front perspective view of the assembled twin capsule sun visor device 38140, according to an aspect. An exemplary sun visor 38100 is represented by broken lines behind the visor device 38140. The twin capsule sun visor device 38140 may be similar to the adjustable sun visor shown by 4140 in FIG. 4, for example. The sun visor device 38140 may be provided with the following exemplary components: a horizontal clip 38122, a vertical clip 38120, a ball 38124 and associated ball compartment 38125, a tension spring 38134, a plug 38126, a bend-resistant spring 38127, a twin capsule 38150, an auxiliary visor panel 38129, an open-pipe arm 38128F, and a bar 3880. The open-pipe arm 38128F may be provided with a first open-pipe arm end, and a second open-pipe arm end associated with the bend-resistant spring 38127 and opposite to the first open-pipe arm end. The open-pipe arm 38128F may also be provided with an open pipe shape with an opening (shown by 4086 in FIG. 40B) along the length of the pipe on the bottom side and extending between the first open-pipe arm end and the second open-pipe arm end, such that the bar 3880 may be inserted or snapped into the open-pipe arm 38128F. The open-pipe arm 38128F may be provided with extensions or flaps ("extension," "extension flap" or "flap") 38128C on a front and a rear side along the length of the open-pipe arm, on the front and rear sides of the opening (again, shown by 4086 in FIG. 40B). Each flap 38128C may be provided with a horizontal slot 38128D. Within each horizontal slot 38128D and associated with the auxiliary visor panel may be a guide handle 38128E, which may act as a stopper for the arm 38128 within the open seam tube 38129A. The flaps, horizontal slots, and guide handles, and the association of the open-pipe arm together with the bar are shown in further detail in FIGS. 40A-41B. The guide handles 38128E may restrict the movement of the arm 38128 within the open seam tube 38129A in this manner, for example. The horizontal clip may be provided as the example shown by 4122 in FIG. 4, for example, or may be a double horizontal clip as shown by 38122 in FIG. 38. The double horizontal clip is shown and described in further detail in FIGS. 49A-49C. The arm may be provided as the example shown by 4128 in FIG. 4, for example, or may be an open-pipe arm having flaps as shown by 38128F in FIG. 38.

Figure 39:
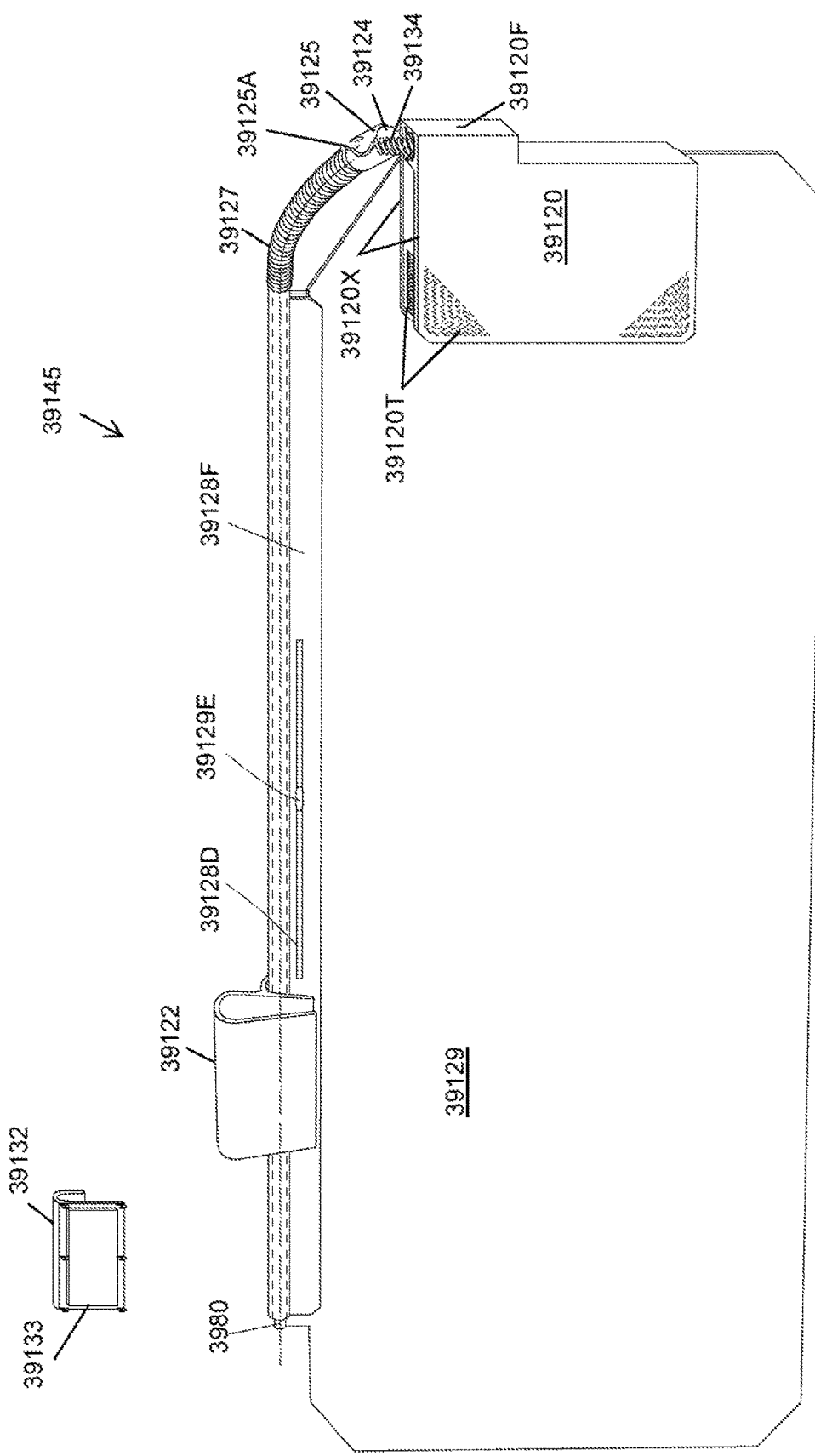
FIG. 39 illustrates the rear perspective view of the assembled twin capsule sun visor device, according to an aspect.

FIG. 39 illustrates the rear perspective view of the assembled twin capsule sun visor device 39140, according to an aspect. The twin capsule sun visor device 394140 may be similar to the adjustable sun visor device shown by 5140 in FIG. 5, for example. Exemplary components that may be visible from a back view are: an auxiliary visor panel 39129, a rod 3980, a double horizontal clip 39122, an open-pipe arm 39128F and associated horizontal slot 39128D, a guide handle 39128E, a bend-resistant spring 39127, a ball 39124 and associated ball compartment 39125, a ring 39125A provided on the ball compartment 39125, a tension spring 39134, a vertical clip 39120 having jaws 39120X and associated teeth 39120T on the interior surfaces of the jaws 39120X (represented in broken lines where the teeth are obscured in the rear view by the jaws), and a screw hole 39120F within the vertical clip 39120. Also shown in this view are a gripper 39132 with double-sided adhesive 39133 attached to the back side of the gripper 39132.

FIGS. 40A-40B illustrate a front elevation view and a side elevation sectional view, respectively, of an open-pipe arm 40128F, according to an aspect. The side elevation sectional view shown in FIG. 40B is taken along line A-A of FIG. 40A. Again as previously described, the open-pipe arm 40128F may also be provided with an open pipe shape with an opening 4086 along the length of the pipe on the bottom side and extending between the first open-pipe arm end and the second open-pipe arm end, such that the bar (shown by 4180 in FIG. 41A) may be inserted or snapped into the open-pipe arm 40128F. The open-pipe arm 40128F may be provided with extensions or flaps 40128C on a front and a rear side along the length of the open-pipe arm, on the front and rear sides of the opening 4086.

The extensions 40128C may be a front side extension and a rear side extension, as shown in FIG. 40B. Each extension 40128C may run approximately along the length of the open-pipe arm 40128F, and an extension 40128C may occur on the front side and the rear side of the opening 4086, and the extensions 40128C and may be shorter in length than the open-pipe arm 40128F. Each extension 40128C may be provided with a horizontal slot 40128D, which may be at an approximate center portion of the extension, and the horizontal slot 40128D may be shorter in length than the length of the extension 40128C. A guide handle (shown by 41128E in FIGS. 41A-41D) may be provided in the twin capsule sun visor device to lock into the horizontal slots 40128D. The open-pipe arm 40128F may be provided with a hollow portion 40128G.

FIGS. 41A-41D illustrate a front elevation exploded view, a side elevation sectional view, a front elevation assembled view, and a side elevation sectional assembled view, respectively, of an open-pipe arm 41128F with an auxiliary visor panel 41129, according to an aspect. The sectional view shown in FIG. 41B is taken along line A-A' of FIG. 41A, and the sectional view shown in FIG. 41D is taken along line A-A' of FIG. 41C. The open-pipe arm 41128F may be similar to the open-pipe arm shown by 40128F in FIGS. 40A-40B, having extensions 41128C, horizontal slots 41128D, and a hollow portion 41128G. The auxiliary visor panel 41129 may be provided with a top portion 4181 extending upwards at the top end of the auxiliary visor panel, and a bar 4180 extending along the length of the top portion 4181. Guide handles 41128E may be provided on the left and the right sides of the auxiliary visor panel 41129, and may be below the bar 4180, and above the main panel body 4182. The open-pipe arm 41128F may be assembled together with the auxiliary visor panel 41129 by inserting the bar 4180 into the hollow portion 41128G of the open-pipe arm 41128F. The components may be snapped together and may be held together by friction and also by the guide handles 41128E being locked into the horizontal slots 41128D. The guide handles 41128E may also restrict the side-to-side movement of the bar 4180 within the hollow portion 41128G. As shown in the assembled views in FIGS. 41C-41D, when assembled together, the front extension flap may be positioned against the front side of the main panel body 4182, and the rear extension flap may be positioned against the rear side of the main panel body 4182.

Figure 42A:
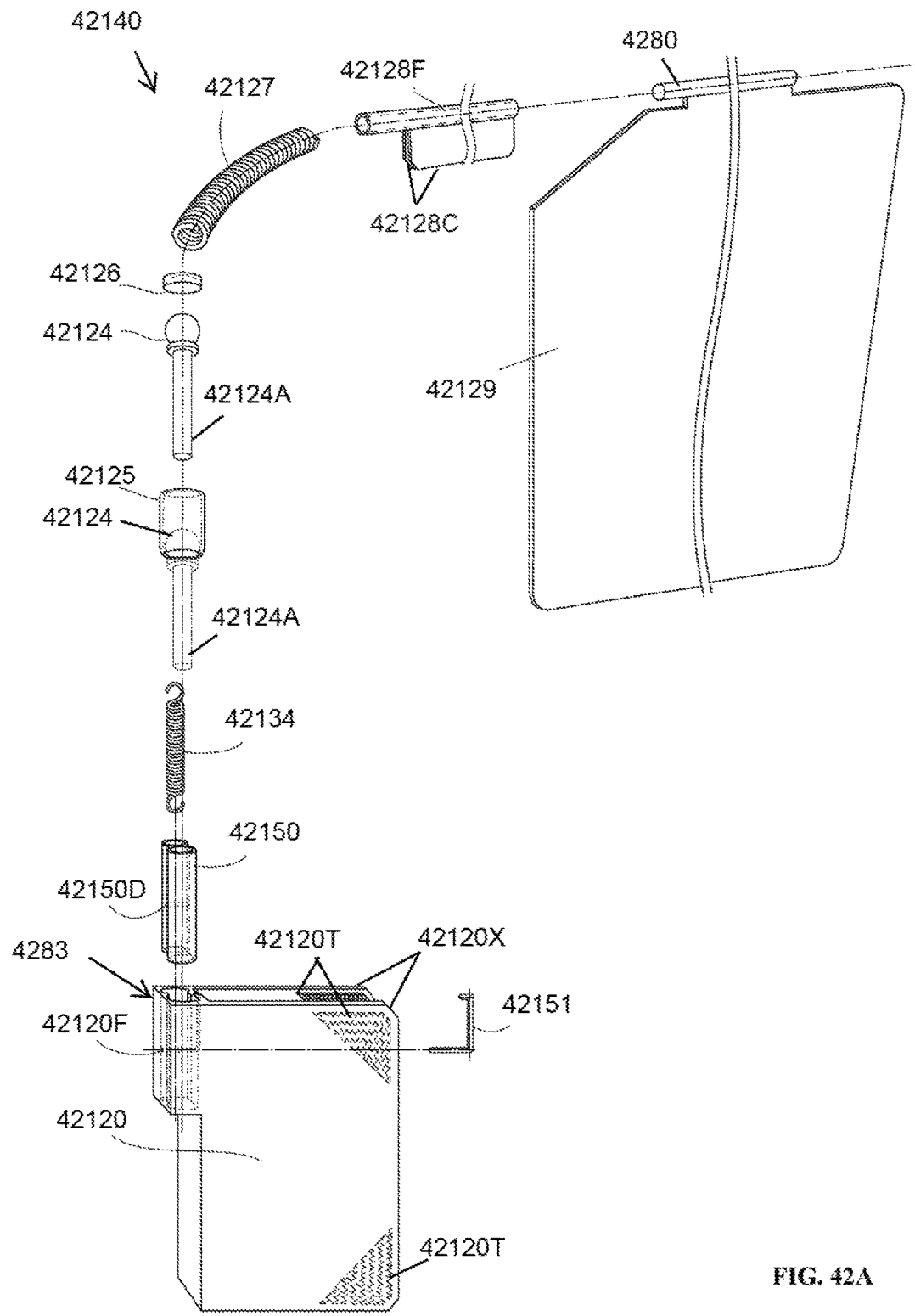
FIGS. 42A-42B illustrate an exploded front perspective view and a left side assembled view, respectively, of the twin capsule sun visor device, according to an aspect.
Figure 42B:
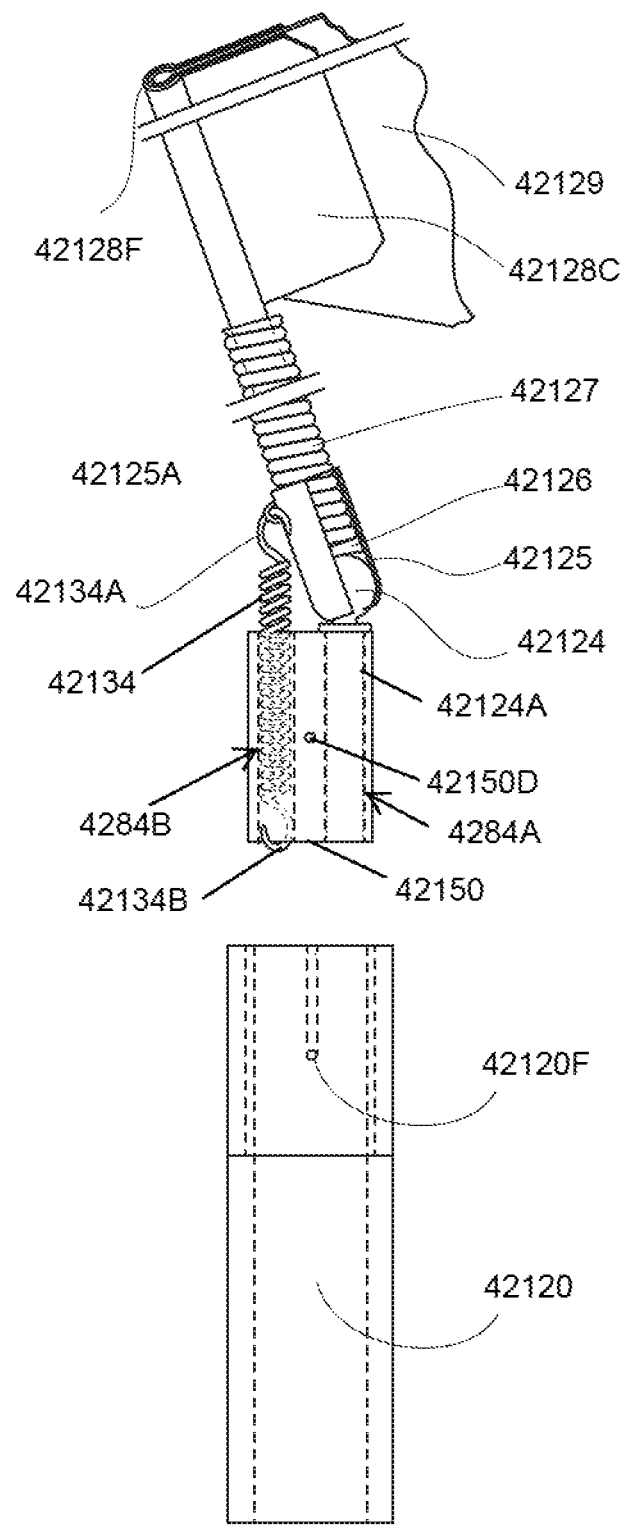

FIGS. 42A-42B illustrate an exploded front perspective view and a left side assembled view, respectively, of the twin capsule sun visor device 42140, according to an aspect. The twin capsule sun visor device 42140 may include the following exemplary components, which may be assembled or associated together in the following exemplary manners. An open-pipe arm 42128F may be provided with associated front and rear extension flaps 42128C. An auxiliary visor panel 42129 may be provided (shown only partially in FIG. 42B), having a bar 4280 at a top end. The open-pipe arm 42128F may fit onto the bar 4280, with the extension flaps 42128C resting on the front and rear sides of the auxiliary visor panel 42129. The open-pipe arm 42128F may be associated with a bend-resistant spring 42127 which may receive a plug 42126, which may rest against a ball 42124 within an associated ball compartment 42125. The ball 42124 may include a leg 42124A. The ball compartment 42125 is shown in FIG. 42A with the ball 42124 inside, represented by broken lines, as an example. When the ball 42124 is received by the ball compartment 42125, the leg 42124A may protrude out of the ball compartment 42125. A vertical clip 42120 may be provided, which may be provided with jaws 42120X and teeth 42120T (represented by broken lines where not visible on the exterior side of the jaws) on the interior sides of the jaws for holding a sun visor, for example. The vertical clip 42120 may be provided with a twin capsule compartment 4283, which may be configured to receive a twin capsule 42150. The twin capsule 42150 may have two interior spaces within (shown in further detail in FIG. 42B, and represented in broken lines). A first interior space 4284A may receive the leg 412124A of the ball 42124, and the second interior space 4284B may receive a tension spring 42134. A pin 42151 may be provided for the assembly of the device. In the assembled view of FIG. 42B, the tension spring 42134 is partially within the twin capsule 42150, and the leg 42124A is within the twin capsule 42150, and are represented by broken lines where the tension spring 42134 and the leg 42124A are within the interior spaces 4284A and 84284B of the twin capsule 42150.

When the twin capsule 42150 is received into the twin capsule compartment 4283, a capsule pin hole 42150D provided on the twin capsule 42150 and a compartment pin hole 42120F provided on the twin capsule compartment 4283 may be aligned such that the pin 42150 can pass through each pin hole, and thus secure the twin capsule 42150 inside of the twin capsule compartment 4283.

As shown as an example, and similar to the tension spring shown by 7134 in FIG. 7, the tension spring 42134 may be provided with a top hook 42134A at a top end, and a bottom hook 42134B at a bottom end. The top hook and the bottom hook may be C-shaped, or U-shaped, or any other suitable shape, for example. As shown in the assembled view of FIG. 42B, the ball compartment 42125 may be provided with a ring 42125A which may be configured to receive the top hook 42134A. The bottom hook 42134B may hook onto the bottom end or bottom edge of the twin capsule 42150, for example.

FIG. 42C illustrate an exploded left side elevation view of the twin capsule 42150 and the various components that fit together with the twin capsule 42150, according to an aspect. As shown, the twin capsule 42150 may be provided with a first interior space 4284A which may receive the leg 412124A of the ball 42124, and a second interior space 4284B which may receive a tension spring 42134. The ball 42124 may be received into the ball compartment 42136, and the ball 42124 may rest against the plug 42126 such that the ball can push evenly against the bend-resistant spring 42127. The plug 42126 may be provided with a first flat surface, which may fit onto the bend-resistant spring 42127, and a second curved surface, which may fit onto the ball 42124. The ring 42125A of the ball compartment may face towards the tension spring 42134 such that the top hook 42134 may hook into the ring 42134A. The bottom hook 42134B may hook onto the underside of the twin capsule 42150. As shown, the capsule pin hole 42150D provided on the twin capsule 42150 may be provided in between the first interior space 4284A and the second interior space 4284B.

FIG. 42D illustrates an exploded left side elevation view of the twin capsule 42150, the vertical clip 42120, and the ball compartment 42125 assembled together with the bend-resistant spring 42127 and the ball 42124 and plug 42126, according to an aspect.

FIG. 42E illustrates an exploded rear perspective view of the twin capsule 42150, the vertical clip 42120, the pin 42151, the tension spring 42134 and the ball 42124, according to an aspect. On the top end of the twin capsule compartment 4283, a twin capsule opening 4285 may be provided, through which the twin capsule 42150 may be received into the twin capsule compartment 4283. As shown as an example, the pin 42151 may have an L-shape, or any other suitable shape. The L-shape may provide the user with an easy and quick means for gripping the pin 42151 if the pin needs to be removed, for example. As is also shown as an example, the twin capsule 42150 may be shorter in height than the vertical clip 42120.

FIGS. 43A-43B illustrate the left side elevation view and another example of the left side elevation view, respectively, of a first configuration of an automatic adjustment unit of the twin capsule sun visor device 43140, and the corresponding elements assembled together with the automatic adjustment unit, according to an aspect. The automatic adjustment unit may be similar to the automatic adjustment unit shown as an example in FIGS. 8A-8B, and may be used for maintaining stability and flexibility of the auxiliary visor unit 43129, with relation to the existing sun visor of a vehicle and the side window and/or front windshield of the vehicle. The automatic adjustment unit may be comprised of the vertical clip 43120, the ball 43124, the ball compartment 43125, the plug 43126, the bend-resistant spring 43127, and the tension spring 43134.

The automatic adjustment unit may be assembled by carrying out the following exemplary process. First, the twin capsule 43150 may be inserted into the twin capsule compartment 4283, via the twin capsule opening (shown by 4285 in FIG. 42E) on the top end of the vertical clip 43120. This may result in the capsule pin hole (shown in detail by 42150D in FIG. 42C, and represented by 43150D in FIG. 43A) provided on the twin capsule 42150 and the compartment pin hole 43120F provided on the twin capsule compartment 4283 to be aligned. Next, the twin capsule 43150 may be secured inside of the twin capsule compartment 4283 by inserting the pin (shown by 42151 in FIG. 42E) through both the capsule pin hole 42150D and the compartment pin hole 43120F. Next, the ball 43124 may be inserted into the ball compartment 43125, such that the leg 43124A of the ball extends downwards and out through the bottom end of the ball compartment 43125, such that the bottom end is sealed by the leg 43124A. Next, the plug 43126 may be inserted into the top end of the ball compartment 43125, thus securing the ball 43124 into the ball compartment 43125. Next, the top hook 43134A of the tension spring 43134 may be hooked into the ring 43125A of the ball compartment 43125. Next, the ball compartment 43125 may be connected to the vertical clip 43120 by inserting the ball leg 43124A into the first interior space (shown by 4284A in FIG. 42E) of the twin capsule 43150, and inserting the tension spring 43134 into the second interior space (shown by 4284B in FIG. 42E) of the twin capsule 43150, and hooking the bottom hook 43134B onto the bottom edge of the twin capsule 43150. Next, the bottom end of the bend-resistant spring 43127 may be connected with the plug by fitting the plug into the bend-resistant spring.

The tension spring 43124 may force or bias the ball compartment 43125 downwards towards the vertical clip 43120. With no additional forces applied to the automatic adjustment unit, the bend-resistant spring 43127 may hold a first shape, as shown in FIG. 43A as an example, wherein the tension spring 43124 is in a neutral or default shape or position, and the bend-resistant spring 43127 also in a neutral or default shape or position. With an additional force applied to the automatic adjustment unit in the direction indicated by arrow 4301AR, the bend-resistant spring 43127 may be pushed into a bent shape as shown in FIG. 43B as an example. With a force applied by the tension spring 43134 and an opposite force 4301AR loaded onto the open-pipe arm 43128F, an automatic mechanical adjustment may be created.

Figure 44A:
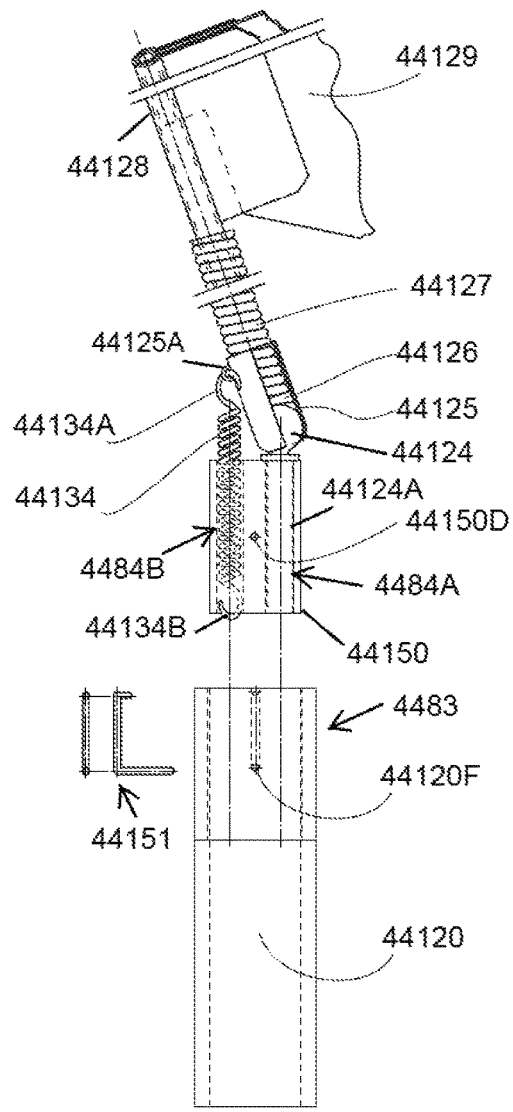
FIGS. 44A-44B illustrate the partially exploded, left side elevation view and the partially exploded, rear perspective view, respectively, of the automatic adjustment unit of the twin capsule sun visor device in a first configuration, according to an aspect.
Figure 44B:
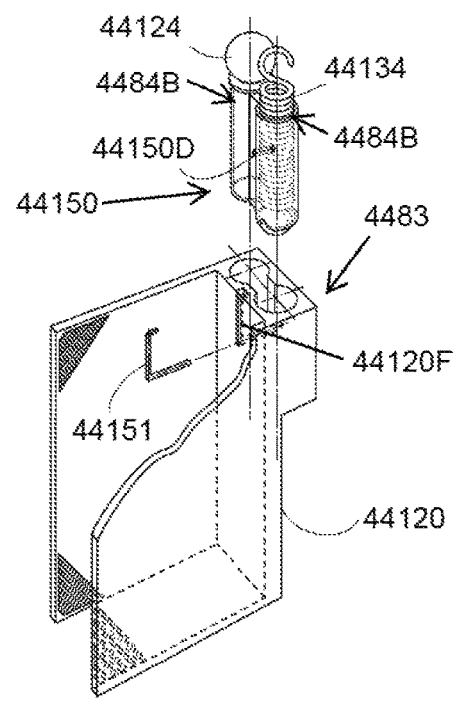

FIGS. 44A-44B illustrate the partially exploded, left side elevation view and the partially exploded, rear perspective view, respectively, of the automatic adjustment unit of the twin capsule sun visor device in a first configuration, according to an aspect. FIG. 44B shows a partial cutaway view of the vertical clip 44120 such that the interior portion of the vertical clip 44120 may be viewed. The first configuration shown as an example may be similar to the example shown in FIGS. 42B-42E, wherein the ball leg 44124A is inserted into the first interior space (represented by broken lines) 4484A of the twin capsule 44150, and the tension spring is inserted into the second interior space (represented by broken lines) 4484B of the twin capsule 44150. The automatic adjustment unit may be assembled together as described when referring to FIGS. 43A-43B, for example. As previously described, first, the twin capsule 44150 may be inserted into the twin capsule compartment 4483, via the twin capsule opening (shown by 4285 in FIG. 42E) on the top end of the vertical clip 44120. This may result in the capsule pin hole (shown in detail by 42150D in FIG. 42C, and represented by 43150D in FIG. 43A) provided on the twin capsule 44150 and the compartment pin hole 43120F provided on the twin capsule compartment 4283 to be aligned. Next, the twin capsule 43150 may be secured inside of the twin capsule compartment 4483 by using the pin 44151. The pin 44151, shown in a front elevation view and a side elevation view as an example in FIG. 44A, may be inserted into the capsule pin hole 44150D and the compartment pin hole 44120F. Next, the ball 44124 may be inserted into the ball compartment 44125, such that the leg 44124A of the ball extends downwards and out through the bottom end of the ball compartment 44125, such that the bottom end is sealed by the leg 44124A. Next, the plug 43126 may be inserted into the top end of the ball compartment 44125, thus securing the ball 44124 into the ball compartment 44125. Next, the top hook 44134A of the tension spring 44134 may be hooked into the ring 44125A of the ball compartment 44125. Next, the ball compartment 44125 may be connected to the vertical clip 44120 by inserting the ball leg 44124A into the first interior space (represented in broken lines in FIG. 44A) 4484A of the twin capsule 44150, and inserting the tension spring 44134 into the second interior space (represented in broken lines in FIG. 44A) 4484B of the twin capsule 44150, and hooking the bottom hook 44134B onto the bottom edge of the twin capsule 44150. Next, the bottom end of the bend-resistant spring 44127 may be connected with the plug by fitting the plug into the bend-resistant spring. This first configuration may thus be used in the manner shown as an example in FIG. 35, and may be used in a left side in an interior of a vehicle, such that the auxiliary visor panel 44129 may block light coming from the left side.

FIGS. 45A-45B illustrate the partially exploded, left side elevation view and the partially exploded, rear perspective view, respectively, of the automatic adjustment unit of the twin capsule sun visor device in a second configuration, according to an aspect. FIG. 45B shows a partial cutaway view of the vertical clip 45120 such that the interior portion of the vertical clip 45120 may be viewed. Again, the automatic adjustment unit shown in FIGS. 45A-45B is shown with the following elements as an example: a bend-resistant spring 45127, a plug 45126, a ball compartment 45125, a ball 45124 having a leg 45124A, a twin capsule 45150 having a capsule pin hole 45150D, and a vertical clip 45120 having a twin capsule compartment 4583 and a compartment pin hole 45120F. An auxiliary visor panel 45129, an open-pipe arm 45128F are also shown in FIG. 45A. Again as in FIG. 44A, the pin 45151 is shown in a front elevation view and a side elevation view as an example in FIG. 45A.

The second configuration shown as an example may be similar to the first configuration of FIGS. 44A-44B, with the following differences. First, the tension spring 45134 may be placed in the first interior space (represented in broken lines in FIG. 45A) 4584A of the twin capsule 45150. Second, the leg 45124A of the ball 45124 may be placed into the second interior space (represented in broken lines in FIG. 45A) 4584B of the twin capsule 45150. Thus, the ball compartment 45125 may be turned in a mirror image from the first configuration such that the ring 45125A may be aligned with the top hook 45134A of the tension spring 45134. This second configuration may thus be used in the manner shown as an example in FIG. 36, and may be used in a right side in an interior of a vehicle, such that the auxiliary visor panel 45129 may block light coming from the right side.

Again, as was previously discussed when referring to FIGS. 11-13, the twin capsule sun visor apparatus may be assembled for use on a left side of a vehicle, but may also be converted for use on a right side of a vehicle. For use on a left side of a vehicle, the first configuration as shown and described in FIGS. 42B-44B may be used. For use on a right side of a vehicle, a second configuration, as shown and described in FIGS. 45A-45B, may be used.

Figure 46A:
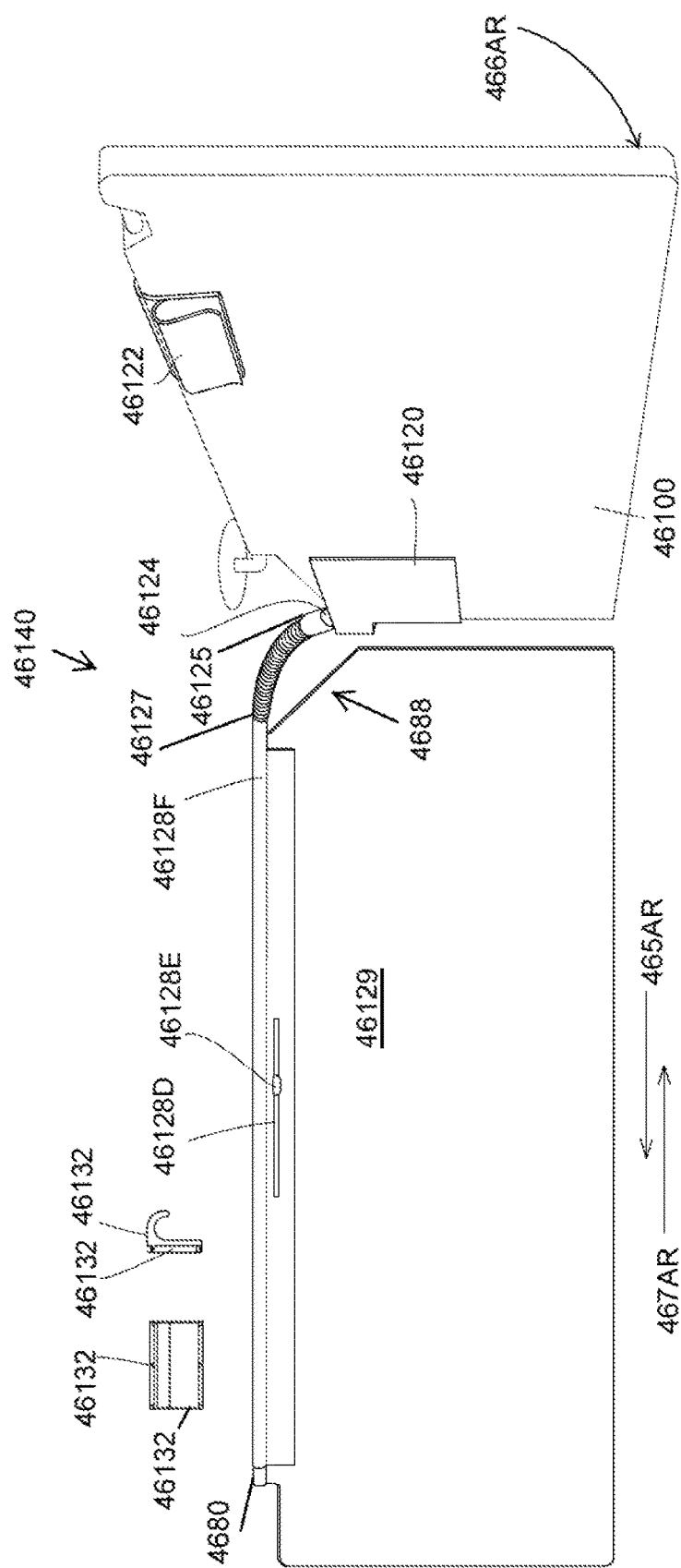
FIGS. 46A-46B illustrate the front perspective views of the twin capsule sun visor device 46140 clipped to a vehicle sun visor at two different angles, according to an aspect.
Figure 46B:
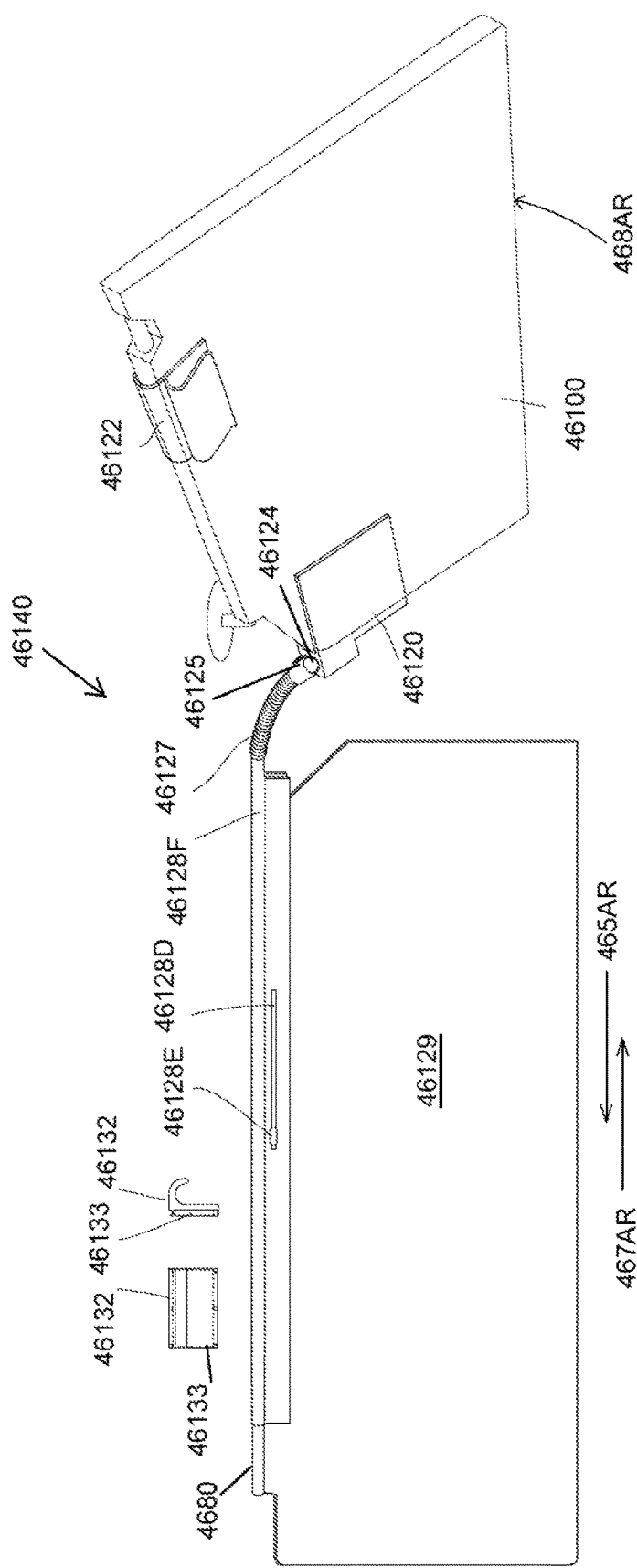

FIGS. 46A-46B illustrate the front perspective views of the twin capsule sun visor device 46140 clipped to a vehicle sun visor 46100 at two different angles, according to an aspect. As an example, the twin capsule sun visor device 46140 may maintain its position and angle even while the sun visor 46100 of a vehicle is flipped or adjusted to various positions. A plurality of gripping elements may also be provided, which may include a horizontal clip 46122 and a tube gripper ("tube gripper" or "gripper") 46132 (shown in detail in FIGS. 32A-32B). The gripper 46132 is shown in a front elevation view and a left side elevation view, and may be mounted in the interior of a vehicle, such as, for example, to the frame of a left side window. The gripper 46132 may be provided with a curved gripping portion configured to receive and hold the open-pipe arm 46128F. The tube gripper 46132 may grip onto and hold the open-pipe arm 46128F via the curved gripping portion and thus hold the auxiliary visor panel 46129 in place, by its association with the open-pipe arm 46128F. In FIGS. 46A-46B, the tube gripper 46132 is shown empty, for visual clarity. However, it should be understood that the open-pipe arm 46128F may be snapped into the gripper 46132, as shown in FIGS. 35-36, where the gripper is shown by 35132 and 36132. The tube gripper 46132 may be mounted onto the interior of the vehicle using, for example, double-sided adhesive 46133.

With the sun visor 46100 facing the front windshield of the vehicle as shown in FIG. 46A, the sun visor may be flipped such as by a force in the directions indicated by arrows 466AR and 468AR. During these movements of the sun visor 46100, the bend-resistant spring 46127, the ball compartment 46125, the ball 46124, and other elements of the automatic adjustment unit (as shown in FIGS. 44A-45B, as examples) may make movements in order for the auxiliary visor panel 46129 to remain in a stable position or in the same position, and remain in the grip of the tube gripper 46132. When a force is applied to the sun visor 46100 in the direction indicated by arrow 466AR, the force may be turned into a force as indicated by arrow 465AR. This may cause the auxiliary visor panel 46129 and the associated open-pipe arm 46128F to slide in the direction indicated by arrow 465AR, via the bar 4680 moving from side to side within the stationary open-pipe arm 46128F. The side-to-side movements of the bar 4680 within the open-pipe arm 46128F may be restricted by the guide handles 46128E protruding from the horizontal slots 46128D.

When a force is applied to the sun visor 46100 in the direction indicated by arrow 468AR, the force may be turned into a force as indicated by arrow 467AR. The forces 465AR or 467AR may push or pull the bar 4680 from side-to-side within the open-pipe arm 46128F as shown, wherein a larger portion of the bar 4680 is visible in FIG. 46B than in FIG. 46A.

As shown as an example, the vertical clip 46120 may be used for mounting the twin capsule sun visor device 46140 to a sun visor 46100 of a vehicle. A double horizontal clip 46122 may also be provided, which is shown empty in FIGS. 46A-46B as an example. The double horizontal clip 46122 may be used for clipping the auxiliary visor panel 46129 against the sun visor 46100, such as, for example, when the twin capsule sun visor device 46140 is not needed.

The auxiliary visor panel 46129 may be substantially rectangular in shape, and may also be angled at a corner 4688 such that the angle is greater than 90 degrees with respect to a left side or right side of the auxiliary visor panel 46129, for example, such that the main panel body (as shown by 4182 in FIG. 41A) is free to move about the bend-resistant spring 46127 without making contact with the bend-resistant spring 46127.

Figure 47:
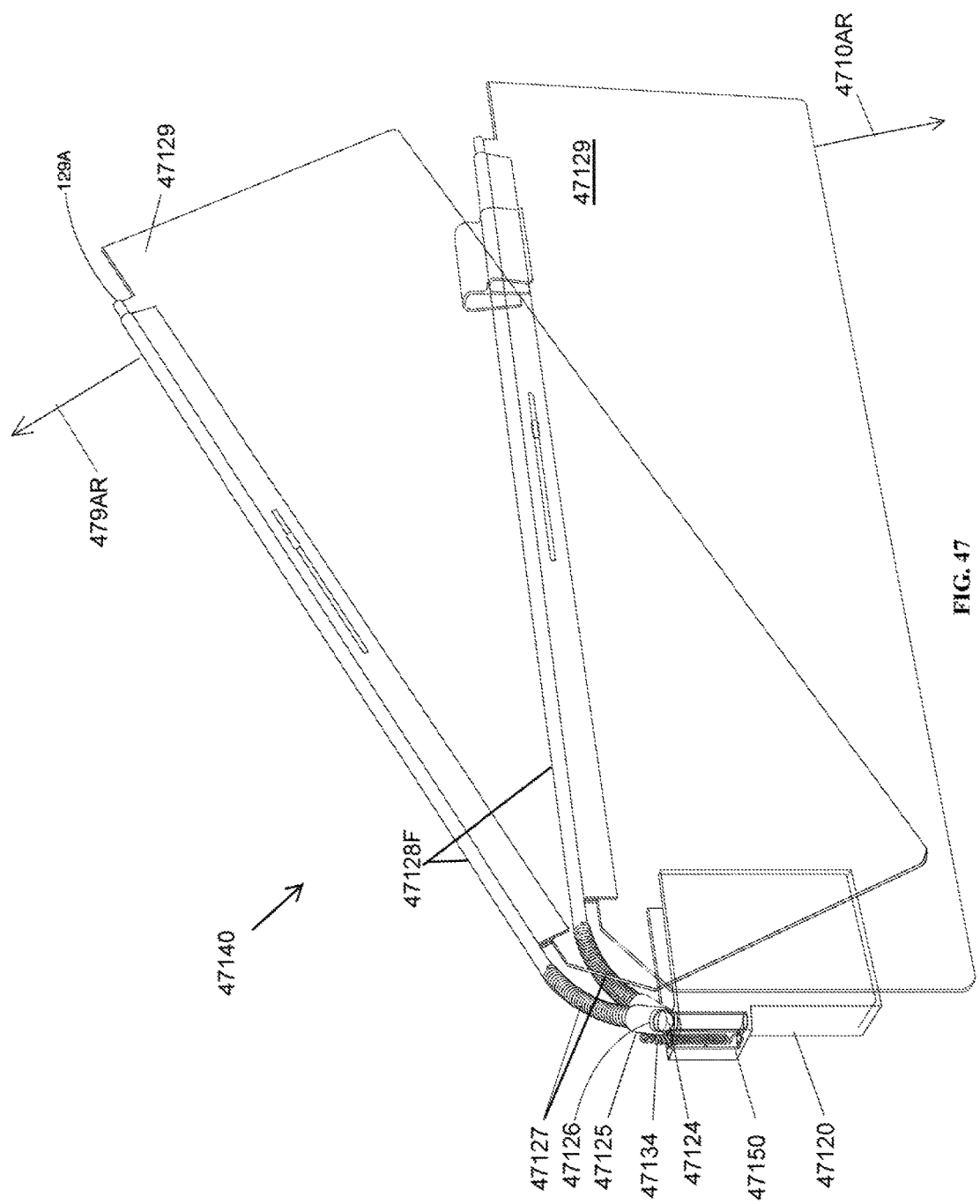
FIG. 47 illustrates the front perspective view of the range of motion the twin capsule sun visor device may make, according to an aspect.

FIG. 47 illustrates the front perspective view of the range of motion the twin capsule sun visor device 47140 may make, according to an aspect. The force indicated by arrow 479AR may indicate the direction that the auxiliary visor panel 47129 is biased towards due to the natural or default state of the bend-resistant spring 47127, when no additional forces are present.

An additional force may be present when, for example, a ceiling in the interior of a vehicle pushes down in the direction of arrow 4710AR onto the auxiliary visor panel 47129, which may cause the auxiliary visor panel 47129 to move into the direction indicated by arrow 4710AR. As another example, a user may press down on the auxiliary visor panel 47129 to cause the force in the direction of 4710AR. A force in the direction of 4710AR may cause the bend-resistant spring 47127 to bend and may thus cause the twin capsule sun visor device 47140 to be in a closed state. Again as previously discussed, the bend-resistant spring 47127, the plug 47126, the tension spring 47134, the ball compartment 47125, the ball 47124, and other elements of the automatic adjustment unit (as shown in FIGS. 44A-45B, as examples) may make movements when forces such as 479AR and 4710AR are applied to the auxiliary visor panel 47129 or open-pipe arm 47128F, and the twin capsule 47150 and the vertical clip 47120 may remain stationary. As an example, the tension spring 47134 and the ball 47124 may pivot, rotate, or move within the twin capsule 47150 while the twin capsule 47150 and the vertical clip 47120 remain stationary.

FIGS. 48A-48D illustrate the rear perspective view, the left side elevation view, the rear elevation view, and the top plan view, respectively, of the vertical clip 48120, according to an aspect. Again, the vertical clip 48120 may be provided with jaws 48120X, which may be configured for clamping onto or gripping a sun visor of a vehicle. The jaws 48120X may be provided with teeth 48120T on the interior sides (shown in broken lines where not visible on the exterior sides). FIG. 48B also illustrates the teeth 48120T in broken lines where not visible due to the walls of the vertical clip 48120. The vertical clip 48120 may also be provided with a twin capsule compartment 4883, which may be configured for receiving a twin capsule (as shown by 42150 in FIG. 42E), with a twin capsule opening 4885 at the top end of the vertical clip 48120 through which the twin capsule may be inserted. The twin capsule compartment 4883 may be provided with a compartment pin hole 48120F.

FIGS. 49A-49C illustrate the right side elevation view, the rear elevation view, and the front perspective view, respective, of the double horizontal clip 49122, according to an aspect. The double horizontal clip 49122 may be similar to the single horizontal clip shown in FIGS. 19A-19C and the locking unit shown in FIGS. 28A-28B, for example. The double horizontal clip 49122 may be provided with a first clip 49122A, and a second clip 49122B, wherein the second clip 49122B is shorter in height than the first clip 49122A. The first clip 49122A may be used to clip onto a sun visor of a vehicle, for example. The second clip may also function as a lock ("clip-attached lock") 49122B, and may be integral to the horizontal clip 49122. The second clip 49122B may provide a means for clipping or locking the auxiliary visor panel (as shown by 35129 in FIG. 35) into a closed or locked position, which may be the auxiliary visor panel resting against the sun visor of a vehicle.

Figure 50B:
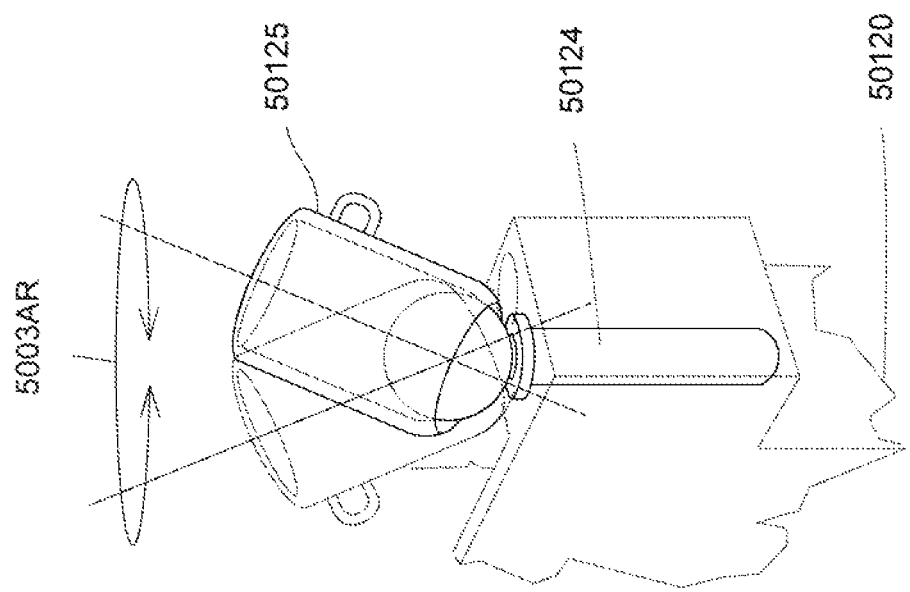
FIGS. 50A-50B illustrate the sectional view and the perspective view, respectively, of the ball and ball compartment on the vertical clip of the twin capsule sun visor device, according to an aspect.
Figure 50A:
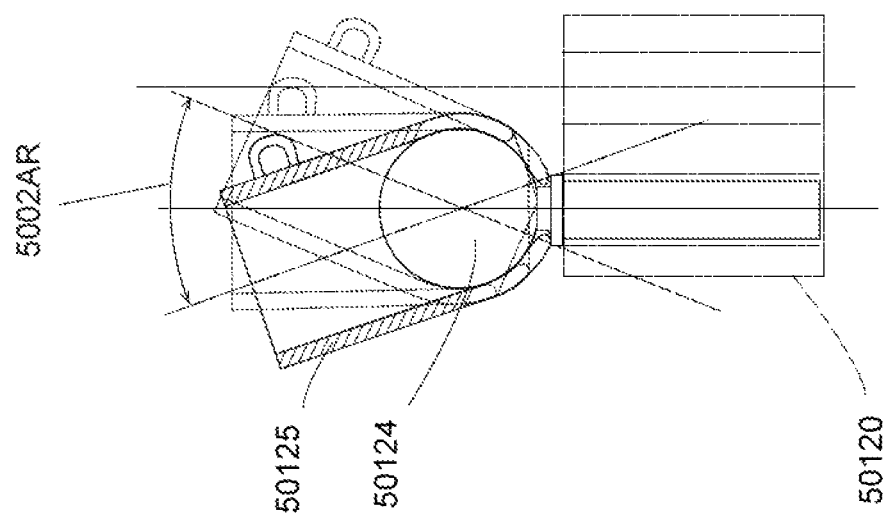

FIGS. 50A-50B illustrate the sectional view and the perspective view, respectively, of the ball 50124 and ball compartment 50125 on the vertical clip 50120 of the twin capsule sun visor device, according to an aspect. The examples shown in FIGS. 50A-50B may be similar to the examples shown in FIGS. 9-10. The ball compartment 50125 may pivot around the ball 50124. As an example, the ball compartment 50125 may pivot in the directions shown by arrows 5002AR and 5003AR. Thus, the ball compartment 50125 may be provided with a large range of motion in which it can swivel, rotate, or pivot.

FIGS. 51A-51B illustrate the front elevation view and the left side elevation view, respectively, of the pin 51151, according to an aspect.

FIGS. 52A-52B illustrate the left side elevation view and the top plan view, respectively, of the twin capsule 52150, according to an aspect. The twin capsule 52150 may be provided with a capsule pin hole 52150D, which may receive the pin (as shown by 51151 in FIGS. 51A-51B).

FIGS. 53A-53B illustrate the top plan view and the side elevation view, respectively, of the plug 53126, according to an aspect.

FIGS. 54A-54B illustrate the side elevation view and the top plan view, respectively, of the bend-resistant spring 54127, according to an aspect.

FIGS. 55A-55B illustrate the side elevation view and the top plan view, respectively, of the tension spring 55134, according to an aspect. The tension spring 55134 may be provided with a top hook 55134A and a bottom hook 55134B.

FIGS. 56A-56B illustrate the side elevation view and the top plan view, respectively, of the ball 56124, according to an aspect. The ball 56124 may be provided with a ball leg 56124A.

FIGS. 57A-57B illustrate the side elevation view and the top plan view, respectively, of the ball compartment 57125, according to an aspect. The ball compartment 57125 may be provided with a ring 57125A, which may receive the top hook (as shown by 55134A in FIG. 55A).

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An adjustable sun visor apparatus for blocking light from a front and a side in a vehicle, together with a sun visor of the vehicle, the adjustable sun visor apparatus comprising:
   an auxiliary visor unit having:
      a top visor end, a bottom visor end, a front visor side, and a rear visor side;
      an open-pipe arm having a first open-pipe arm end, a second open-pipe arm end opposite to the first open-pipe arm end, an opening extending between the first open-pipe arm end and the second open-pipe arm end on the bottom visor end, and a first length;
      a first extension extending downwards from the open-pipe arm on the front visor side of the opening, the first extension having a first horizontal slot;
      a second extension extending downwards from the open-pipe arm on the rear visor side of the opening, the second extension having a second horizontal slot;
      an auxiliary visor panel having a main panel body, a top visor portion extending upwards from the main panel body at the top visor end, a bar extending along the top visor portion at the top visor end, a first guide handle protruding from the top visor portion underneath the bar on the front visor side, and a second guide handle protruding from the top visor portion underneath the bar on the rear visor side;
      wherein the bar is adapted to fit into the opening to be received into the open-pipe arm such that the first guide handle protrudes out of the first horizontal slot, and the second guide handle protrudes out of the second horizontal slot;
      wherein the first extension and the second extension each have a second length, the second length being shorter than the first length, and wherein the first horizontal slot and the second horizontal slot each have a first slot end and a second slot end;
      wherein the first horizontal slot and the second horizontal slot each have a third length, the third length being shorter than the second length; and
      wherein the auxiliary visor panel is configured to block light;
   an automatic adjustment unit having:
      a bend-resistant spring having a first spring end and a second spring end;
      a ball having a round ball portion and a ball leg portion;
      a plug adapted to fit onto the round ball portion;
      a tension spring having a top hook and a bottom hook;
      a ball compartment having a ring adapted to receive the top hook, the ball compartment being adapted to house and pivot around the round ball portion and the plug;
      a twin capsule having a first interior space, a second interior space, and a capsule pin hole;
      a vertical clip having a top vertical clip end and a bottom vertical clip end, jaws adapted to grip the sun visor, and a twin capsule compartment opposite to the jaws and at the top vertical clip end, and the twin capsule compartment having a top compartment end, a bottom compartment end, a compartment pin hole, wherein the twin capsule is configured to be removably inserted into the twin capsule compartment; wherein the capsule pin hole and the compartment pin hole are aligned when the twin capsule is received into the twin capsule compartment; and
      a pin adapted to fit into the capsule pin hole and the compartment pin hole and thus secure the twin capsule inside of the twin capsule compartment;
      wherein the first interior space is adapted to receive the tension spring or the ball leg portion, and the second interior space is adapted to receive the tension spring or the ball leg portion, such that the ball and the tension spring are anchored into the vertical clip when the twin capsule is received into the twin capsule compartment;
      wherein the first spring end is associated with the plug within the ball compartment, and the second spring end is associated with the second open-pipe arm end; and
      wherein the ball compartment is configured to pivot around the ball and the plug such that the associated first spring end of the bend-resistant spring pivots around the ball;
   a plurality of gripping elements, comprising:
      a horizontal clip having a first clip having a first height, and a second clip having a second height, wherein the second height is shorter than the first height, wherein the first clip is adapted to grip onto the sun visor, and the second clip is adapted to grip onto the auxiliary visor panel against the sun visor into a closed state or release the auxiliary visor panel from the sun visor into an open state; and
      a tube gripper having a front gripper side, a rear gripper side, and a curved gripping portion adapted to hold the open-pipe arm;
   wherein the top hook is received into the ring, and the bottom hook is hooked onto the bottom compartment end;
   wherein the tension spring is configured to bias the top hook and the bottom hook together and thus bias the ring, the bend-resistant spring, and the open-pipe arm downwards;

such that a movement of the sun visor causes a movement of the automatic adjustment unit gripped to the sun visor, and also causes the bar to move in a first direction or a second direction within the open-pipe arm, and thus prevents a movement of the auxiliary visor panel when the open-pipe arm is received into the tube gripper; and wherein the bar is adapted to move in the first direction and the bar is prevented from continuing in the first direction when the first guide handle and the second guide handle reach the first slot end, such that the bar can move in a second direction away from the first slot end until being prevented from continuing in the second direction when the first guide handle and the second guide handle reach the second slot end;

wherein the sun visor blocks light from the front and the auxiliary visor panel blocks light from the side in the vehicle when the auxiliary visor panel is in the open state.

2. The adjustable sun visor apparatus of claim 1, wherein an interior surface of the jaws of the vertical clip further comprise teeth configured to grip the sun visor.

3. The adjustable sun visor apparatus of claim 1, wherein the plurality of gripping elements further comprises a double-sided adhesive, wherein a first side of the double-sided adhesive is adhered to an interior surface of the vehicle and a second side of the double-sided adhesive is adhered to the rear gripper side.

4. The adjustable sun visor apparatus of claim 1, the twin capsule further comprising a top capsule end and a bottom capsule end, and wherein the capsule pin hole is at a center portion of the twin capsule between the top capsule end and the bottom capsule end.

5. The adjustable sun visor apparatus of claim 1, wherein the pin has an L-shape.

6. The adjustable sun visor apparatus of claim 1, the plug further comprising a first flat surface adapted to fit onto the bend-resistant spring, and a second curved surface adapted to fit onto the round ball portion.

7. The adjustable sun visor apparatus of claim 1, the main panel body further comprising four corners, a left panel side, and a right panel side, wherein a first corner of the four corners has an angle greater than 90 degrees with respect to the right panel side.

8. An adjustable sun visor apparatus for blocking light from a front and a side in a vehicle, together with a sun visor of the vehicle, the adjustable sun visor apparatus comprising:
an auxiliary visor unit having:
a top visor end, a bottom visor end, a front visor side, and a rear visor side;
an open-pipe arm having a first open-pipe arm end, a second open-pipe arm end opposite to the first open-pipe arm end, an opening extending between the first open-pipe arm end and the second open-pipe arm end on the bottom visor end, and a first length;
a first extension extending downwards from the open-pipe arm on the front visor side of the opening, the first extension having a first horizontal slot;
a second extension extending downwards from the open-pipe arm on the rear visor side of the opening, the second extension having a second horizontal slot;
an auxiliary visor panel having a main panel body, a top visor portion extending upwards from the main panel body at the top visor end, a bar extending along the top visor portion at the top visor end, a first guide handle protruding from the top visor portion underneath the bar on the front visor side, and a second guide handle protruding from the top visor portion underneath the bar on the rear visor side;
wherein the bar is adapted to fit into the opening to be received into the open-pipe arm such that the first guide handle protrudes out of the first horizontal slot, and the second guide handle protrudes out of the second horizontal slot;
wherein the first extension and the second extension each have a second length, the second length being shorter than the first length, and wherein the first horizontal slot and the second horizontal slot each have a first slot end and a second slot end;
wherein the first horizontal slot and the second horizontal slot each have a third length, the third length being shorter than the second length; and
wherein the auxiliary visor panel is configured to block light;
an automatic adjustment unit having:
a bend-resistant spring having a first spring end and a second spring end;
a ball having a round ball portion and a ball leg portion;
a plug adapted to fit onto the round ball portion;
a tension spring having a top hook and a bottom hook;
a ball compartment having a ring adapted to receive the top hook, the ball compartment being adapted to house and pivot around the round ball portion and the plug;
a twin capsule having a first interior space, and a second interior space;
a vertical clip having a top vertical clip end and a bottom vertical clip end, a first means for gripping onto the sun visor, and a twin capsule compartment at the top vertical clip end, the twin capsule compartment being configured to receive the twin capsule, and the twin capsule compartment having a top compartment end, and a bottom compartment end;
wherein the first interior space is adapted to receive the tension spring or the ball leg portion, and the second interior space is adapted to receive the tension spring or the ball leg portion, such that the ball and the tension spring are anchored into the vertical clip;
wherein the first spring end is associated with the plug within the ball compartment, and the second spring end is associated with the second open-pipe arm end; and
wherein the ball compartment is configured to pivot around the ball and the plug such that the associated first spring end of the bend-resistant spring pivots around the ball;
a plurality of gripping elements, comprising:
a horizontal clip having a first clip and a second clip, wherein the first clip is adapted to grip onto the sun visor, and the second clip is adapted to grip onto the auxiliary visor panel against the sun visor into a closed state or release the auxiliary visor panel from the sun visor into an open state; and
a tube gripper having a second means for gripping the open-pipe arm;
wherein the top hook is received into the ring, and the bottom hook is hooked onto the bottom compartment end;
wherein the tension spring is configured to bias the top hook and the bottom hook together and thus bias the ring, the bend-resistant spring, and the open-pipe arm downwards;

such that a movement of the sun visor causes a movement of the vertical clip gripped to the sun visor, and also causes the bar to move in a first direction or a second direction within the open-pipe arm, and thus prevents a movement of the auxiliary visor panel when the open-pipe arm is received into the tube gripper; and wherein the bar is adapted to move in the first direction and the bar is prevented from continuing in the first direction when the first guide handle and the second guide handle reach the first slot end, such that the bar can move in a second direction away from the first slot end until being prevented from continuing in the second direction when the first guide handle and the second guide handle reach the second slot end;

wherein the sun visor blocks light from the front and the auxiliary visor panel blocks light from the side in the vehicle when the auxiliary visor panel is in the open state.

9. The adjustable sun visor apparatus of claim 8, further comprising a securing means adapted to secure the twin capsule inside of the twin capsule compartment.

10. The adjustable sun visor apparatus of claim 9, wherein the securing means comprises a pin having an L-shape.

11. The adjustable sun visor apparatus of claim 8, wherein the first means for gripping onto the sun visor comprises jaws.

12. The adjustable sun visor apparatus of claim 11, wherein an interior surface of the jaws of the vertical clip further comprise teeth configured to grip the sun visor.

13. The adjustable sun visor apparatus of claim 9, wherein the second means for gripping the open-pipe arm comprises a curved gripping portion adapted to hold the open-pipe arm.

14. An adjustable sun visor apparatus for blocking light from a front and a side in a vehicle, together with a sun visor of the vehicle, the adjustable sun visor apparatus comprising:

an auxiliary visor unit configured to maintain a stable position of an auxiliary visor panel by having:

an open-pipe arm having a first open-pipe arm end, a second open-pipe arm end opposite to the first open-pipe arm end, and an opening extending between the first open-pipe arm end and the second open-pipe arm end on the bottom visor end;

a bar configured to be received into the opening, wherein the auxiliary visor panel extends downwards from the bar;

a bend-resistant spring having a first spring end and a second spring end;

a ball having a round ball portion and a ball leg portion;

a plug adapted to fit onto the round ball portion;

a tension spring having a top hook and a bottom hook;

a ball compartment having a ring adapted to receive the top hook, the ball compartment being adapted to house and pivot around the round ball portion and the plug;

a twin capsule having a first interior space, and a second interior space;

a vertical clip having a top vertical clip end and a bottom vertical clip end, a first means for gripping onto the sun visor, and a twin capsule compartment at the top vertical clip end, the twin capsule compartment being configured to receive the twin capsule, and the twin capsule compartment having a top compartment end, and a bottom compartment end;

wherein the first interior space is adapted to receive the tension spring or the ball leg portion, and the second interior space is adapted to receive the tension spring or the ball leg portion, such that the ball and the tension spring are anchored into the vertical clip;

wherein the first spring end is associated with the plug within the ball compartment, and the second spring end is associated with the second open-pipe arm end; and wherein the ball compartment is configured to pivot around the ball and the plug such that the associated first spring end of the bend-resistant spring pivots around the ball;

wherein the auxiliary visor panel is configured to block light; and wherein the tension spring is configured to bias the top hook received into the ring and the bottom hook received onto the bottom compartment end together and thus bias the ring, the bend-resistant spring, and the arm downwards;

such that a movement of the sun visor causes a movement of the vertical clip and also causes the bar to move within the open-pipe arm and thus prevents a movement of the auxiliary visor panel.

15. The adjustable sun visor apparatus of claim 14, further comprising a tube gripper and an associated double-sided adhesive, wherein a first side of the double-sided adhesive is adhered to an interior surface of the vehicle and a second side of the double-sided adhesive is adhered to the tube gripper, the tube gripper having a curved gripping portion configured to receive and hold the open-pipe arm.

16. The adjustable sun visor apparatus of claim 14, wherein the first means for gripping onto the sun visor comprises jaws.

17. The adjustable sun visor apparatus of claim 16, wherein an interior surface of the jaws of the vertical clip further comprise teeth configured to grip the sun visor.

18. The adjustable sun visor apparatus of claim 14, further comprising a horizontal clip having a first clip, and a second clip, wherein the first clip is adapted to grip onto the sun visor, and the second clip is adapted to grip onto the auxiliary visor panel against the sun visor into a closed state or release the auxiliary visor panel from the sun visor into an open state.

19. The adjustable sun visor apparatus of claim 14, further comprising a securing means adapted to secure the twin capsule inside of the twin capsule compartment.

20. The adjustable sun visor apparatus of claim 19, wherein the securing means comprises a pin having an L-shape.

* * * * *